United States Patent
Feldman et al.

(10) Patent No.: US 12,468,635 B2
(45) Date of Patent: Nov. 11, 2025

(54) DUPLICATION OF TENSORS FOR MEMORY ALLOCATION IN A RECONFIGURABLE DATA PROCESSOR

(71) Applicant: SambaNova Systems, Inc., Palo Alto, CA (US)

(72) Inventors: Matthew Feldman, Palo Alto, CA (US); Yaqi Zhang, Foster City, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 167 days.

(21) Appl. No.: 18/522,787

(22) Filed: Nov. 29, 2023

(65) Prior Publication Data
US 2025/0053518 A1   Feb. 13, 2025

Related U.S. Application Data

(60) Provisional application No. 63/531,662, filed on Aug. 9, 2023.

(51) Int. Cl.
*G06F 12/10*    (2016.01)
*G06N 3/0464*   (2023.01)

(52) U.S. Cl.
CPC .......... *G06F 12/10* (2013.01); *G06N 3/0464* (2023.01)

(58) Field of Classification Search
CPC ........ G06F 12/10; G06F 17/16; G06F 17/153; G06F 8/443; G06F 9/5027;
(Continued)

(56) References Cited

U.S. PATENT DOCUMENTS 11,494,321 B1 * 11/2022 Yu ..................... G06F 9/30043
2019/0370631 A1 * 12/2019 Fais ..................... G06N 3/105
(Continued)

FOREIGN PATENT DOCUMENTS

WO   2010142987 A1   12/2010

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].
(Continued)

*Primary Examiner* — Jared I Rutz
*Assistant Examiner* — Edward Waddy, Jr.
(74) *Attorney, Agent, or Firm* — Flagship Patents; Sikander M. Khan; Rutawari Sharma

(57) ABSTRACT

A system comprises an array of reconfigurable units including a plurality of pattern compute units (PCUs) and a plurality of pattern memory units (PMUs), and a compiler configured to receive a tensor including a plurality of memory access patterns of a first type (read) and a second type (write) located in a logical memory of the compiler. Each memory access pattern includes a memory access particular to that type. The compiler is configured to create a plurality of duplicates of the tensor and assign one or more contexts of any type to the duplicate tensors, such that no two contexts of the same type are in the same duplicate tensor. The compiler is configured to trim the duplicate tensors to retain portions including its corresponding assigned contexts remove portions that are inconsequential to the assigned contexts and dispatch the assigned contexts from each duplicate tensor to one or more PMUs.

20 Claims, 36 Drawing Sheets

(58) Field of Classification Search
CPC ....... G06F 11/3466; G06F 17/15; G06N 3/04;
G06N 3/0464; G06N 3/08; G06N 3/02
USPC ............ 711/202, 204, 206, 200; 706/15, 19
See application file for complete search history.

(56) References Cited

U.S. PATENT DOCUMENTS

2020/0110984 A1* 4/2020 Chatterjee .............. G06N 3/063
2025/0045120 A1* 2/2025 Rozin ................. G06F 12/0875

OTHER PUBLICATIONS

Podobas et al, A Survey on Coarse-Grained Reconfigurable Architectures From a Performance Perspective, IEEEAccess, vol. 2020. 3012084, Jul. 27, 2020, 25 pages.
Prabhakar et al., Plasticine: A Reconfigurable Architecture for Parallel Patterns, ISCA, Jun. 24-28, 2017, 14 pages.
U.S. Appl. No. 16/922,975—Non-Final Office Action, dated Oct. 27, 2022, 26 pages.
U.S. Appl. No. 17/031,679—Notice of Allowance, dated Dec. 22, 2022, 13 pages.
U.S. Appl. No. 17/216,647—Notice of Allowance dated Aug. 13, 2021, 13 pages.
U.S. Appl. No. 17/878,504—Non-Final Office Action, dated Nov. 16, 2022, 11 pages.

* cited by examiner

FIG. 9

| Duplicate / Context | dup0 | dup1 | dup2 | dup3 | dup4 |
|---|---|---|---|---|---|
| W0 914 | X (W0-0) | X (W0-1) | X (W0-2) (keep) | | |
| W1 916 | | | X (W1-0) (move to dup5) | X (W1-1) | X (W1-2) |
| R0 904 | X (R0-0) | | | X (R0-1) | |
| R1 906 | | X (R1-0) | | | X (R1-1) |
| R2 908 | | | X (R2-0/R2-1) (extend to dup5) | | |

FIG. 10C

| Duplicate / Context | dup0 | dup1 | dup2 | dup3 | dup4 | dup5 |
|---|---|---|---|---|---|---|
| W0 914 | X (W0-0) | X (W0-1) | X (W0-2) | | | |
| W1 916 | | | | X (W1-0) | X (W1-1) | X (W1-2) |
| R0 904 | X (R0-0) | | | X (R0-1) | | |
| R1 906 | | X (R1-0) | | | X (R1-1) | |
| R2 908 | | | X (R2-0) | | | X (R2-1) |

| Duplicate Context | dup12 | dup13 | dup14 | dup15 | dup16 |
|---|---|---|---|---|---|
| A_R8 2008 | X (keep) | X (extend to dup17) | X (keep) | | |
| A_R9 2009 | X (keep) | | X (move to dup18) | X (extend to dup19) | X (keep) |
| B_R10 2010 | | X (extend to dup17) | | | |
| B_R11 2011 | | | X (extend to dup18) | | |
| B_R12 2012 | | | | | |
| B_R13 2013 | | | | X (extend to dup19) | |
| B_R14 2014 | X (keep) | X (keep) | X (extend to dup18) | X (keep) | X (keep) |
| W_5 2005 | | X (move to dup17) | | X (keep) | |
| W_6 2006 | | | | | |
| W_7 2007 | | | | X (move to dup19) | X (keep) |

| Duplicate Context | dup12 | dup13 | dup14 | dup15 | dup16 | dup17 | dup18 | dup19 |
|---|---|---|---|---|---|---|---|---|
| A_R8 2008 | X | X | X |  |  | X |  |  |
| A_R9 2009 | X |  |  | X | X |  | X | X |
| B_R10 2010 |  | X |  |  |  | X |  |  |
| B_R11 2011 |  |  | X |  |  |  | X |  |
| B_R12 2012 |  |  |  | X |  |  |  | X |
| B_R13 2013 |  | X |  |  | X |  |  |  |
| B_R14 2014 | X |  | X | X |  |  |  |  |
| W_5 2005 |  |  |  |  |  | X |  |  |
| W_6 2006 |  |  |  |  | X |  | X |  |
| W_7 2007 |  |  |  |  | X |  |  | X |

```
std::set<Ctx> move_list;
std::set <Ctx> keep_list;
std::set <Ctx> extend_list;
For (auto &dup : dups) {
    For (auto &ctx : ctxs) {
        If (prev_ctx_on_dup && rev_ctx_dispatched_apart) {
            move_list.insert(ctx)
            If (prev_ctx_not_in_move_list)
                keep_list.insert(prev_ctx)
        }
    }
}
If (!move_list.empty()) {
    For (auto &ctx : ctxs)
        If (ctx_not_in_move_list && ctx_not_in_keep_list)
            extend_list.insert (ctx)
    reassign (move_list, keep_list, extend_list);
}
```

DUPLICATION OF TENSORS FOR MEMORY ALLOCATION IN A RECONFIGURABLE DATA PROCESSOR

CROSS-REFERENCE TO RELATED APPLICATIONS

This application claims the benefit of U.S. provisional patent application No. 63/531,662 entitled "DUPLICATION OF TENSORS FOR MEMORY ALLOCATION IN A RECONFIGURABLE DATA PROCESSOR," filed Aug. 9, 2023, which is hereby incorporated by reference.

RELATED APPLICATIONS AND DOCUMENTS

This application is related to the following papers and commonly owned applications:
- U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION,";
- U.S. Nonprovisional patent application Ser. No. 16/922,975, filed Jul. 7, 2020, entitled "RUNTIME VIRTUALIZATION OF RECONFIGURABLE DATA FLOW RESOURCES,";
- U.S. Nonprovisional patent application Ser. No. 17/216,647, filed Mar. 29, 2021, entitled "TE1.NSOR PARTITIONING AND PARTITION ACCESS ORDER,";
- U.S. Provisional Patent Application No. 63/271,906, filed Oct. 26, 2021, entitled "AUTOMATIC TENSOR PARTITIONING,";
- U.S. Nonprovisional patent application Ser. No. 17/878,504, filed Aug. 1, 2022, entitled "DETERMINING AND USING MEMORY UNIT PARTITIONING SOLUTIONS FOR RECONFIGURABLE DATAFLOW COMPUTING SYSTEMS,";

All of the related application(s) and documents listed above are hereby incorporated by reference herein for all purposes.

TECHNICAL FIELD

The present subject matter relates to debugging for pipeline optimization during execution of a dataflow graph in a reconfigurable data processor.

BACKGROUND

The present subject matter relates to memory allocation solutions for reconfigurable dataflow computing systems.

Reconfigurable processors can be configured to implement a variety of functions more efficiently or faster than might be achieved using a general-purpose processor executing a computer program. For example, coarse-grained reconfigurable architectures (e.g., CGRAs) have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Memory unit management can dramatically affect the performance of dataflow computing systems.

SUMMARY

Disclosed herein is a data processing system comprising: an array of reconfigurable units including a plurality of pattern compute units (PCUs) and a plurality of pattern memory units (PMUs), each of the plurality of the PMUs further comprising a memory having one or more read I/O ports and one or more write I/O ports, a compiler configured to receive a tensor including 'n' (one or more) memory access patterns of a first type (read) and 'm' (one or more) memory access patterns of a second type (write) located in a logical memory of the compiler, each memory access pattern of the first type (read) including a first type (read) of memory access (read context) and each memory access pattern of the second type (write) including a second type (write) of memory access (write context), wherein the compiler is further configured to create a plurality of copies of the tensor to create a plurality of duplicate tensors, assign, up to 'n' (one or more) first type of contexts and up to 'm' (one or more) of the second type of contexts to one or more duplicate tensors, such that such that no duplicate of the tensor has more contexts of a particular type than ports of that type, trim a duplicate tensor to retain portions including its corresponding assigned contexts and remove portions that are inconsequential to the assigned contexts, and dispatch the assigned contexts in the duplicate tensor to one or more of the plurality of the PMUs.

Disclosed herein is a method for a data processing system comprising: an array of reconfigurable units including a plurality of pattern compute units (PCUs) and a plurality of pattern memory units (PMUs), each of the plurality of the PMUs further comprising a memory having one or more first type of (read) I/O ports and one or more second type of (write) I/O ports, the method comprising: receiving by a compiler, a tensor including 'n' read memory access patterns or 'm' write memory access patterns located in a logical memory of the compiler, a read memory access pattern (read context) including a read memory access (read data region) and a write memory access pattern (write context) including a write memory access (write data region), creating by the compiler, a plurality of copies of the tensor to create a plurality of duplicate tensors, assigning by the compiler, up to 'n' read contexts or up to 'm' write contexts to one or more duplicate tensors, such that no duplicate tensor has more contexts of a particular type than ports of that type, trimming by the compiler, a duplicate tensor to retain portions including its corresponding assigned contexts and remove portions that are inconsequential to the assigned contexts, and dispatching by the compiler the assigned contexts in the duplicate tensor to one or more of the plurality of the PMUs.

Particular aspects of the technology disclosed are described in the claims, specification and drawings.

BRIEF DESCRIPTION OF THE DRAWINGS

FIG. 9 illustrates an example of a 2-d tensor 902 including multiple overlapping memory access patterns such as read access patterns (readers or read contexts) and write access pattern (writers or write contexts.)

FIG. 10C illustrates another example of an intermediate memory access pattern assignment schedule, according to embodiments disclosed herein.

FIG. 10D illustrates an example of a final (legal) memory access pattern assignment schedule, according to embodiments disclosed herein.

FIG. 13 illustrates the duplicates created including the assigned contexts as per the legal schedule shown in FIG. 10D, according to embodiments disclosed herein.

in which write bounds that are exclusive to each duplicate are determined.

Figure 18A:
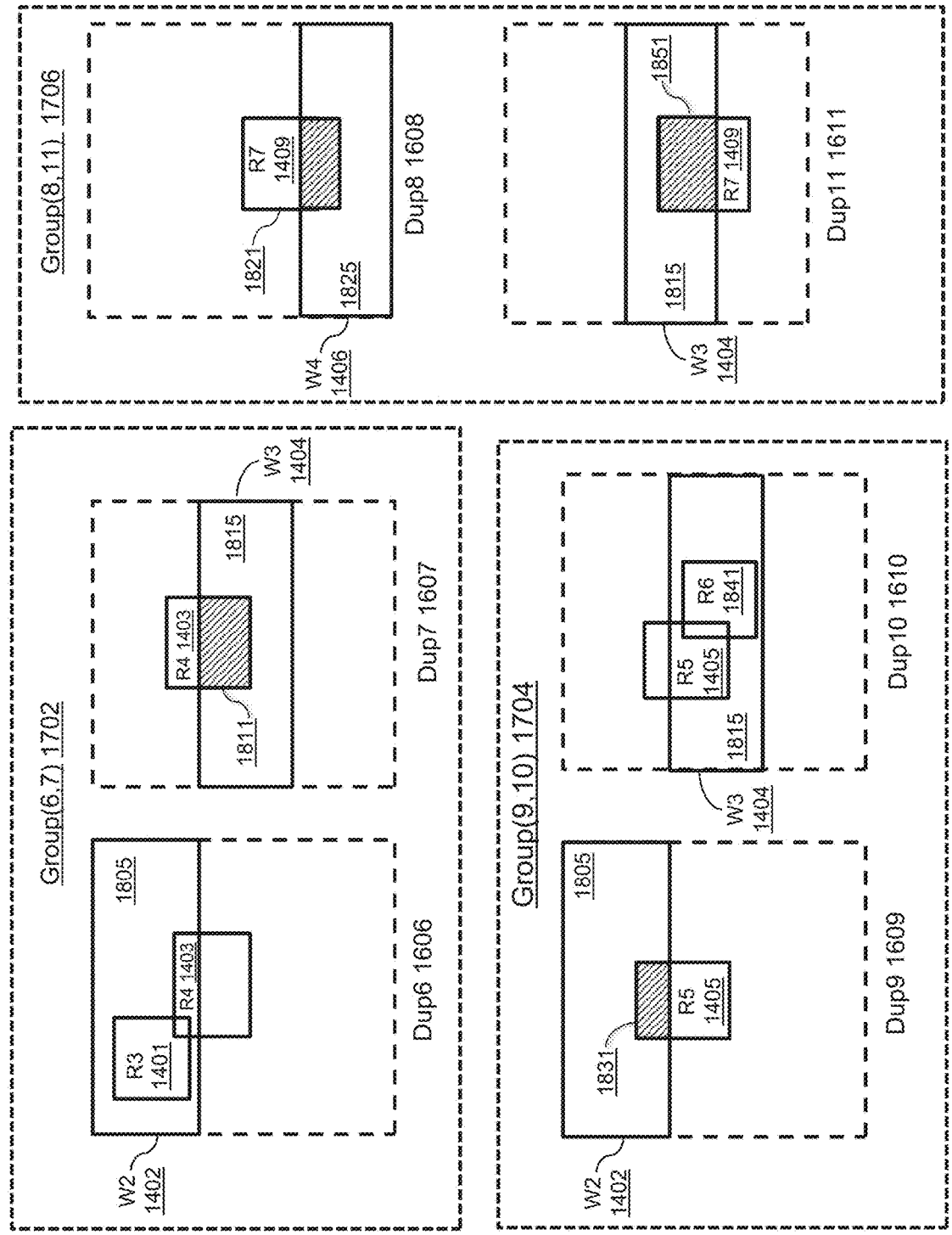
FIG. 18A illustrates an example in which a duplicate-level union of reads are determined for each duplicate, according to embodiments disclosed herein.
Figure 18B:
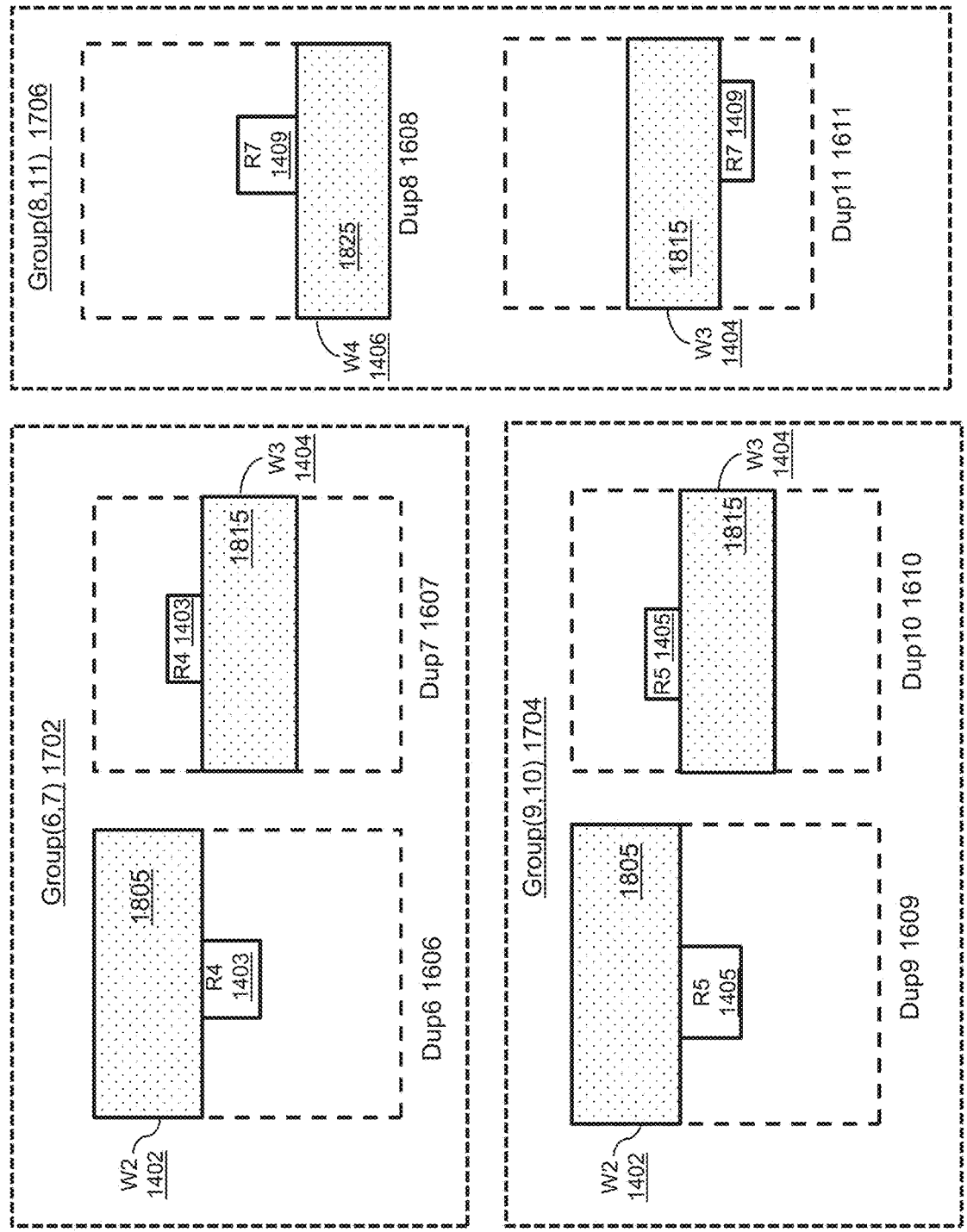
FIG. 18B illustrates an example in which a duplicate-level union of writes are determined for each duplicate, according to embodiments disclosed herein.
Figure 18C:
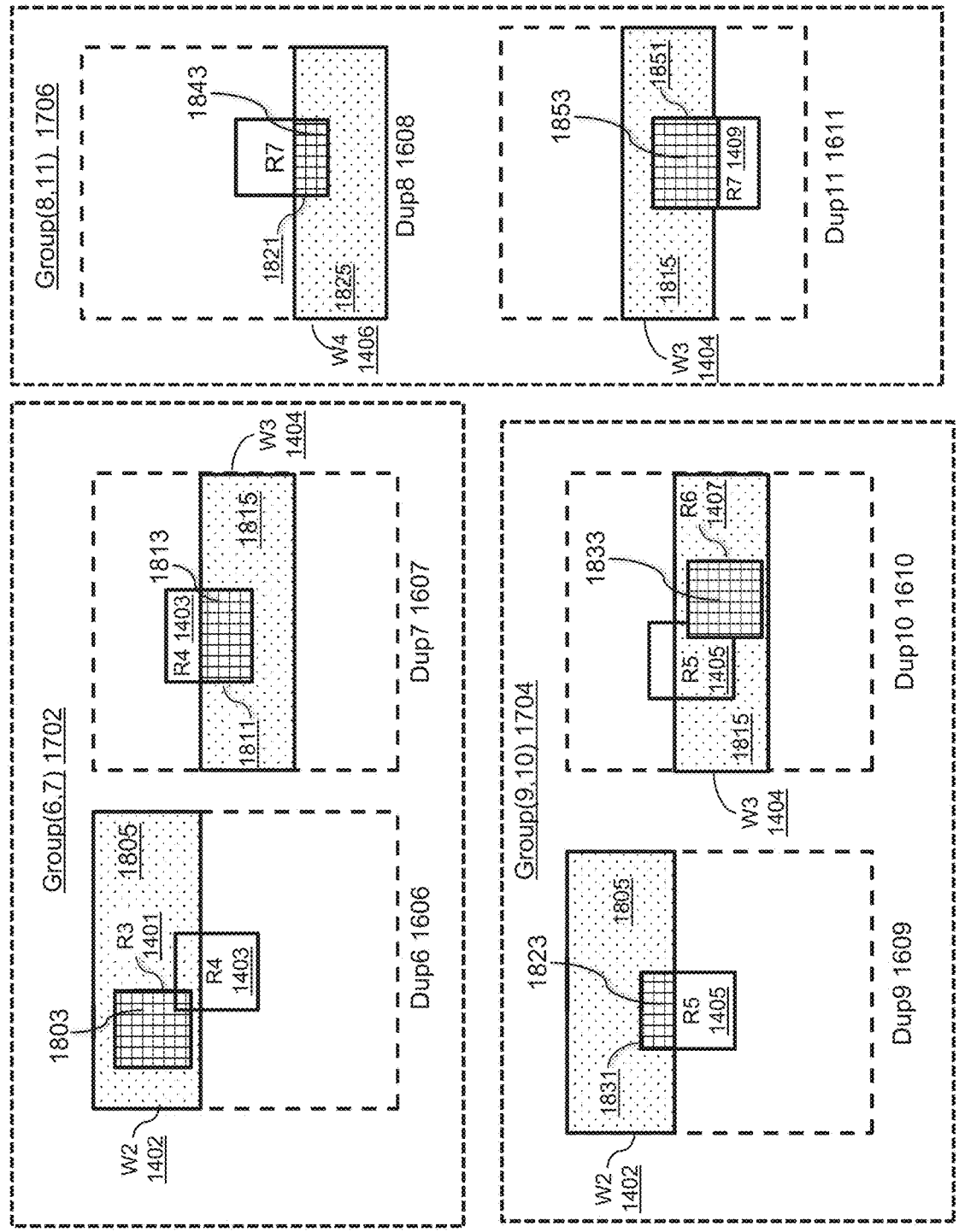
FIG. 18C illustrates an example in which a duplicate-level union of both reads and writes are shown, according to embodiments disclosed herein.
Figure 18D:
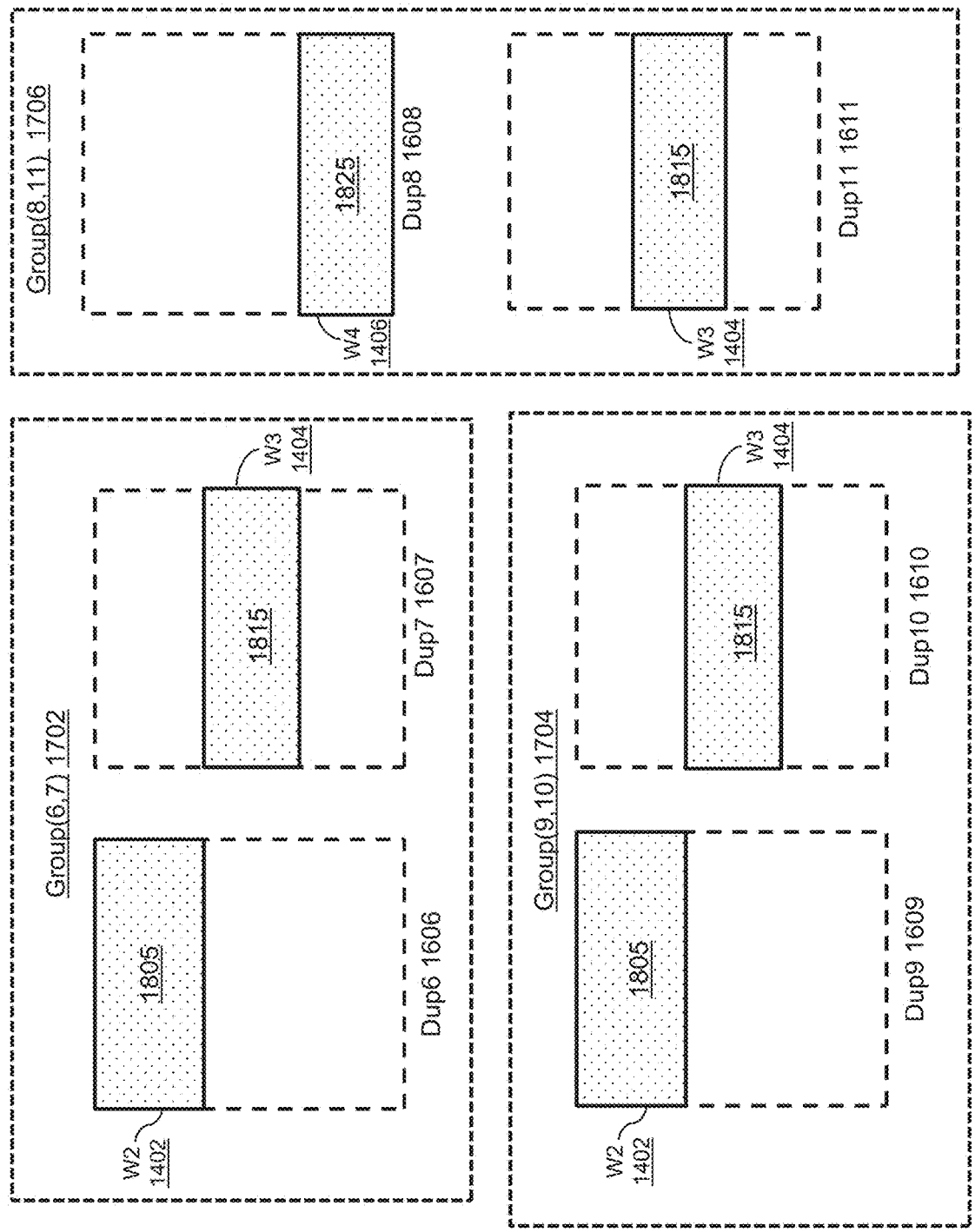

FIG. 18D illustrates an example in which write bounds that are exclusive to each duplicate are determined, according to embodiments disclosed herein.

Figure 18E:
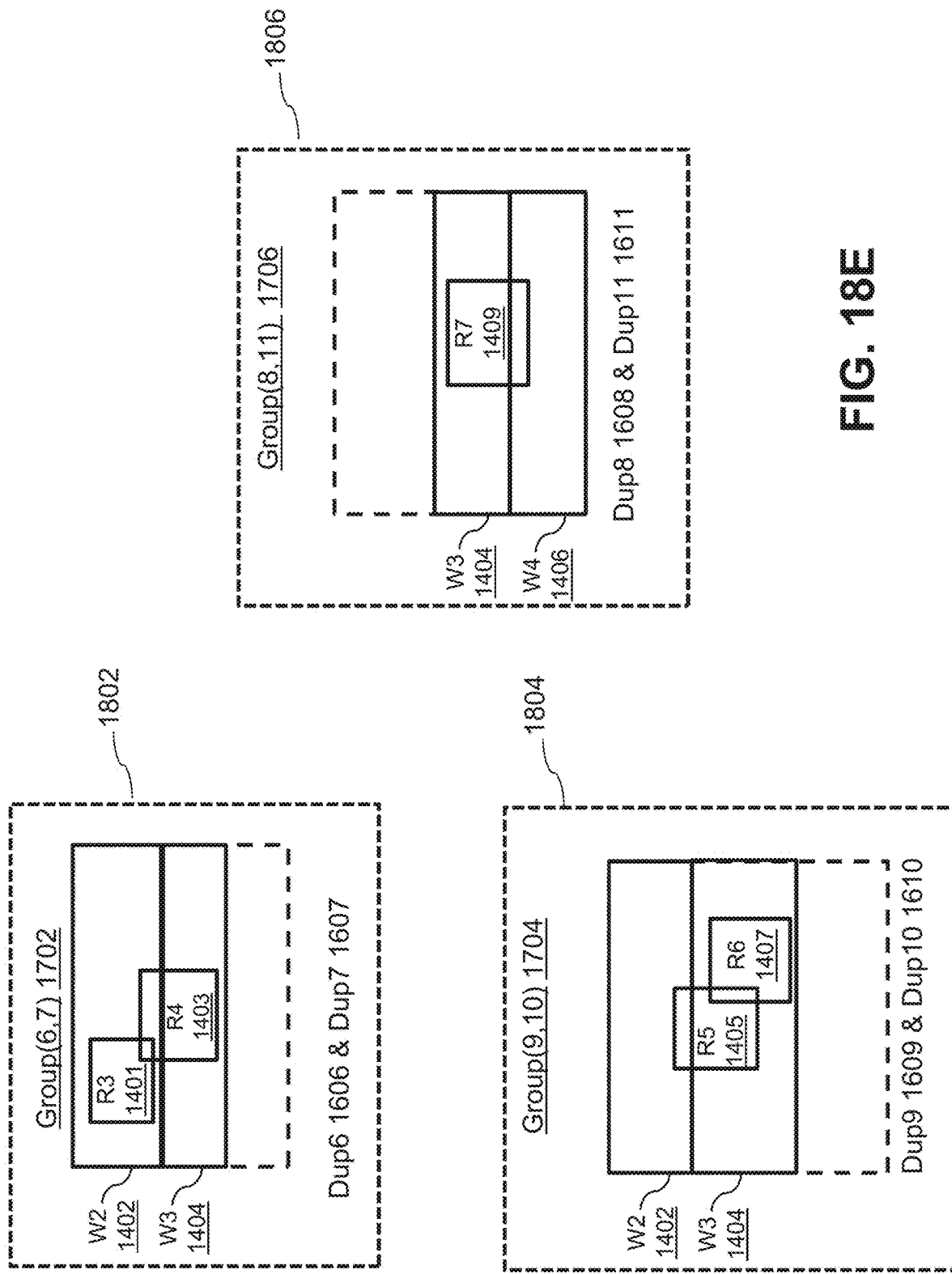

FIG. 18E illustrates an example in which a group-level union of reads is determined, according to embodiments disclosed herein.

Figure 18F:
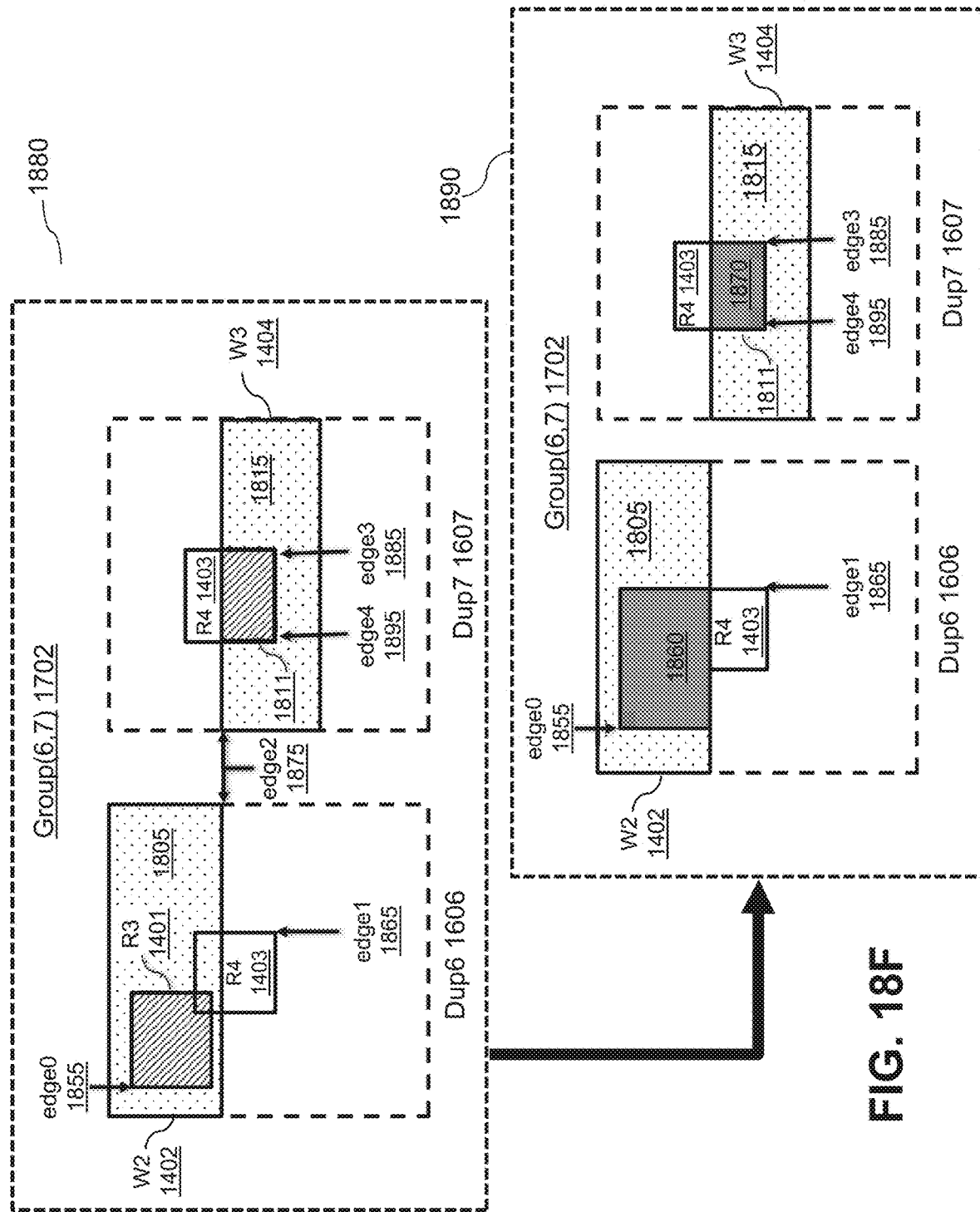

FIG. 18F illustrates a first example in which dataframe bounds in a duplicate is extended until contiguity and completeness conditions are satisfied, according to embodiments disclosed herein.

Figure 18G:
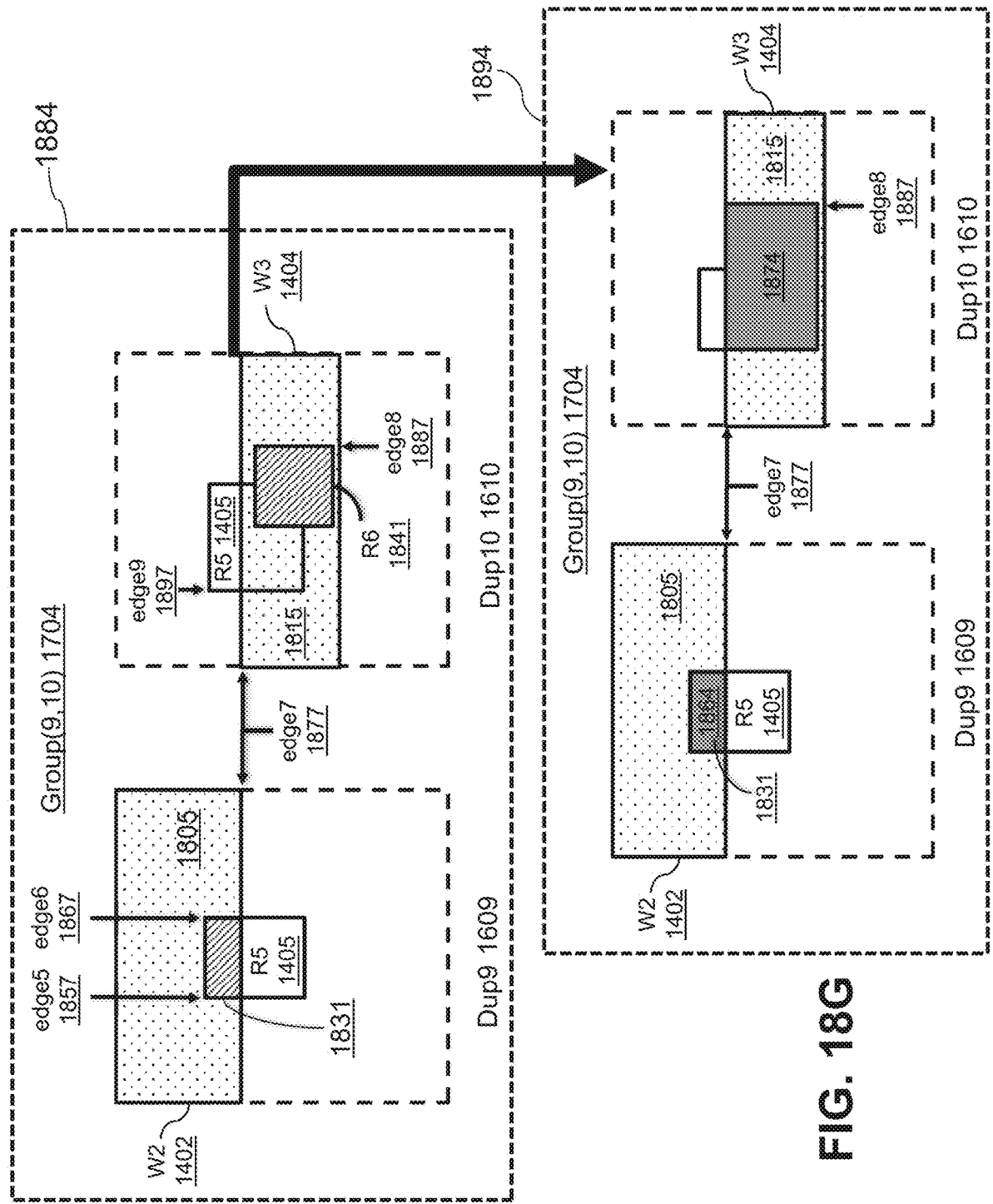

FIG. 18G illustrates a second example in which dataframe bounds in a duplicate are extended until contiguity and completeness conditions are satisfied, according to embodiments disclosed herein.

Figure 18H:
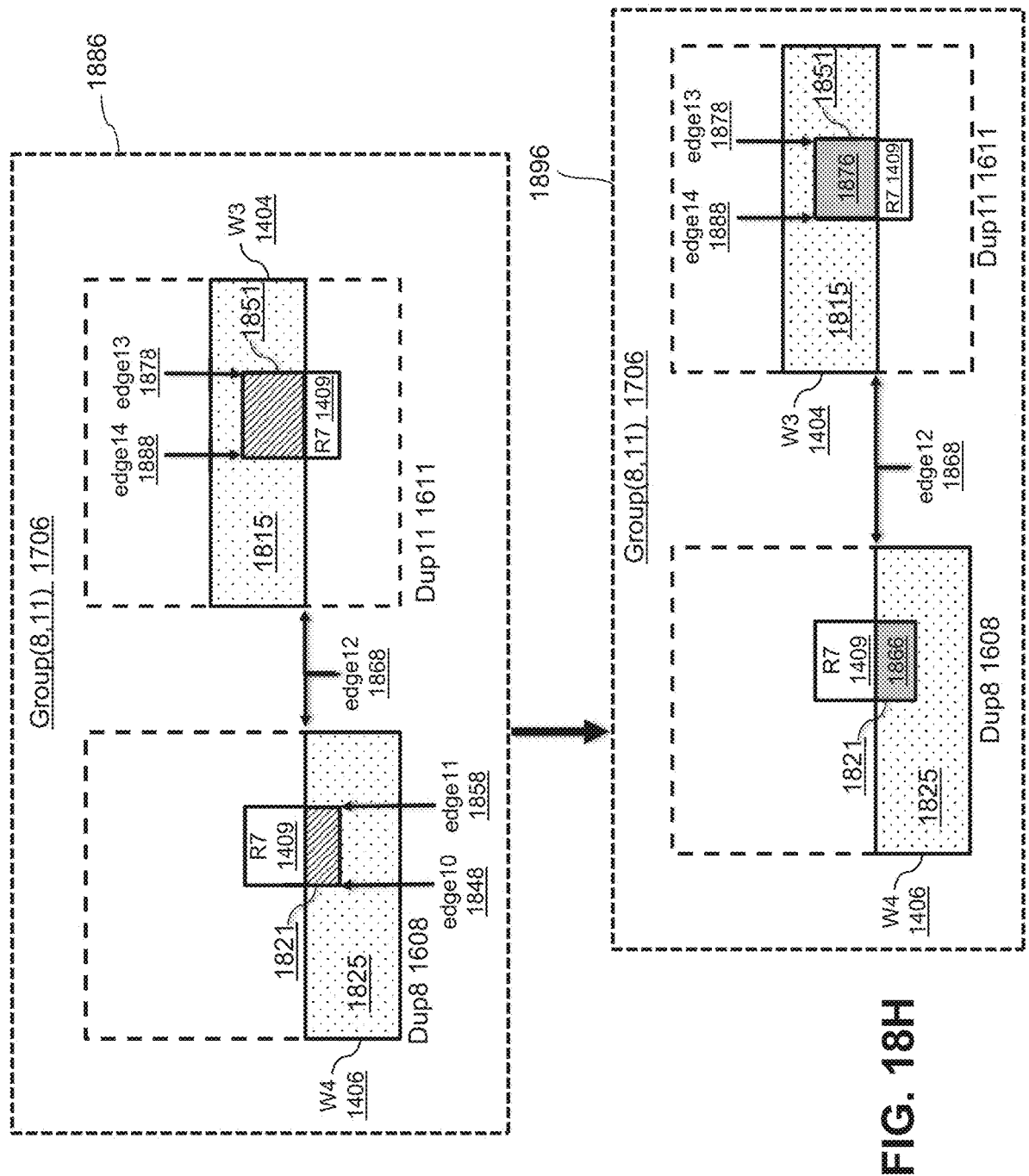

FIG. 18H illustrates a third example in which dataframe bounds in a duplicate are extended until contiguity and completeness conditions are satisfied, according to embodiments disclosed herein.

Figure 18I:
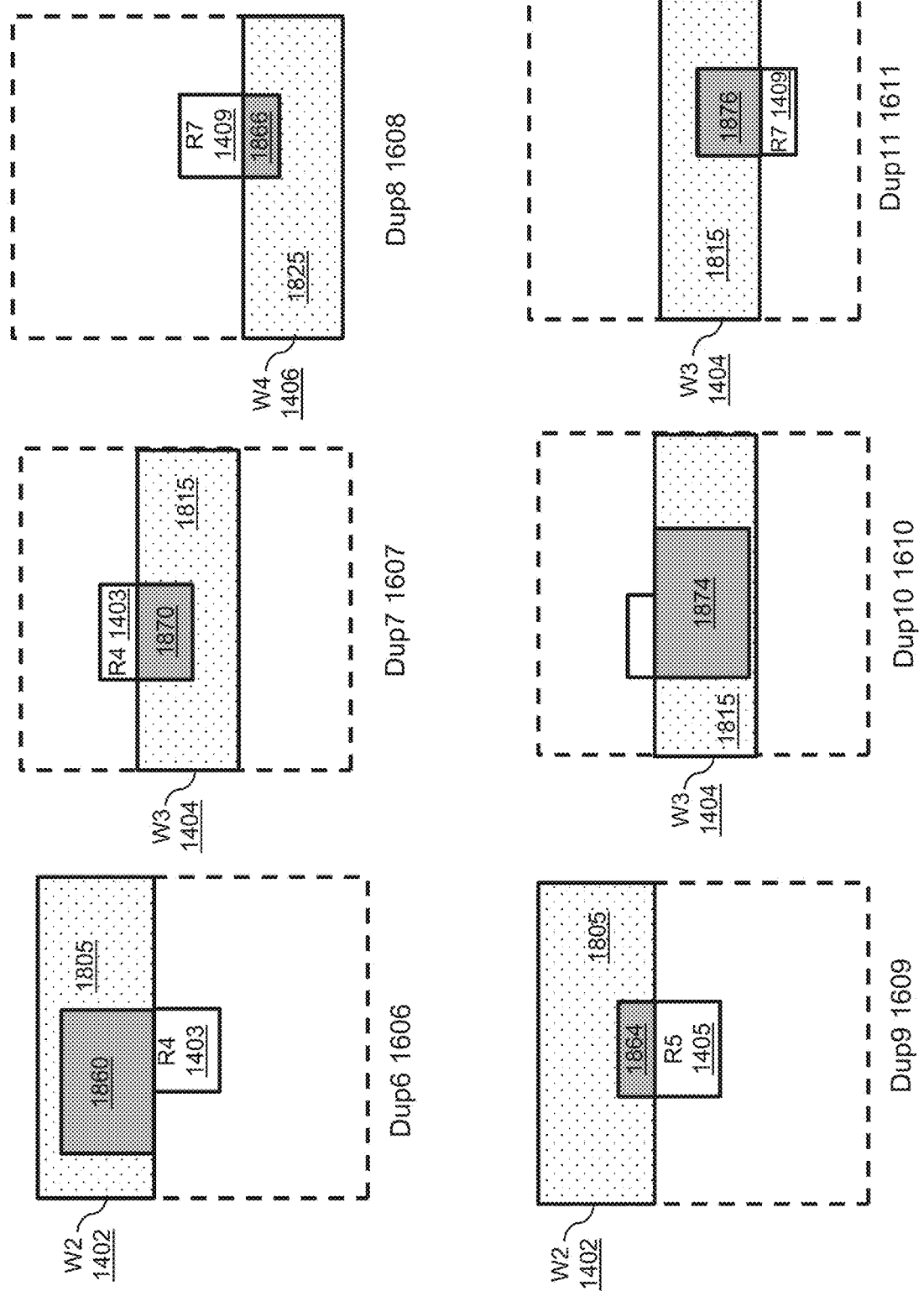

FIG. 18I illustrates an example of all resultant duplicates after the dataframe bounds in those have been extended as per the above conditions, according to embodiments disclosed herein.

Figure 19:
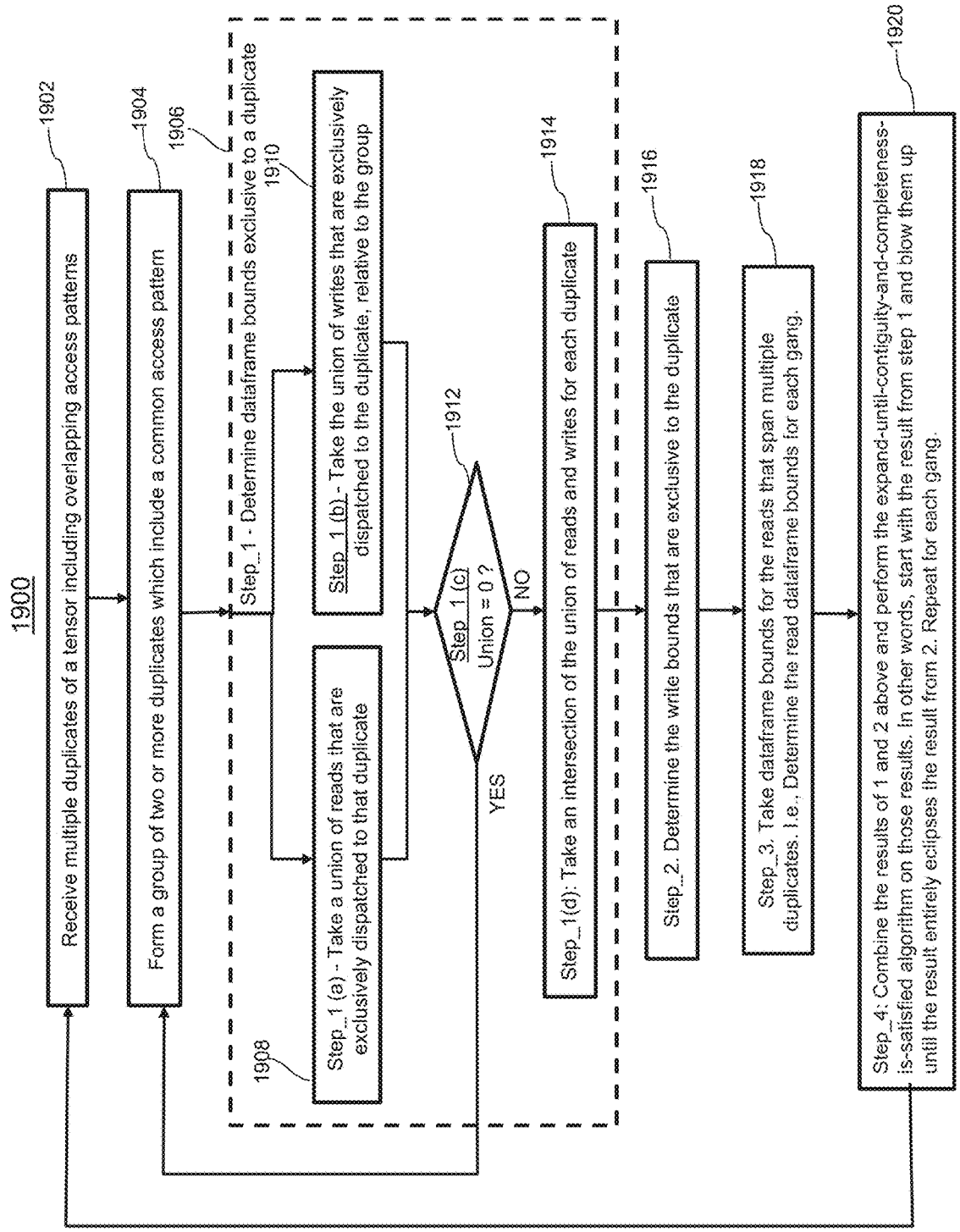

FIG. 19 illustrates an example flow diagram 1900 of a method for trimming a tensor duplicate with common contexts (in this case readers), according to embodiments disclosed herein.

Figure 20:
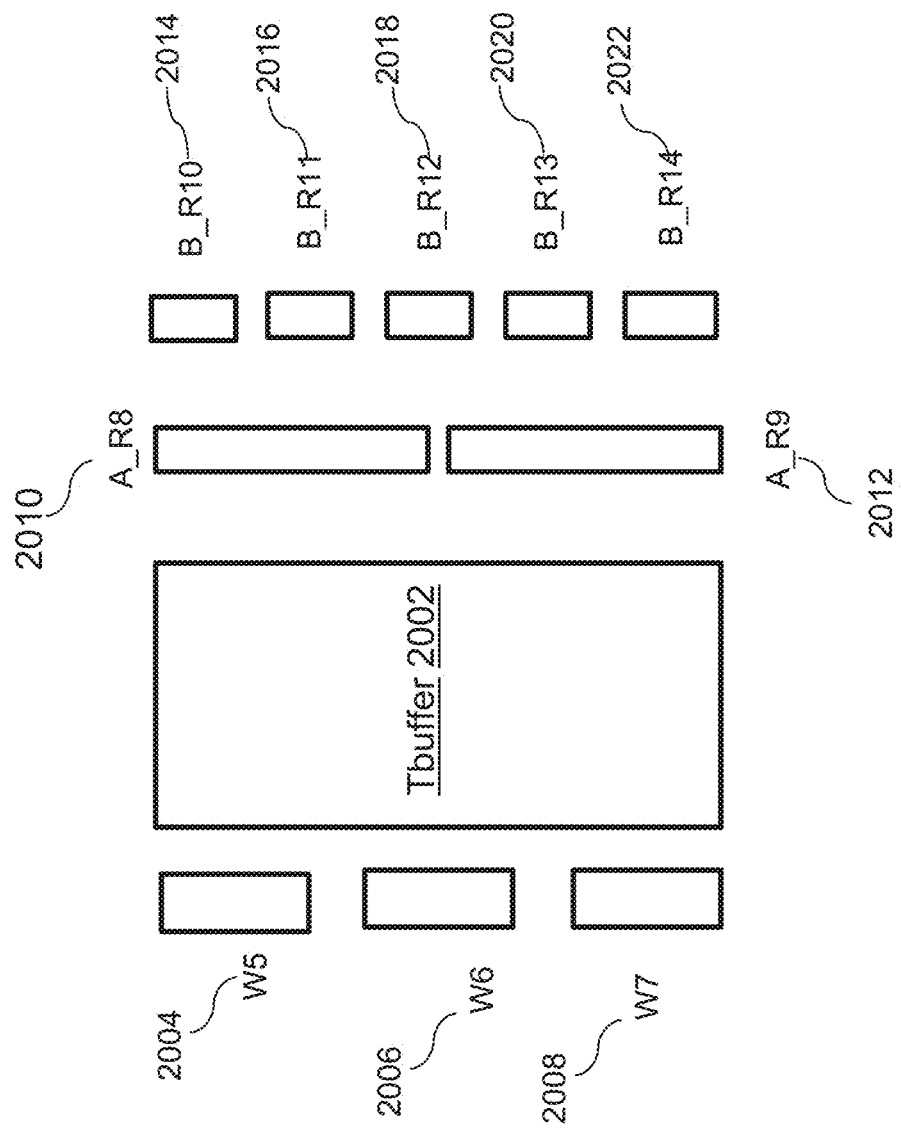

FIG. 20 illustrates an example of a 1-d tensor 2002 including multiple memory access patterns, according to embodiments disclosed herein.

FIG. 21A illustrates an example of an initial memory access pattern assignment schedule for the 1-d tensor shown in FIG. 20, according to embodiments disclosed herein.

FIG. 21B illustrates an example of a final (legal) memory access pattern assignment schedule for the tensor shown in FIG. 20, according to embodiments disclosed herein.

Figure 13:
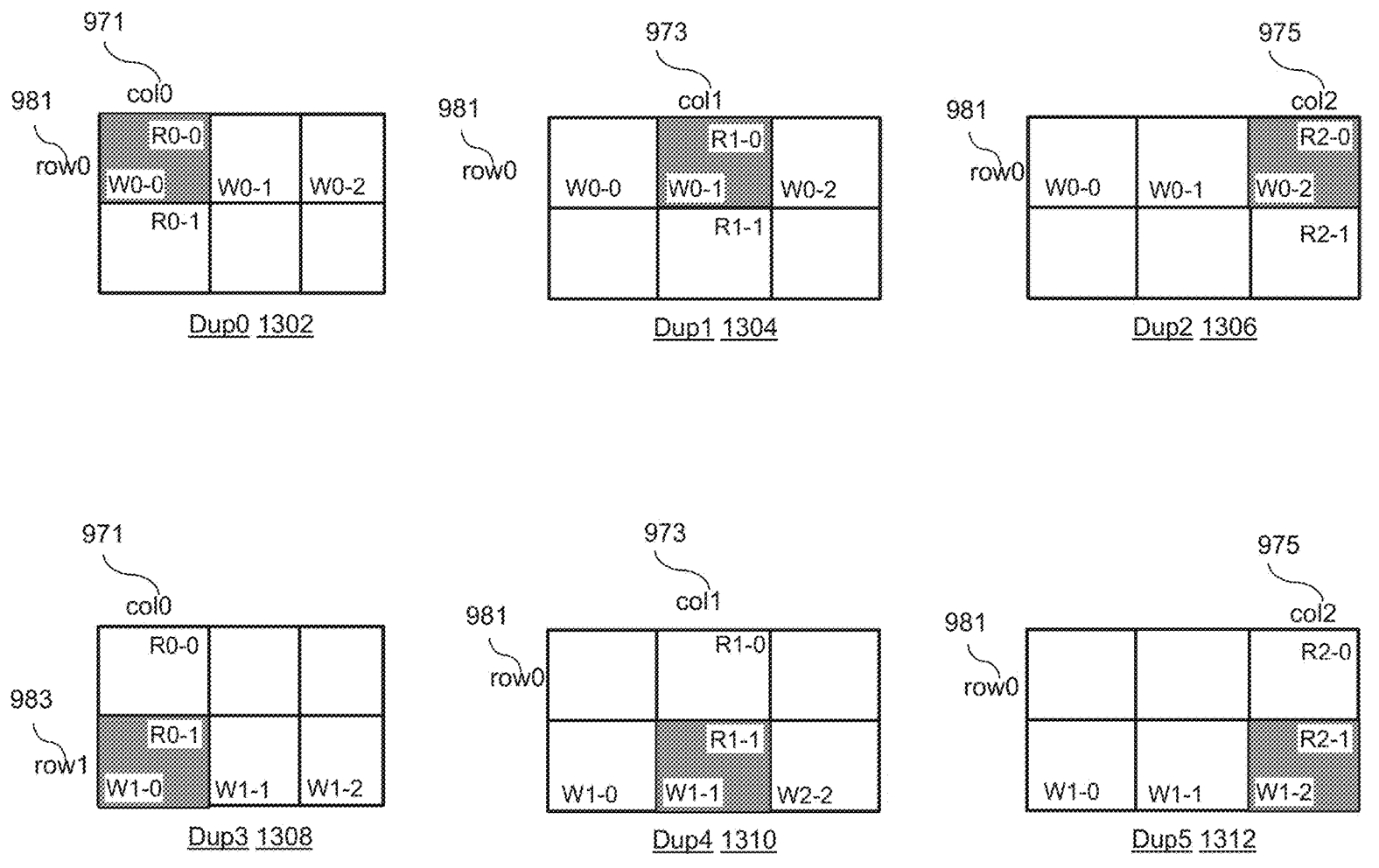
Figure 13A:
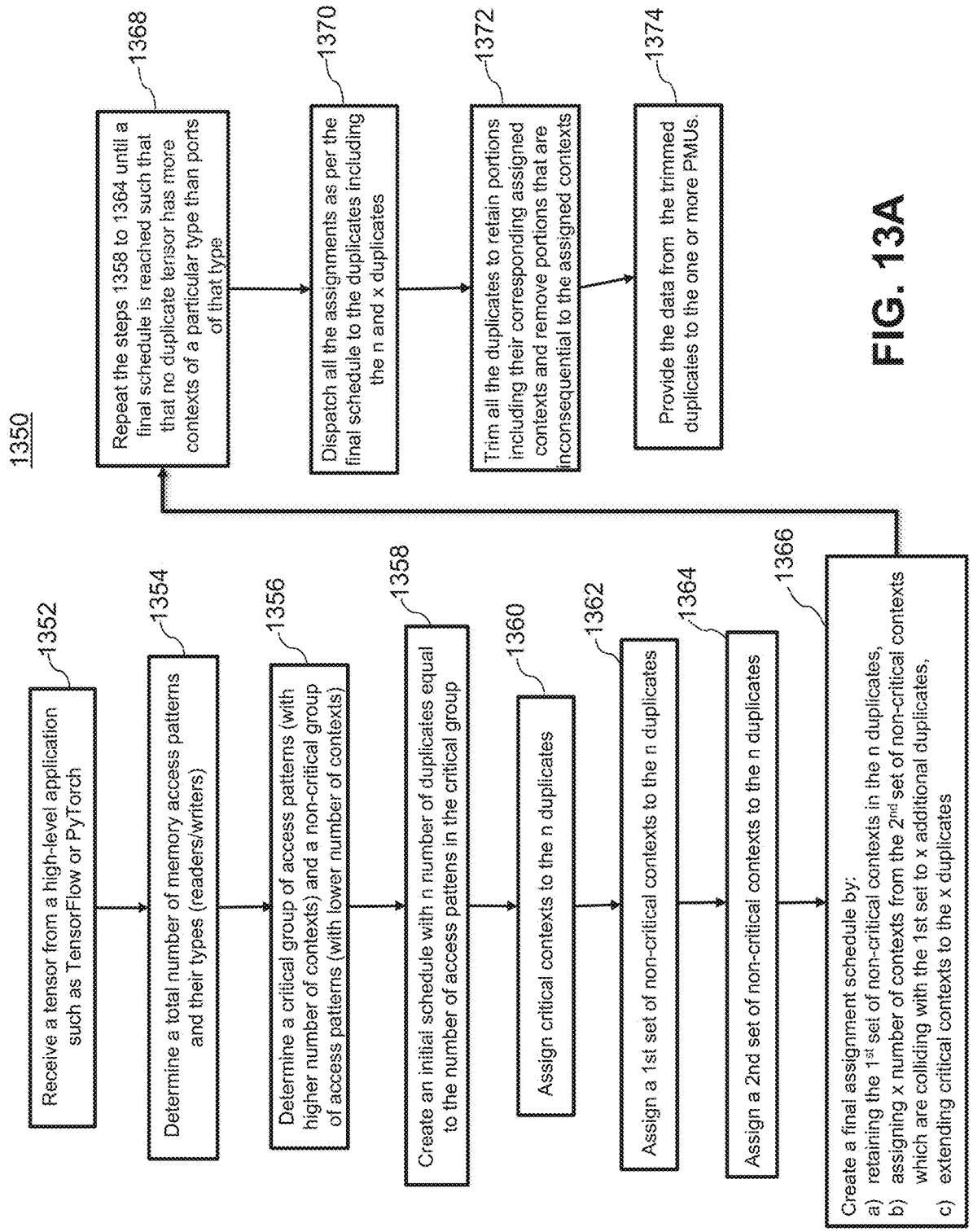
FIG. 13A illustrates an example flow diagram of a method for a compiler to perform the tensor duplication and analysis, according to embodiments disclosed herein.

FIG. 22 illustrates an example pseudocode corresponding to portions of the method shown in FIG. 13A, according to embodiments disclosed herein.

DETAILED DESCRIPTION

The following detailed description is made with reference to the figures. Example implementations are described to illustrate the technology disclosed, not to limit its scope, which is defined by the claims. Those of ordinary skill in the art will recognize a variety of variations on the description that follows.

In systems with coarse grain reconfigurable (CGR) processors, data graphs (e.g., deep learning graphs) are compiled and translated into configuration bits files, which are loaded onto arrays of reconfigurable units (pattern compute units (PCUs) and pattern memory units (PMUs)). The CGR processors then process these data flow graphs during which the PCUs execute the read and write tasks for performing computations, whereas the PMUs provide pipelined data paths to the neighboring PCUs for the tasks to be performed.

During execution of a graph, the data from tensors needs to make many read and write accesses to memory. These memory accesses are initially represented by a user in the form of tensors (Tbuffers) which show the logical memory address space.

Figure 5:
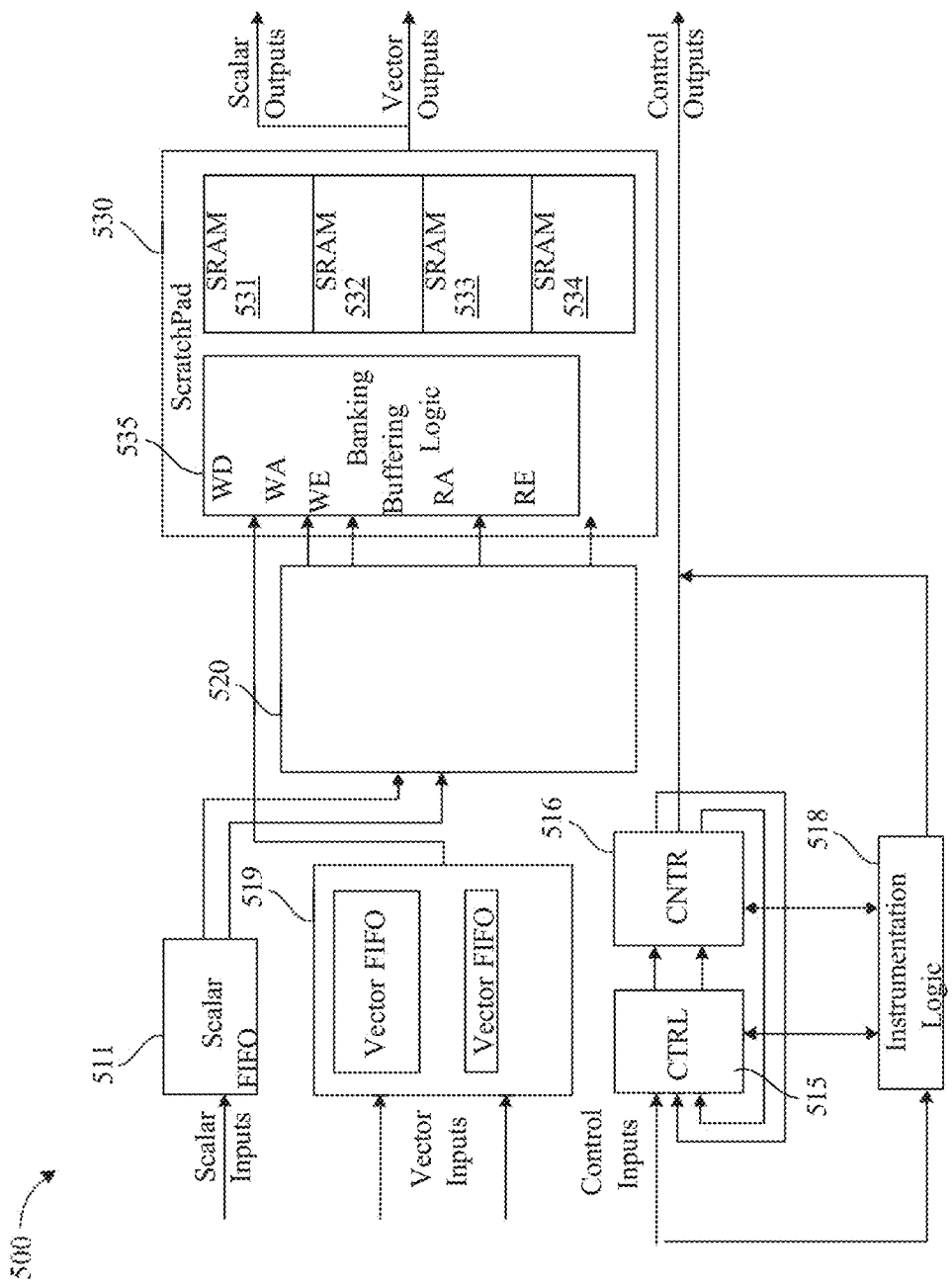
FIG. 5 is a block diagram illustrating an example configurable memory unit.

The logical memory address space needs to be mapped to a physical memory address space which is in the form of one or more banks in the PMUs. Examples of such banks are shown in FIG. 5 as scratchpad memory 530, also shown as SRAM 530. For achieving this, the compiler has to first determine how to allocate the tensor data to those PMUs in parallel, which can process the data in an efficient manner. Moreover, relevant data has to be dispatched to the relevant PMUs, in parallel.

Disclosed herein is a technology, which performs non-overlapping parallelization of data in a user's program memory (also known as "logical memory") to the CGR memory in the form of PMUs (also known as "physical memory.") The data in the user's program memory is represented in the form of tensors. In other words, disclosed herein are systems and methods to perform a logical-to-physical mapping of tensor data and the analysis required to compute this logical-to-physical mapping. The disclosed technology further involves five major components:

- Memory access analysis to formulate the problem in the polyhedral model using polytopes
- Assignment of memory accesses into a global dispatch space
- Tensor trimming analysis to minimize the memory footprint of each dispatch
- Resource-saving optimizations to implement the schemes most efficiently on the PMU architecture (predication+minmax)
- Pacing window analysis to determine the granularity that packets should be sent between the data PMUs and a reorder buffer (ROB) such that those arrive at the ROB in order.

The following definitions may be helpful in understanding this detailed description:

a. Tensor Indexing Expression: A block of source code that references a tensor and specifies indexing operations for accessing the tensor and performing corresponding mathematical operations. The source code could be high-level user-specified source code or a compiler-generated intermediate representation thereof.

b. Logical memory: Memory referenced in a user program such as memory referenced by tensor indexing expressions.

c. Compute unit: A processor that performs mathematical operations on tensors. The processor may be vectorized and operate on an entire vector or submatrix (e.g., in a single cycle). It may also be referred to as a 'pattern compute unit' (PCU).

d. Memory unit: A block of scratchpad memory typically used for sourcing and receiving tensor computations. As described elsewhere herein, memory units are assumed to operate cooperatively with compute units and may be provided with an address generator to generate a pattern of read/write memory addresses to facilitate sourcing data to, and/or receiving data from, compute units. It may also be referred to as a 'pattern memory unit' (PMU). A group of memory units may be referred to as a memory bank.

e. Switching/communication fabric: A switching fabric that interconnects arrays of compute units and arrays of memory units and enables the routing of tensor data between compute units, memory units and external ports.

f. Logical banking/partitioning solution: A memory banking/partitioning solution that maps to 'logical/virtual' memory units (e.g., PMUs) of unlimited size. May also be referred to as a virtual banking/partitioning solution.

g. Physical banking/partitioning solution: A memory banking/partitioning solution that maps to physical memory units (e.g., PMUs) of limited size.

h. Banking/partitioning solution: A memory banking/partitioning solution which could be 'logical/virtual' or 'physical'.

i. RAIL banking: This refers to the logical partitioning of TBuffers into one or more PMUs based on parallel/concurrent access patterns.

j. Resource Demand: The quantity of resources required (e.g., number of read ports or write ports) for unhindered computation and dataflow.

k. Resource Conflict: A situation where the required resources exceed the available or allocated resources.

l. Reader: A read access pattern which is mapped to a user's logical memory address space in a tensor.

m. Writer: A write access pattern which is mapped to a user's logical memory address space in a tensor.

n. Dataframe Range: The hypercube within the tensor where a duplicate must keep data.

o. Response Range: The hypercube within the tensor where a specific duplicate must respond (i.e., either send data, zero-predicate packet, or const-predicate packet. The dataframe must always be a subset that is equal to or smaller than the response range.

p. Reorder Buffer: A buffer used to put two read data portions in the correct order.

q. Duplicate gang: A group of duplicates that are chained together by duplicate-merging ROBs.

FIG. 1A-1C and FIGS. 2-5 show one example of an environment wherein the present invention may be deployed and provide more information on compute units, memory units and address generators.

Figure 1A:
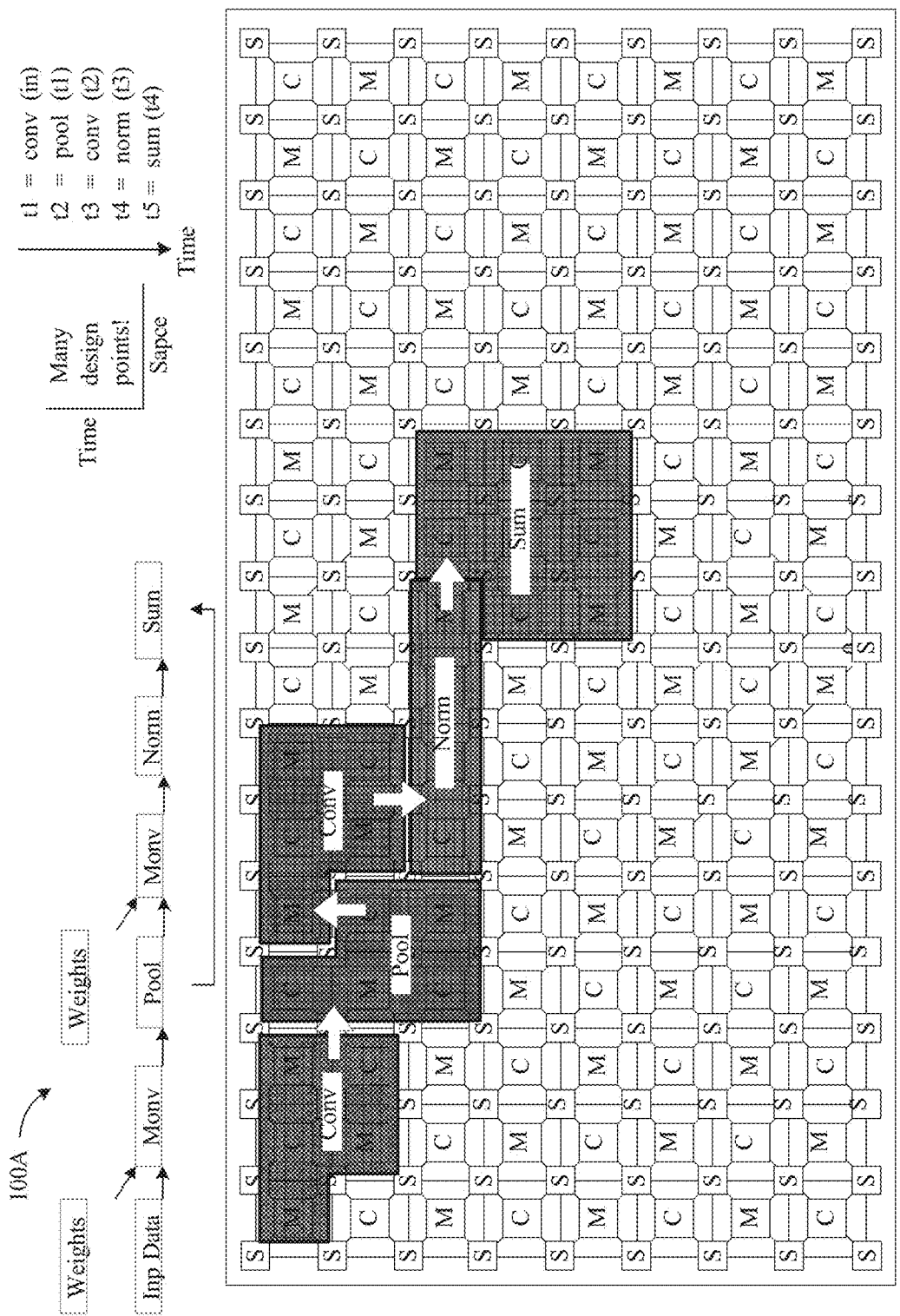
FIG. 1A is a layout diagram illustrating a CGRA (Coarse-Grained Reconfigurable Architecture) suitable for dataflow computing.
Figure 1B:
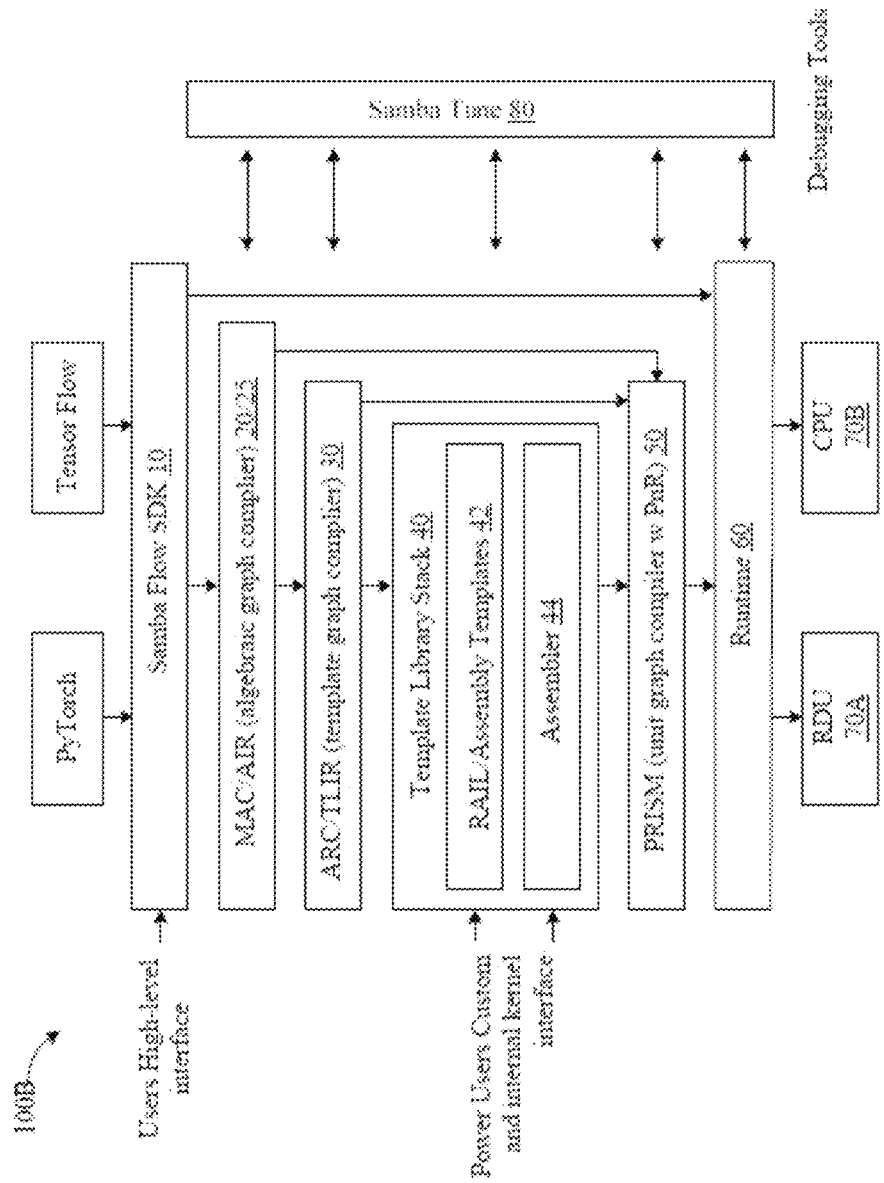
FIG. 1B is a block diagram of a compiler stack suitable for a CGRA (Coarse-Grained Reconfigurable Architecture).

Referring now to FIGS. 1A and 1B, FIG. 1A is a layout diagram illustrating a CGRA (Coarse Grain Reconfigurable Architecture) 100A suitable for dataflow computing. The depicted CGRA comprises compute units and memory units interleaved into a computing grid. The compute units and memory units as well as address generation units (not shown in FIG. 1A) may be reconfigurable units that support dataflow computing. One or more instances of the depicted CGRA computing grid along with some external communication ports (not shown) may be integrated into a computational unit referred to as an RDU (Reconfigurable Dataflow Unit).

The architecture, configurability and dataflow capabilities of the CGRA enables increased computing power that supports both parallel and pipelined computation. Consequently, the CGRA represents a computing paradigm shift that provides unprecedented processing power and flexibility. Leveraging the parallel, pipelined, and reconfigurable aspects of the CGRA adds new dimensions of complexity that requires a fundamentally new instruction compilation process and software stack.

While traditional compilers sequentially map operations to processor instructions, typically without regard to pipeline utilization and duration (a task usually handled by the hardware), the course-grained reconfigurable computing grid requires mapping operations to processor instructions in both time and space. Furthermore, while communication through the memory hierarchy of traditional (e.g., von Neumann) computers is implicitly sequential and handled by hardware, dataflow compilers map both sequential (including pipelined) operations and parallel operations to instructions in time and in space and may also program the communication between the compute units and memory units.

The depicted example, which illustrates typical machine learning operations on images, includes two stages of convolution operations that are augmented with a pooling stage, a normalization stage, and a summing stage. One of skill in the art will appreciate that the depicted stages may be used as a highly efficient pipeline if the throughputs of the stages are appropriately matched. One of skill in the art will also appreciate that other operations and tasks may be executing in parallel to the depicted operations and that the allocation of resources must be spatially and temporally coordinated. Consequently, compiler (and optionally programmer) assignment of compute and memory resources to the various stages of processing (both spatially and temporally) has a direct effect on resource utilization and system performance.

FIG. 1B is a block diagram of a compiler stack 100B suitable for a CGRA (Coarse Grain Reconfigurable Architecture). As depicted, the compiler stack 100B includes a number of stages or levels that convert high-level algorithmic expressions and functions (e.g., PyTorch and TensorFlow expressions and functions) to configuration instructions for the reconfigurable units of the CGRA.

The SambaFlow SDK 10 converts user selected and configured algorithms and functions from high-level libraries such as PyTorch and TensorFlow to computational graphs. The nodes of the computational graphs are intrinsically parallel unless a dependency is indicated by an edge in the graph.

The MAC (Model Analyzer and Compiler) level 20 makes high-level mapping decisions for (sub-graphs of the) computational graphs based on hardware constraints. The depicted embodiment supports various application frontends such as Samba, JAX, and TensorFlow/HLO. The MAC may also transform the graphs via autodiff and GradNorm, perform stitching between sub-graphs, interface with template generators for performance/latency estimation, convert Samba operations to AIR (Arithmetic/Algebraic Intermediate Representation) operations, perform tiling, sharding and section cuts and model/estimate the parallelism that can be achieved on the computational graphs.

The AIR level 25 translates high-level graph and mapping decisions provided by the MAC level into explicit TLIR (Template Library Intermediate Representation) graphs. The key responsibilities of the AIR level 25 include legalizing the graph and mapping decisions of the MAC, expanding data parallel, tiling, metapipe, region, and hypersection instructions provided by the MAC, converting AIR operations to TLIR operations, inserting stage buffers and skip buffers, eliminating redundant operations, buffers and sections and optimizing for resource use, latency, and throughput.

The ARC level 30 translates mid-level (e.g., TLIR) graphs provided by AIR into Prism source code optimizing for the target hardware architecture and legalizes the dataflow graph through each performed step. The translating is accomplished by converting IR (intermediate representation) operations to appropriate Prism/RAIL (RDU Abstract Intermediate Language) templates, stitching templates together with dataflow and control-flow, inserting necessary buffers and layout transforms, generating test data and optimizing for resource use, latency, and throughput.

The template library stack (or RAIL layer) 40 provides a library of templates 42 and functions to leverage those templates. The templates 42 are containers for common operations. Templates may be implemented using Assembly or RAIL. While RAIL is similar to Assembly in that memory units and compute units are separately programmed, RAIL provides a higher level of abstraction and compiler intelligence via a concise performance-oriented DSL (Domain Specific Language) for RDU templates. RAIL enables template writers and external power users to control the interactions between the logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs). RAIL also enables event handle allocation.

The Assembler level 44 provides an architecture agnostic low-level programming model as well as optimization and code generation for the target hardware architecture. Responsibilities of the Assembler include address expression compilation, intra-unit resource allocation and management, legalization with target-specific rules, low-level architecture-specific transformations and optimizations, and architecture-specific code generation.

The Prism layer 50 translates ARC template graphs to a physical chip mapping, generates code for the target hardware architecture, legalizes and lowers dataflow graphs to the physical network (e.g., PCUs, PMUs and switches) and produces PEF (Processor Executable Format) files. The Prism layer 50 also conducts PNR (Place and Route) by generating bandwidth calculations, determining the placement of PMUs and PCUs, allocating AGCUs (address generation control units) and VAGs (Virtual Address Generators), selecting PCM/PCU ports and generating configuration information for compute grid switches to enable data routing.

The runtime layer 60 controls execution of the physical level dataflow graphs on actual hardware such the RDU 70A and/or CPU 70B. SambaTune 80 is a set of debugging tools that can facilitate users to perform deadlock and performance debugging RDUs. SambaTune 80 can summarize and visualize instrumentation counters from the RDU that can guide users to identify performance bottlenecks and eliminate by tuning various control parameters.

Array Level Network (ALN)—A Flexible Network for Dataflow Processing

Referring now to FIG. 1C through FIG. 5 generally, a tile of an embodiment of a coarse-grain reconfigurable architecture (CGRA) is based on an array of fused compute-memory units (FCMUs), pattern memory units (PMUs), and/or pattern compute units (PCUs) arranged in two dimensions, M×N. Unless clearly noted from context, any reference to a FCMU, PCU, or PMU may refer to one or more of the other units. The communication between a set of FCMUs is performed over a (M+1)×(N+1) switch fabric called the array-level network (ALN) where each switch has connections to its neighboring FCMUs and to neighboring switches in each of the four directions.

The ALN includes three physical networks-Vector, Scalar and Control. The vector network and scalar networks are packet switched whereas the control network is circuit switched. Each vector packet consists of a vector payload and a header that includes information such as the packet's destination, sequence ID, virtual channel (aka flow control class) etc. Each scalar packet contains a word (32-bits) of payload and a header containing the packet's destination and the packet's type. The Control network consists of a set of single bit wires where each wire is pulsed to transmit a specific control token providing distributed control to orchestrate the execution of a program across multiple FMCUs. The scalar network can also be used to carry control information by overloading a scalar packet using its packet type field.

Parallel Applications such as Machine Learning, Analytics, and Scientific Computing require different types of communication between the parallel compute units and the distributed or shared memory entities. These types of communication can be broadly classified as point-to-point, one-to-many, many-to-one and many-to-many. The ALN enables these communication types through a combination of routing, packet sequence ID and flow control.

Routing of packets on the vector and scalar networks is done using two mechanisms—2D Dimension Order Routing (DOR) or using a software override using Flows. Flows can be used for multiple purposes such as to perform overlap-free routing of certain communications and to perform a multicast from one source to multiple destinations without having to resend the same packet, once for each destination.

Sequence ID based transmissions allow the destination of a many-to-one communication to reconstruct the dataflow order without having to impose restrictions on the producer/s. The packet switched network provides two flow control classes-end to end flow controlled and locally flow controlled. The former class of packet, VC_B, is released by a producer only after ascertaining that the consumer has space for it. The latter class of packet, VC_A, is loosely flow controlled and released into the network without knowing if the receiver has space for it. VC_A packets are used for performance critical communication where a non-overlapping route can be provided between the producer and consumer.

The core component of the ALN is the ALN switch. A packet or control pulse enters the ALN through an interface between the producing FCMU(X) and one of its adjacent switches. While in the ALN, the packet/pulse takes some number of hops until it reaches a switch adjacent to the consumer FCMU (Y). Finally, it takes the interface to Y to complete the route.

When a packet reaches a switch's input port, it is first inspected to see if it should be dimension order routed or flow routed. If it is the former, the destination ID is mapped to a unique output port. If it is the latter, the flow ID of the incoming packet is used to index into a table that identifies the output ports to route the packet to.

Packets from the two different flow control classes, VC_A and VC_B, are managed differently at the source port of every switch. Since VC_B packets are end-to-end flow controlled, they are always allowed to make forward progress through it regardless of the blocking conditions on VC_A packets.

Figure 1C:
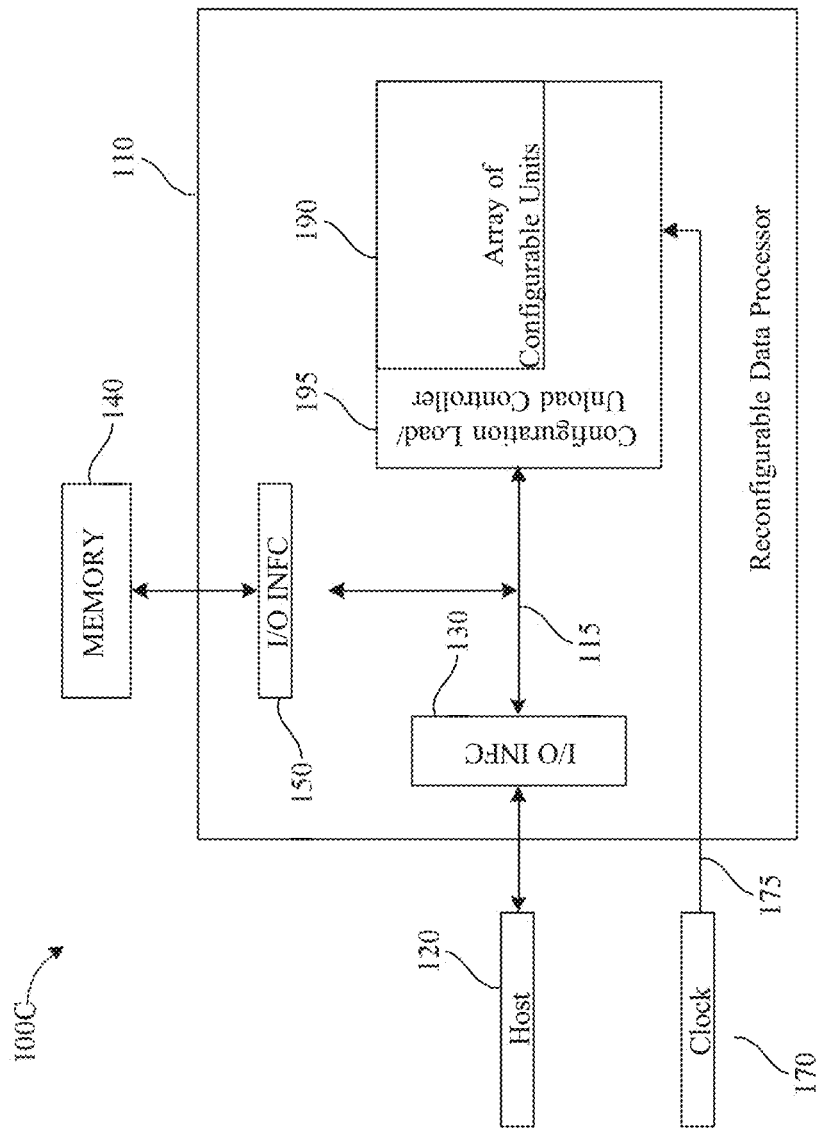
FIG. 1C is a system diagram illustrating a system including a host, a memory, and a coarse grain reconfigurable (CGR) processor.

FIG. 1C is a system diagram illustrating a system 100C including a host 120, a memory 140, and a CGR processor 110. As shown in the example of FIG. 1C, the CGR processor 110 includes an array 190 of configurable units and a configuration load/unload controller 195. The phrase "configuration load/unload controller", as used herein, refers to a combination of a configuration load controller and a configuration unload controller. The configuration load controller and the configuration unload controller may be implemented using separate logic and data path resources or may be implemented using shared logic and data path resources as suits a particular embodiment. In some embodiments, a system may include only a configuration load controller of the types described herein. In some embodiments, a system may include only a configuration unload controller of the types described herein.

The processor 110 includes an external I/O interface 130 connected to the host 120, and external I/O interface 150 connected to the memory 140. The I/O interfaces 130, 150 connect via a bus system 115 to the array 190 of configurable units and to the configuration load/unload controller 195. The bus system 115 may have a bus width that carries one chunk of data, which can be for this example 128 bits (references to 128 bits throughout can be considered as an example chunk size more generally). In general, a chunk of the configuration file can have N bits of data, and the bus system can be configured to transfer N bits of data in one bus cycle, where N is any practical bus width. A sub-file distributed in the distribution sequence can consist of one chunk, or other amounts of data as suits a particular embodiment. Procedures are described herein using sub-files consisting of one chunk of data each. Of course, the technology can be configured to distribute sub-files of different sizes, including sub-files that may consist of two chunks distributed in two bus cycles for example.

To configure configurable units in the array 190 of configurable units with a configuration file, the host 120 can send the configuration file to the memory 140 via the interface 130, the bus system 115, and the interface 150 in the CGR processor 110. The configuration file can be loaded in many ways, as suits a particular architecture, including in data paths outside the configurable processor 110. The configuration file can be retrieved from the memory 140 via the memory interface 150. Chunks of the configuration file can then be sent in a distribution sequence as described herein to configurable units in the array 190 of configurable units in the CGR processor 110.

An external clock generator 170 or other clock signal sources can provide a clock signal 175 or clock signals to elements in the CGR processor 110, including the array 190 of configurable units, and the bus system 115, and the external data I/O interfaces 130 and 150.

Figure 2:
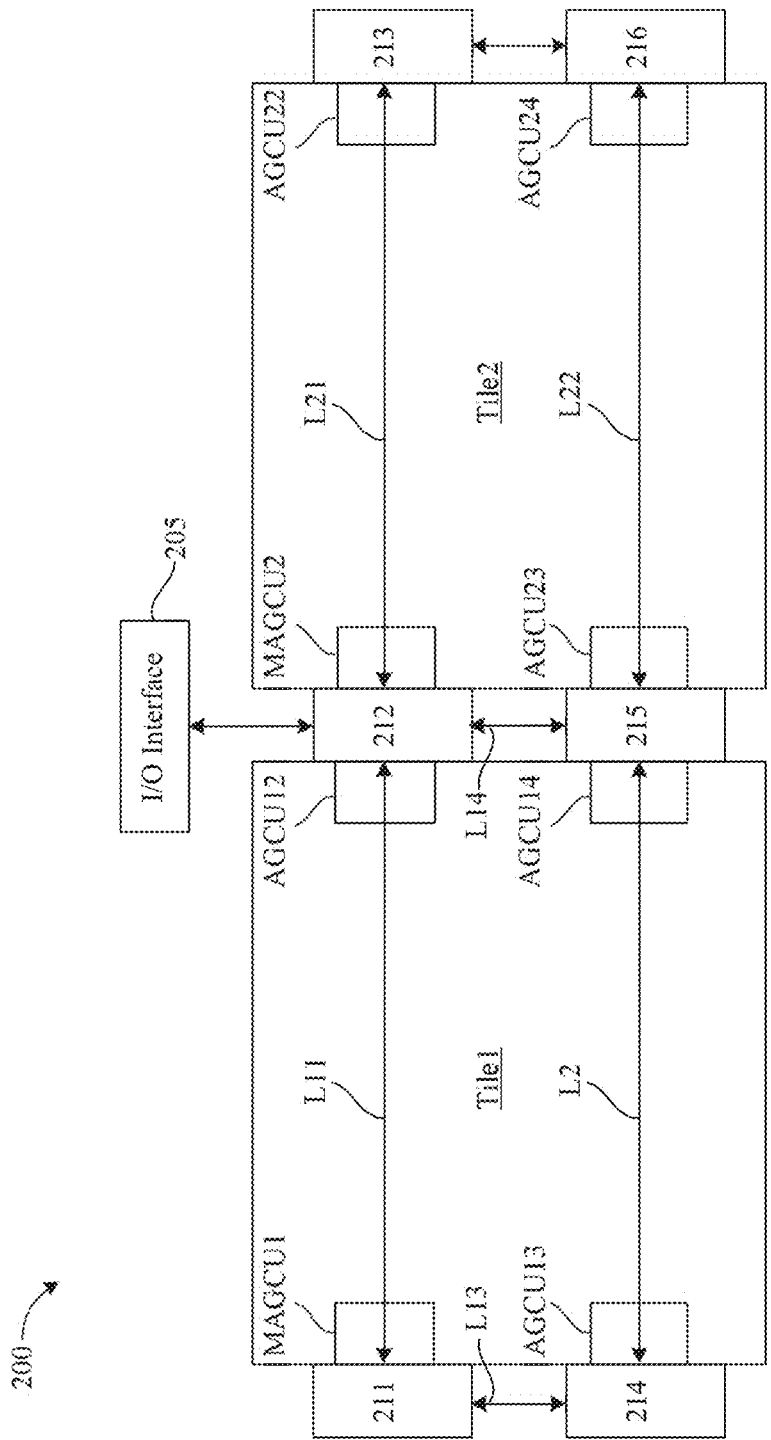
FIG. 2 is a simplified block diagram of a top-level network and components of a CGRA (Coarse Grain Reconfigurable Architecture).

FIG. 2 is a simplified block diagram of components of a CGRA (Coarse Grain Reconfigurable Architecture) processor 200. In this example, the CGRA processor 200 has 2 tiles (Tile1, Tile2). Each tile comprises an array of configurable units connected to a bus system, including an array level network (ALN) in this example. The bus system includes a top-level network connecting the tiles to external I/O interface 205 (or any number of interfaces). In other embodiments, different bus system configurations may be utilized. The configurable units in each tile are nodes on the ALN in this embodiment.

In the depicted embodiment, each of the two tiles has 4 AGCUs (Address Generation and Coalescing Units) (e.g., MAGCU1, AGCU12, AGCU13, AGCU14). The AGCUs are nodes on the top-level network and nodes on the ALNs and include resources for routing data among nodes on the top-level network and nodes on the ALN in each tile.

Nodes on the top-level network in this example include one or more external I/O, including interface 205. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configurations for more than one tile. In other embodiments, more than one configuration controller can be designed for configuration of a single tile. Also, the configuration load/unload controller can be implemented in other portions of the system, including as a stand-alone node on the top-level network and the ALN or networks.

The top-level network is constructed using top-level switches (211-216) connecting to each other as well as to other nodes on the top-level network, including the AGCUs, and I/O interface 205. The top-level network includes links (e.g., L11, L12, L21, L22) connecting the top-level switches. Data travel in packets between the top-level switches on the links, and from the switches to the nodes on the network connected to the switches. For example, top-level switches 211 and 212 are connected by a link L11, top-level switches 214 and 215 are connected by a link L12, top-level switches 211 and 214 are connected by a link L13, and top-level switches 212 and 213 are connected by a link L21. The links can include one or more buses and supporting control lines, including for example a chunk-wide bus (vector bus). For example, the top-level network can include data, request, and response channels operable in coordination for transfer of data in a manner analogous to an AXI compatible protocol. See, AMBAR AXI and ACE Protocol Specification, ARM, 2017.

Top-level switches can be connected to AGCUs. For example, top-level switches 211, 212, 214 and 215 are connected to MAGCU1, AGCU12, AGCU13 and AGCU14 in the tile Tile1, respectively. Top-level switches 212, 213, 215 and 216 are connected to MAGCU2, AGCU22, AGCU23 and AGCU24 in the tile Tile2, respectively. Top-level switches can be connected one or more external I/O interfaces (e.g., interface 205).

Figure 3B:
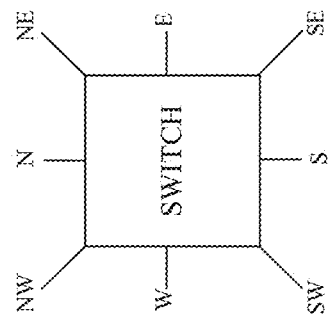
FIG. 3B illustrates an example switch unit connecting elements in an array level network.
Figure 3A:
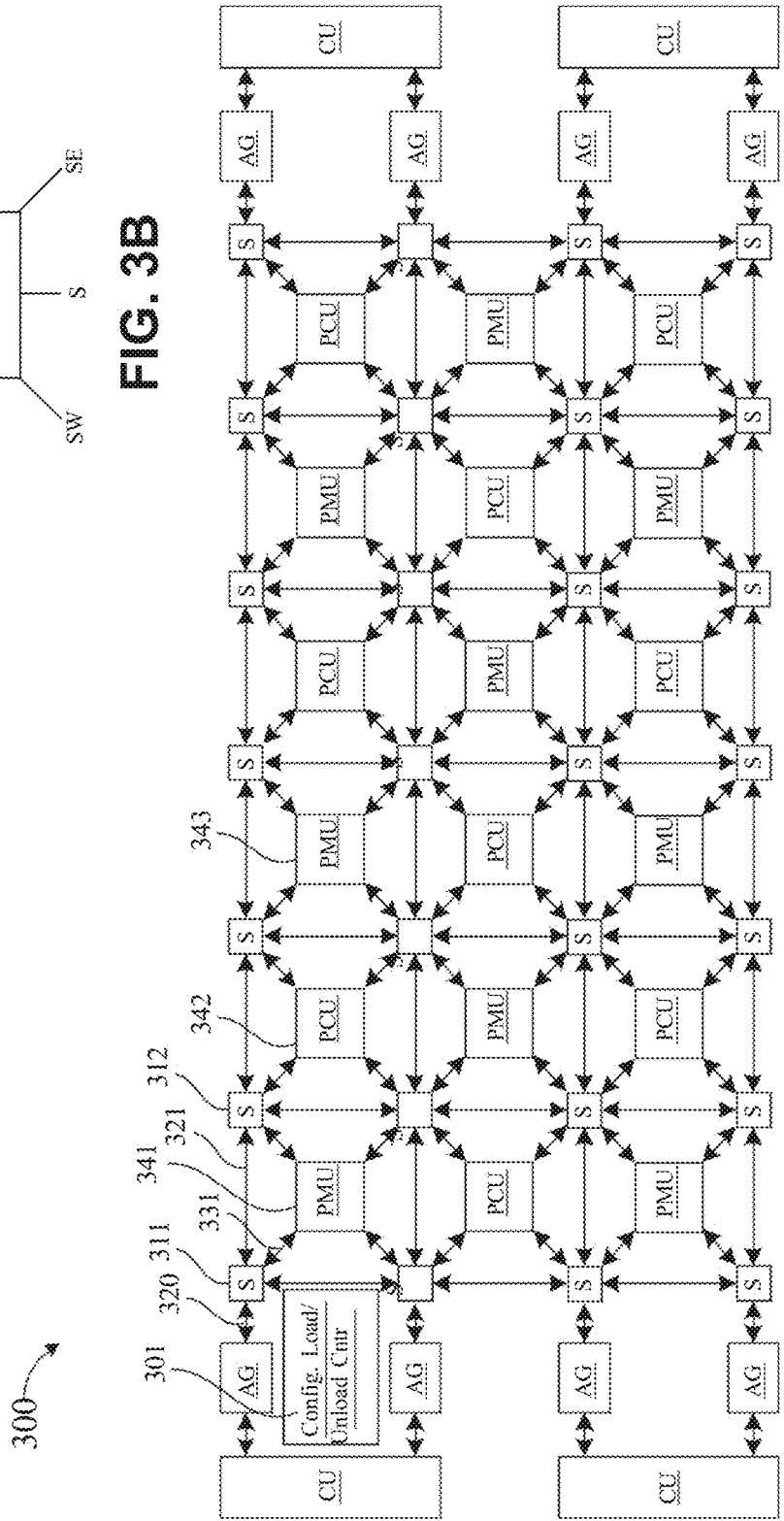
FIG. 3A is a simplified diagram of a tile and an array level network usable in the configuration of FIG. 2, where the configurable units are nodes on the array level network.

FIG. 3A is a simplified diagram of a tile and an ALN usable in the configuration of FIG. 2, where the configurable units in the array are nodes on the ALN. In this example, the array of configurable units 300 includes a plurality of types of configurable units. The types of configurable units in this example include Pattern Compute Units (PCU), Pattern Memory Units (PMU), switch units(S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units based on the contents of the bit file to allow all the components to execute a program (i.e., a machine). Program Load may also require the load of all PMU memories.

The ALN includes links interconnecting configurable units in the array. The links in the ALN include one or more and, in this case three, kinds of physical buses: a chunk-level vector bus (e.g., 128 bits of data), a word-level scalar bus (e.g., 32 bits of data), and a multiple bit-level control bus. For instance, interconnect 321 between switch units 311 and 312 includes a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send N chunks to a configurable unit in order from N−1 to 0. For this example, the 6 chunks are sent out in the most significant bit first order of Chunk 5→Chunk 4→Chunk 3→Chunk 2→Chunk 1→Chunk 0. (Note that this most significant bit first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 3B illustrates an example switch unit connecting elements in an ALN. As shown in the example of FIG. 3B, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the ALN.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the ALN. For instance, a chunk of configuration data in a unit file particular to a configurable unit PMU 341 can be sent from the configuration load/unload controller 301 to the PMU 341, via a link 320 between the configuration load/unload controller 301 and the West (W) vector interface of the switch unit 311, the switch unit 311, and a link 331 between the Southeast (SE) vector interface of the switch unit 311 and the PMU 341.

Figure 4:
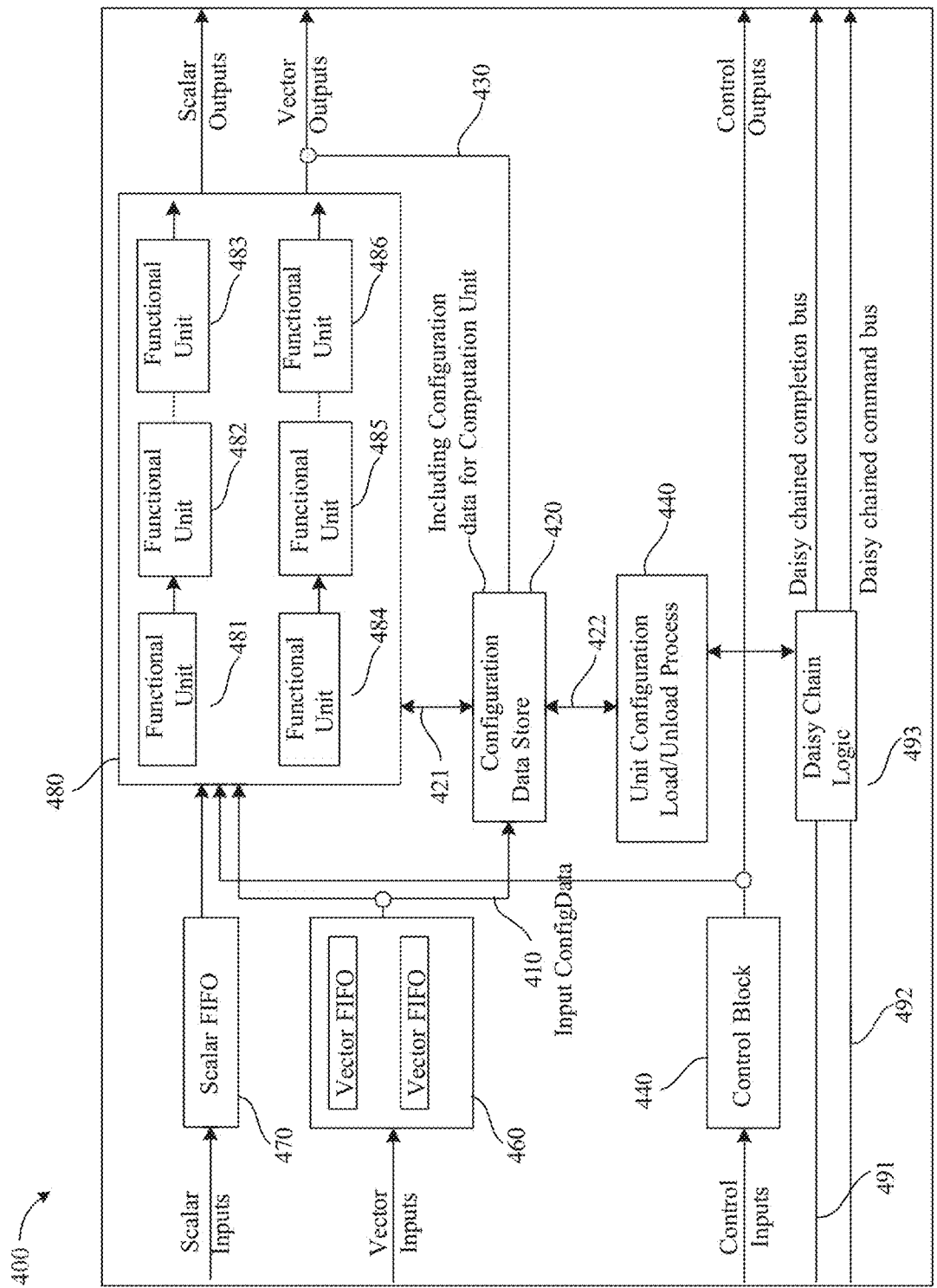
FIG. 4 is a block diagram illustrating an example configurable compute unit.

In this example, one of the AGCUs is configured to be a master AGCU, which includes a configuration load/unload controller (e.g., 301). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy chained command bus (FIG. 4). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the ALN to the corresponding configurable unit according to a distribution sequence described herein.

In one embodiment, in a way that can reduce the wiring requirements within a configurable unit, configuration and status registers holding unit files to be loaded in a configuration load process or unloaded in a configuration unload process in a component are connected in a serial chain and can be loaded through a process of shifting bits through the serial chain. In some embodiments, there may be more than one serial chain arranged in parallel or in series. When a configurable unit receives, for example, 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable unit's interface with the memory through multiple memory interfaces (150, FIG. 1). Each of the memory interfaces can be accessed using several AGCUs. Each AGCU contains a reconfigurable scalar datapath to generate requests for the off-chip memory. Each AGCU contains FIFOs (first-in-first-out buffers for organizing data) to buffer outgoing commands, data, and incoming responses from the off-chip memory.

The address generators AGs in the AGCUs can generate memory commands that are either dense or sparse. Dense requests can be used to bulk transfer contiguous off-chip memory regions and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

FIG. 4 is a block diagram illustrating an example configurable unit 400, such as a Pattern Compute Unit (PCU). A configurable unit can interface with the scalar, vector, and control buses, in this example using three corresponding sets of inputs and outputs: scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 470, and control outputs are provided by the control block 470.

Each vector input is buffered in this example using a vector FIFO in a vector FIFO block 460 which can include one or more vector FIFOs. Likewise in this example, each scalar input is buffered using a scalar FIFO 450. Using input FIFOs decouples timing between data producers and consumers and simplifies inter-configurable-unit control logic by making it robust to input delay mismatches.

A configurable unit includes multiple reconfigurable datapaths in block 480. A datapath in a configurable unit can be organized as a multi-stage (Stage 1 . . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 420 is connected to the multiple datapaths in block 480 via line 421.

A configurable datapath organized as a multi-stage pipeline can include multiple functional units (e.g., 481, 482, 483; 484, 485, 486) at respective stages. A special functional unit SFU (e.g., 483, 486) in a configurable datapath can include a configurable module 487 that comprises sigmoid circuits and other specialized computational circuits, the combinations of which can be optimized for particular implementations. In one embodiment, a special functional unit can be at the last stage of a multi-stage pipeline and can be configured to receive an input line X from a functional unit (e.g., 482, 486) at a previous stage in a multi-stage pipeline. In some embodiments, a configurable unit like a PCU can include many sigmoid circuits, or many special functional units which are configured for use in a particular graph using configuration data.

Configurable units in the array of configurable units include configuration data stores 420 (e.g., serial chains) to store unit files comprising a plurality of chunks (or sub-files of other sizes) of configuration data particular to the corresponding configurable units. Configurable units in the array of configurable units each include unit configuration load logic 440 connected to the configuration data store 420 via line 422, to execute a unit configuration load process. The unit configuration load process includes receiving, via the bus system (e.g., the vector inputs), chunks of a unit file particular to the configurable unit and loading the received chunks into the configuration data store 420 of the configurable unit. The unit file loaded into the configuration data store 420 can include configuration data, including opcodes and routing configuration, for circuits implementing a matrix multiply as described with reference to FIGS. 6-12.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 410 can be provided to a vector FIFO as vector inputs, and then be transferred to the configuration data store 420. Output configuration data 430 can be unloaded from the configuration data store 420 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 4, a daisy-chained completion bus 491 and a daisy-chained command bus 492 are connected to daisy-chain logic 493, which communicates with the unit configuration load logic 440. The daisy-chain logic 493 can include load complete status logic, as described below. The daisy-chained completion bus is further described below. Other topologies for the command and completion buses are clearly possible but not described here.

FIG. 5 is a block diagram illustrating an example configurable pattern memory unit (PMU) including an instrumentation logic unit. A PMU can contain scratchpad memory 530 coupled with a reconfigurable scalar data path 520 intended for address calculation (RA, WA) and control (WE, RE) of the scratchpad memory 530, along with the bus interfaces used in the PCU (FIG. 18). PMUs can be used to distribute on-chip memory throughout the array of reconfigurable units. In one embodiment, address calculation within the memory in the PMUs is performed on the PMU datapath, while the core computation is performed within the PCU.

The bus interfaces can include scalar inputs, vector inputs, scalar outputs and vector outputs, usable to provide write data (WD). The data path can be organized as a multi-stage reconfigurable pipeline, including stages of functional units (FUs) and associated pipeline registers (PRs) that register inputs and outputs of the functional units. PMUs can be used to store distributed on-chip memory throughout the array of reconfigurable units.

A scratchpad is built with multiple SRAM banks (e.g., 531, 532, 533, 534). Banking and buffering logic 535 for the SRAM banks in the scratchpad can be configured to operate in several banking modes to support various access patterns. A computation unit as described herein can include a lookup table stored in the scratchpad memory 530, from a configuration file or from other sources. In a computation unit as described herein, the scalar data path 520 can translate a section of a raw input value I for addressing lookup tables implementing a function f(I), into the addressing format utilized by the SRAM scratchpad memory 530, adding appropriate offsets and so on, to read the entries of the lookup table stored in the scratchpad memory 530 using the sections of the input value I. Each PMU can include write address calculation logic and read address calculation logic that provide write address WA, write enable WE, read address RA and read enable RE to the banking buffering logic 535. Based on the state of the local FIFOs 511 and 519 and external control inputs, the control block 515 can be configured to trigger the write address computation, read address computation, or both, by enabling the appropriate counters 516. The counters 516 are shown as a programmable counter chain 516 (Control Inputs, Control Outputs) and control block 515 can trigger PMU execution.

Instrumentation logic 518 is included in this example of a configurable unit. The instrumentation logic 518 can be part of the control block 515 or implemented as a separate block on the device. The instrumentation logic 518 is coupled to the control inputs and to the control outputs. Also, the instrumentation logic 518 is coupled to the control block 515 and the counter chain 516, for exchanging status signals and control signals in support of a control barrier network configured as discussed above.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Figure 6:
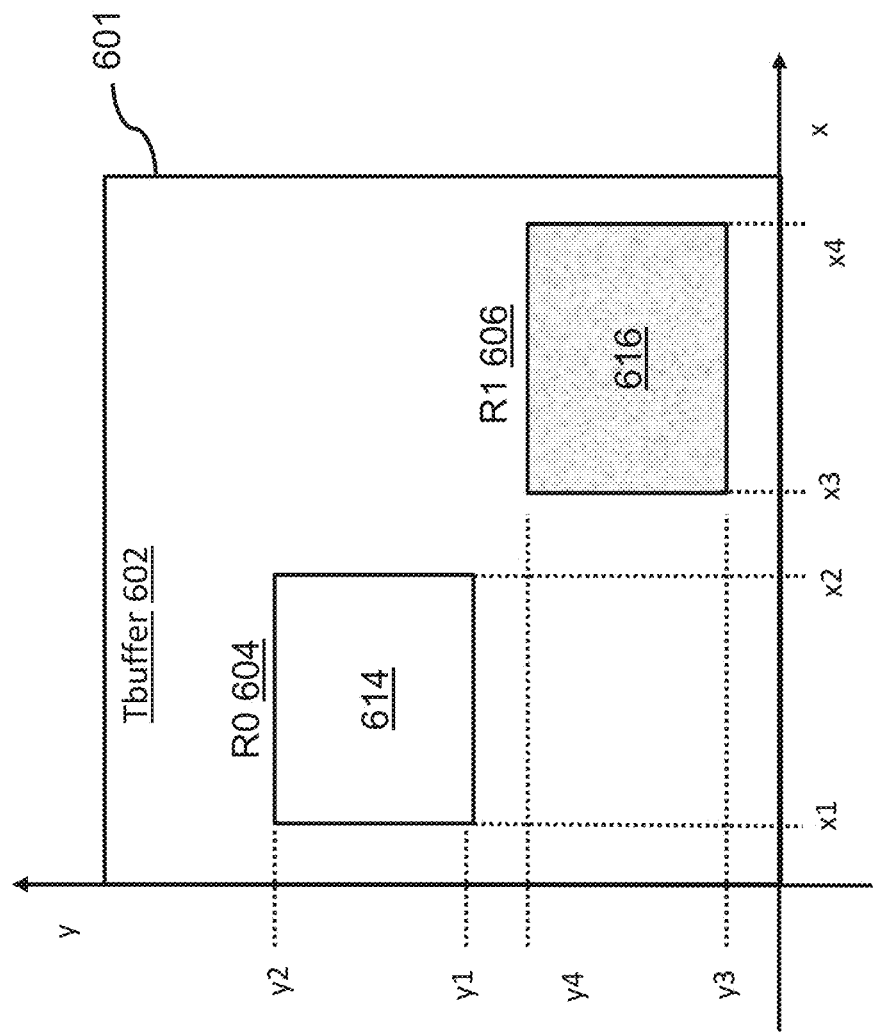
FIG. 6 illustrates an example of a tensor (Tbuffer) including multiple read accesses, each to a separate memory address space, according to embodiments disclosed herein.

FIG. 6 illustrates an example 2-d tensor (TBuffer) 602 which represents a user's logical memory. The TBuffer 602 further includes a first read access pattern (also known as a "reader") R0 604 and a second reader R1 606, each to a separate address space in the logical memory 601. The reader R0 604 includes a single memory access 614 and the reader R1 606 includes a single memory access 616. The address space of each access is shown as bound by their respective rectangles and the x, y coordinates as shown. These readers need to be mapped to a physical memory address space in the form of one or more PMUs (shown in FIG. 3A) of the CGR processor 110 or in one or more banks of one or more PMUs shown in FIG. 5, in parallel. As will be shown in the following paragraphs, in one example, the mapping of these readers is done by duplication of the tensor 602. Furthermore, before the actual mapping, various analyses are performed including a tensor memory access analysis, tensor trimming analysis, and an optional pacing window analysis.

Figure 7:
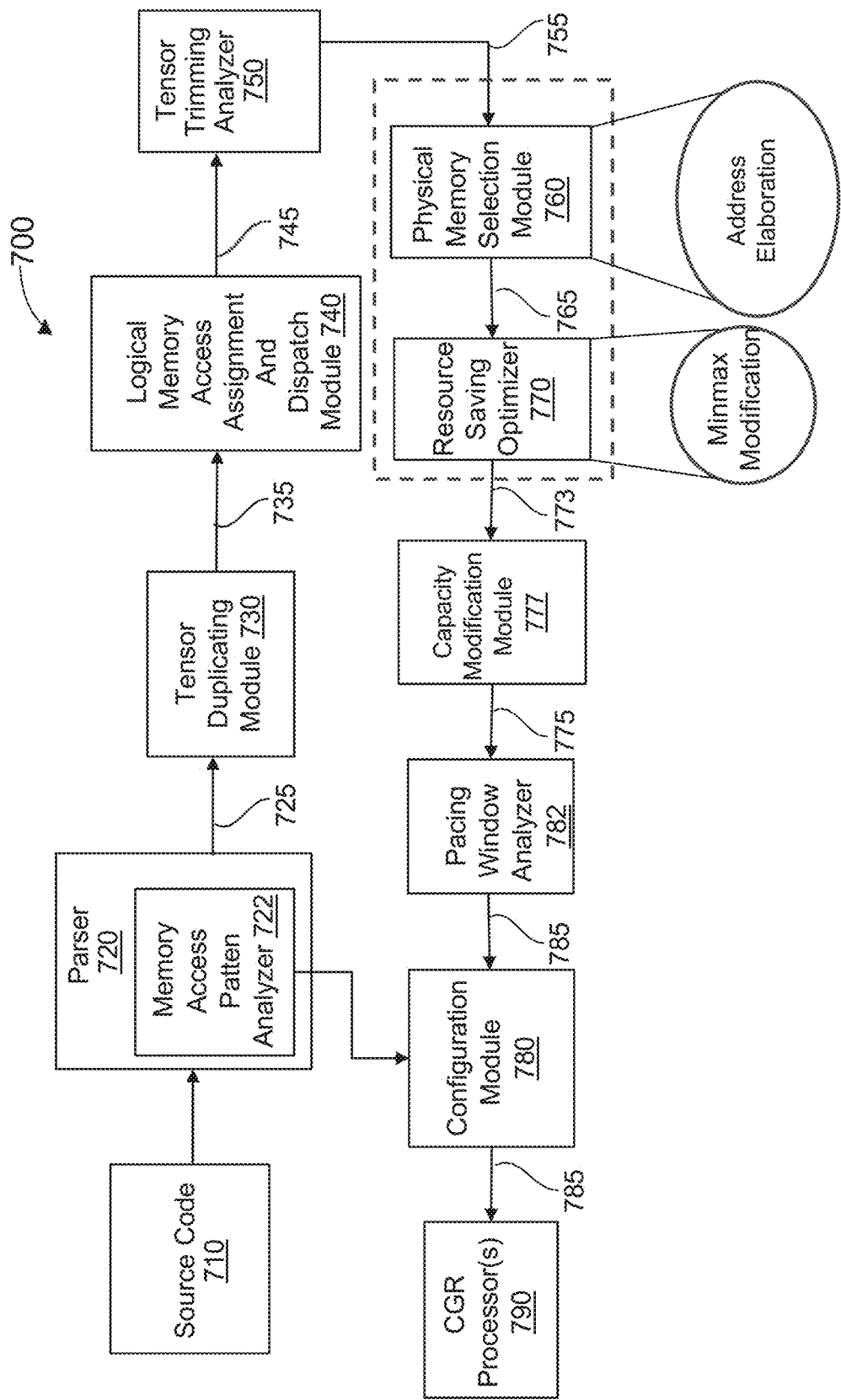
FIG. 7 is a block diagram depicting one example of a system for determining and using memory unit allocation solutions, according to embodiments disclosed herein.

FIG. 7 is a block diagram depicting one example of a system 700 for determining and mapping tensor data from logical memory to physical memory, according to the embodiments disclosed herein. As depicted, the system 700 includes a parser 720 further including a logical memory access pattern analyzer 722, a tensor duplicating module 735, a logical memory assignment and dispatch module 740, a tensor trimming analysis module 750, a physical memory selection module 760, a resource optimizer 770, a capacity modification module 777, a pacing window analyzer 771, configuration module 780, and one or more CGR processors 790. System 700 enables determination of viable memory mapping solutions and execution of a selected solution on the reconfigurable dataflow processors 790. Some of the modules of the system 700 (e.g., 740-770) may be implemented within the template library stack 40.

More specifically, the system 700 initially receives a tensor with multiple memory accesses (readers or writers,) analyzes a total number of memory accesses and types of those memory accesses, creates one or more duplicates of the tensor to create multiple instances of the tensor, and assigns each individual memory access in the original tensor to the duplicate instances of the tensor in such a way that in any duplicate no two types of memory accesses are overlapping. In one example, if an original tensor is assumed to include n memory accesses (including read and write,) then the system 700 can create a total of n duplicates of the tensor.

Furthermore, the n memory accesses are assigned to the n duplicates such that each duplicate includes no more memory accesses of each type than physical ports of that type (i.e., only two readers in each duplicate if the scratchpad has two read ports, and only one writer in each duplicate if the scratchpad has one write port). The n duplicated of the tensors are then provided to physical memory (PMUs) on the CGR processors 790. In order to perform the above-mentioned analyses, several algorithms may be implemented.

The following paragraphs will provide more details about various modules included in the system 700 of FIG. 7.

The parser 720 parses the statements of the source code 710. In some embodiments, the parser generates a high-level compute graph where the nodes of the compute graph include memory accesses patterns in tensors. The memory access pattern analyzer 730 analyzes the memory access patterns from the source code of an app intended for the reconfigurable dataflow processors 790. For example, referring back to FIG. 6, the tensor 602 may be present in the source code 710 and the memory access pattern analyzer 730 may analyze the tensor 602 and identify the two readers R0 604 and R1 606 in it. The tensor duplicating module 730 duplicates a tensor to create as many instances as required to include each individual memory access pattern so that no two memory accesses of the same type are overlapping. The memory access assignment and dispatch module 740 creates an initial assignment schedule, intermediate assignment schedules and, a final (legal) assignment schedule and later on can dispatch the memory accesses to various instances of the original tensor as per the final assignment schedule.

The logical memory access pattern analyzer 722, the tensor duplicating module 730, and the memory access assignment and dispatch module 740 perform the analyses, the duplication, and the dispatch of the assignments hand-in-hand to create duplicates and a legal assignment schedule for the memory access patterns to those duplicates. In one example, the logical memory access pattern analyzer 722 uses an integer set library (ISL) (not shown) to analyze the access patterns specified by the user. The ISL can be used to determine which patterns intersect and each intersecting pattern is further assigned to a new duplicate using the memory access assignment dispatch module 740.

Furthermore, the tensor trimming analysis module 751 trims the extra and unused space from the original tensor of any instance of the tensor to minimize the memory footprint of each dispatch so that the accesses in a tensor take up the minimum possible number of PMU resources.

After the tensor trimming, each duplicate is left with the data (memory accesses to logical address) which needs to be mapped to a single logical PMU. For this purpose, the physical memory selection module 760 is implemented which performs address elaboration. The address elaboration converts a user's N-dimensional access pattern in the tensor into 1-dimensional. Furthermore, a single duplicate represents a logical PMU in order to make the logical PMU map to a single physical PMU, the capacity modification module 777 may perform capacity modification on the logical PMU. More particularly, in capacity modification special algorithm may be used to make the tensor fit within the assigned physical memory units. More details about the capacity modification module are described in a related application, U.S. Pat. No. 11,709,611 B2, Aug. 1, 2022, entitled "DETERMINING AND USING MEMORY UNIT PARTITIONING SOLUTIONS FOR RECONFIGURABLE DATAFLOW COMPUTING SYSTEMS,", which is incorporated herein in its entirety.

It may be understood that the underlying architecture of this system is a mesh of pattern compute units and pattern memory units, connected by a static/dynamic hybrid network. Depending on the generation of the architecture, there are different widths and depths of ALU lanes per resources, as well as scalar and vector ports on the boundaries of each resource. Because these resources are heavily quantized and limited, it is important to apply as many resource-saving transformations as possible, including hardware features such as min-max configuration. These features can be implemented by the resource saving optimizer 761 can further implement algorithms to perform drop predication and min-max functions.

The physical memory selection module 760 and the resource saving optimizer module 770 can be used in any order to map the logical memory in the tensor to the physical PMUs and their corresponding banks. More details about example implementations of the address elaboration and capacity modification functions have been described in the U.S. Nonprovisional patent application Ser. No. 17/878,504, filed Aug. 1, 2022, entitled "DETERMINING AND USING MEMORY UNIT PARTITIONING SOLUTIONS FOR RECONFIGURABLE DATAFLOW COMPUTING SYSTEMS," which is incorporated herein by reference.

As can be understood, after all of the above processes, the data in each duplicate may be provided to the configuration module to be 780 to be further loaded on to one or more CGR processors 790.

The configuration module 780 may provide configuration data 785 to configure configurable elements of the reconfigurable dataflow processor(s) [which are not shown in FIG. 7] such as pattern memory units (PMUs), pattern compute units (PCUs) and communication elements of a switching fabric. For example, the data from tensors is dispatched to the various PMUs and the corresponding PMUs may be configured according to the memory partitioning (banking) scheme determined by the memory partitioning module 760. Once configured, the reconfigurable dataflow processors 790 may (repetitively) conduct dataflow operations on tensor data.

As shown in other figures and described elsewhere in this specification, each reconfigurable dataflow processor (or RDU) 790 may comprise an array of compute units and an array of memory units interconnected with a switching fabric. Furthermore, the memory units may comprise address generators that generate, for each memory cycle, a physical address comprising a bank identifier and a bank offset. Each memory unit may be configured to respond only to memory cycles that generate a bank identifier that has been assigned to that memory unit. The bank identifier and bank offset may be generated using a memory partitioning (banking) scheme determined by the memory partitioning module 760. Each memory unit may be configured to respond to a specific assigned bank identifier. Consequently, a memory unit that generates a bank identifier and a bank offset may ignore the generated address and any operation associated therewith if the generated bank identifier does not match the assigned bank identifier.

Reorder Buffer

In one example, the data (memory access) related to the one context (memory access) in a tensor is assigned to at least two different duplicates. In such a case, each duplicate holds only half the data. Both halves of the data are then collected from two separate PMUs at different speeds. Therefore, a reorder buffer (ROB) is used in such cases, which shuffles the data and puts that data in the correct order before it is processed further by PCUs. More details about this will be explained later in the specification. When you have multiple pairs of PMUs where each pair is associated with an ROB, the data packets from the tensor have to first arrive in each pair of PMUs and then to their corresponding reorder buffer. However, if the data packets from the tensors arrive too fast into the pairs of PMUs, then the ROBs may not have enough time to receive both halves of the data. To resolve this issue, the system 700 includes the pacing window analyzer 771. The pacing window analyzer can perform a pacing window analysis to determine the granularity of the packets sent between the PMUs and the ROB such that they are guaranteed to arrive at the ROB in order.

Figure 8A:
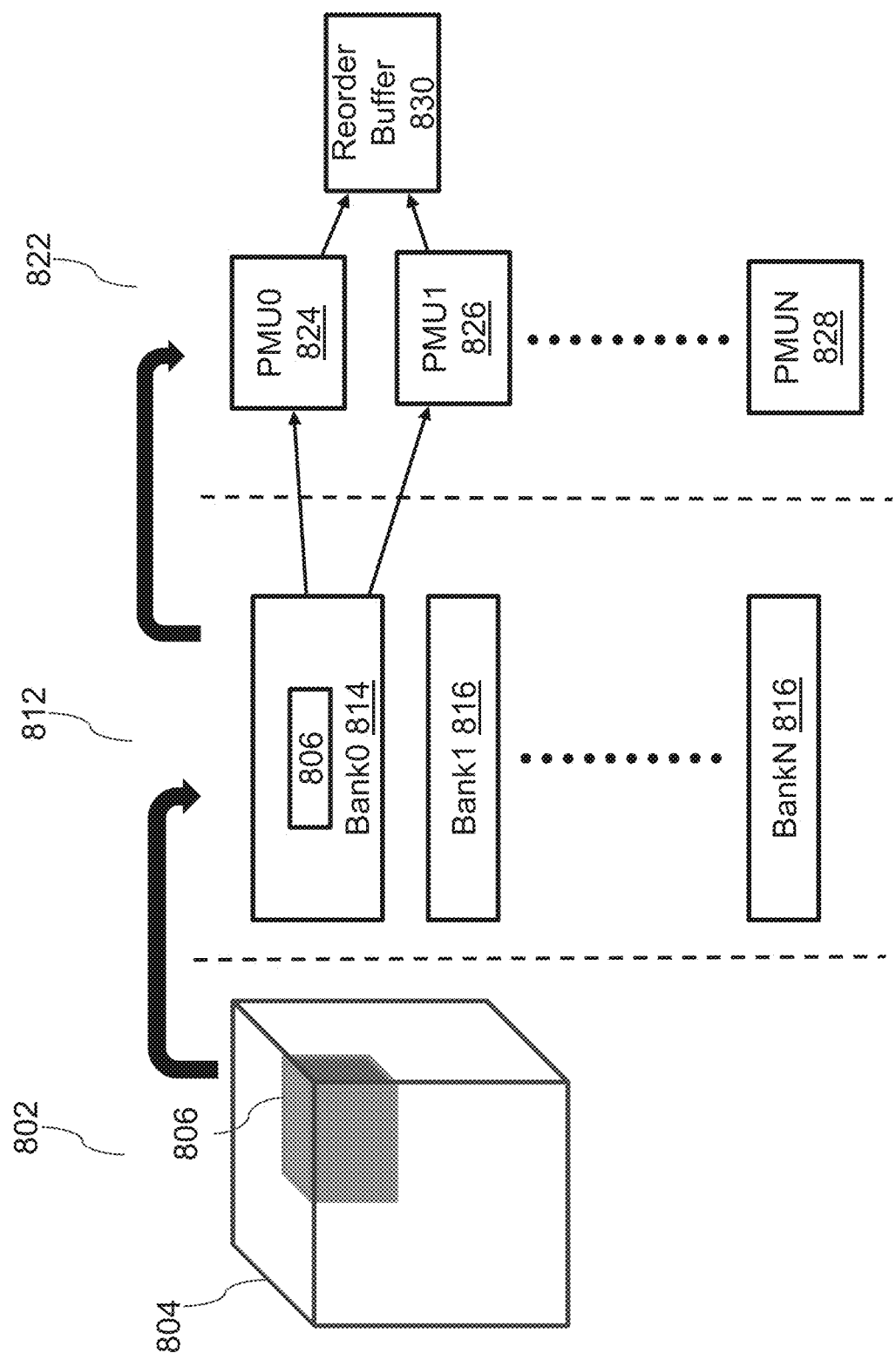
FIG. 8A illustrates an example of a high-level representation of an implementation and outcome of system 700, according to embodiments disclosed herein.

FIG. 8A illustrates an example of a high-level representation of an implementation and outcome of the system 700 disclosed according to various embodiments. Shown in FIG. 8A is a logical view 802 of a 3-d tensor 804 including data (memory access) 806. FIG. 8A also illustrates a virtual bank view 814 of banking the tensor 804, according to an example. The system 700 duplicates the tensor 804 into multiple virtual banks shown in 814. In other words, a duplicated tensor can be considered as a virtual bank shown in a "virtual bank view" 814. In this example, the tensor 804 is duplicated N times therefore the virtual bank view 814 includes multiple banks from bank0 to bankN. Each virtual bank can further include a logical partition of the tensor 804 and the data included therein. For example, the duplicate bank0 includes the logical partition of the tensor 804 which holds the data 806. Other data in the other logical partitions (not shown) can be included in other banks. Furthermore, FIG. 8A also illustrates a p including PMUs PMU0 824, PMU1 826 up to PMUN 828. The PMUs are examples of the PMUs shown in FIG. 3A and FIG. 5. In one example, the data 806 from the bank0 is dispatched to one or more PMUs, in this case to two PMUs PMU0 824, PMU1 826 as indicated by the arrows. Generally speaking, in one example, half of the data 806 is dispatched to PMU0 824 and the other half is dispatched to PMU1 826 in any order. As explained earlier, in one example, a reorder buffer (ROB) 830 can be used to put the data in the correct order before that data is processed further by the PCUs. Additionally, although not explicitly shown in the FIG. 8A, the output of the reorder buffer can be provided to a PCU, PMU, or an AGCU.

Figure 8B:
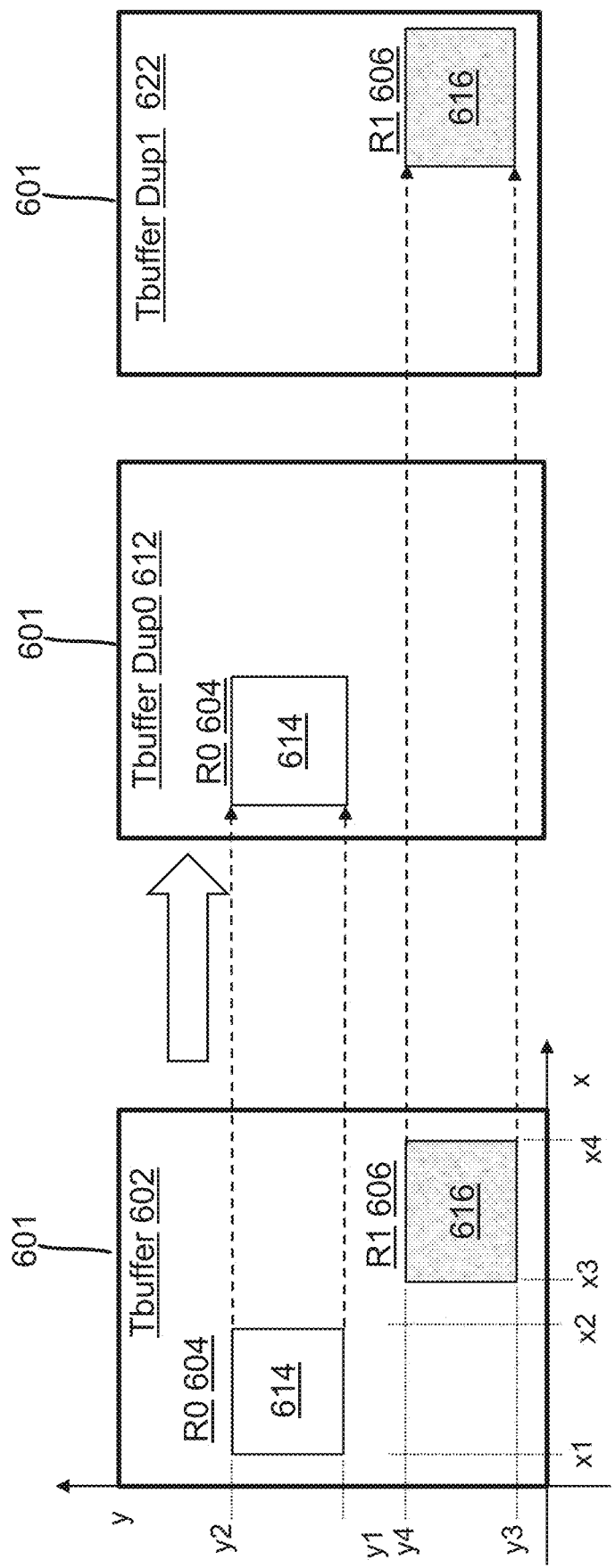
FIG. 8B illustrates an example of implementation of a 2-d tensor being duplicated, logically partitioned, with its data being extracted into corresponding duplicates, according to embodiments disclosed herein.

FIG. 8B illustrates an example implementation of a 2-d tensor being duplicated, logically partitioned, with its data being extracted into corresponding duplicates, according to embodiments disclosed herein. Shown in FIG. 8B is the tensor 602 (shown earlier in FIG. 6) with two non-overlapping memory accesses R0 604 and R1 606, being banked by two duplicates tensors dup0 612 and dup1 622. Although FIG. 8B shows the resultant duplicates each with a single memory access pattern, initially, the entire original tensor 602 is duplicated; following which only the read access pattern R0 604 is retained in the dup0 612 and only the write access pattern 606 is retained in the dup1 622. In order to assign a specific access pattern to a duplicate, a pre-banking analysis is performed by the memory access pattern analyzer 722. More particularly, the memory access pattern analyzer 722 translates access patterns into integer set relationships and we handle them with ISL C++ library.

In the pre-banking analysis, initially, it may be determined how many accesses there are in the tensor 602; the tensor 602 may be partitioned into logical address spaces for each access. For example, in FIG. 8B the memory access pattern analyzer 722 can determine that there are two accesses, a read access R0 604 and a write access R1 606; it can then logically partition the tensor 602 into separate address spaces including the two accesses, a first read access R0 604 and a second read access R1 606.

In case of non-overlapping accesses, a duplicate can be created for each access by the tensor duplicating module 730. In this example, the tensor duplicating module 730 can create a first duplicate dup0 612 of the tensor 602 for the reader R0 604 and a second duplicate dup1 622 of the tensor 602 for the reader R1 606.

Afterwards, each access can then be assigned and dispatched to its corresponding duplicate by the logical memory assignment and dispatch module 740. In this example, the logic The readers R0 604 and R1 606 are first assigned (not shown) and then dispatched to the to their corresponding duplicates dup0 612 and dup1 622 respectively while maintaining their original address spaces as shown by the x, y coordinates (z coordinates are not shown here). The pre-banking analysis, the duplication of the tensor, the assignment, and the dispatching of the can take place concurrently or sequentially or in any manner as suitable for the implementation.

Figure 9:
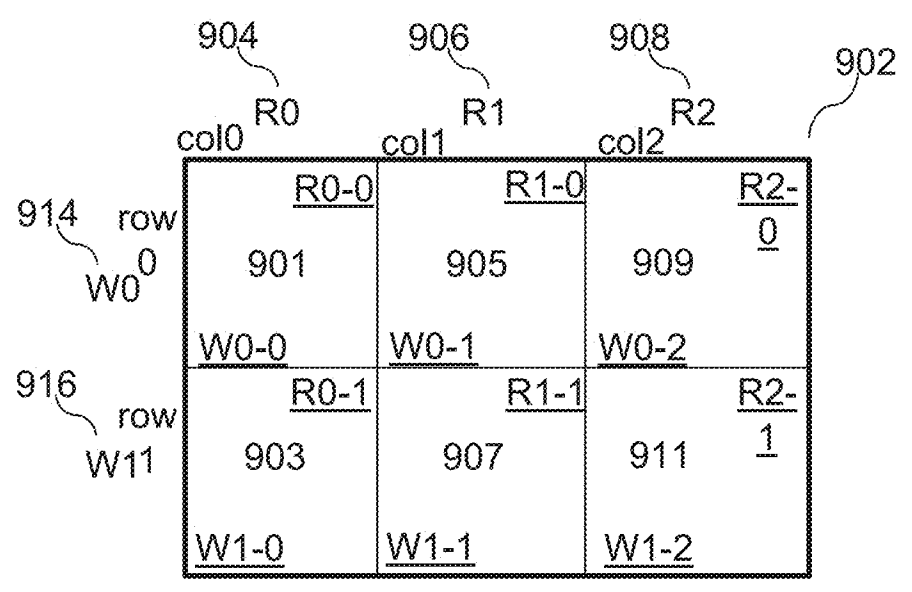

FIG. 9 illustrates an example of a 2-d tensor 902 including multiple overlapping memory access patterns such as read access patterns (readers/read contexts) and write access patterns (writers/write contexts.)

Each access pattern includes one or more memory accesses (read access/read operation or write access/write operation) known as "data portions" or "data regions" or "portions" or "regions." The tensor 902 includes three readers R0 904, R1 906, and R2 908; and two writers W0 914 and W1 916. The reader R0 904 includes two data portions R0-0 and R0-1, R1 906, and R2 908. The tensor 902 illustrates a parallelization of two since there are two writers, meaning that the user can write two access patterns in parallel. In one example, each data portion is further divided into packets and each packet size can be less than or equal to the size of the physical memory port i.e., port size of the scratchpad memory 530 shown in FIG. 5.

Initially, if the tensor 902 is considered to be divided into rows and columns, then it can be easily seen, that the reader R0 904 includes two data portions R0-0 and R0-1; R0-0 being in the address space 901 in the (row0 981, col0 971) and R0-1 being in the address space 903 in the (row1 983, col0 971); the reader R1 906 includes two data portions R1-0 and R1-1; R1-0 being in the address spaces 905 in the (row0 981, col1 973) and R1-1 being in the address space 907 in the (row1, col1 973); and the reader R2 908 includes two data portions R2-0 and R2-1, r2-0 being in the space 909 in the (row0 981, col1 973) and R2-1 being in the address space 911 in the (row1 983, col2 975).

Similarly, the writer W0 914 includes three data portions W0-0, W0-1, and W0-2; W0-0 being in the address space 901 in the (row0 981, col0 971), W0-1 being in the address space 905 in the (row0 981, col1 973), and W0-2 being in the address space 909 in the (row0 981, col2 975). The writer W1 916 includes three data portions W1-0, W1-1, and W1-2; W0-0 being in the address space 903 in the (row1 983, col0 971), W0-1 being in the address space 907 in the (row1 983, col), and W0-2 being in the address space 911 in (row1 983, col2 975).

As can be seen, W0 914 writes to the top half and W1 916 writes to the bottom half of the tensor 902. The writer W0 914 intersects with readers R0, R1, and R2 at the address spaces 901, 905, and 909 respectively.

In this example, the memory access and pattern analyzer 722 can perform the pre-banking analysis by performing an initial schedule and a final schedule of access pattern assignments and duplicates. An initial schedule may be further be formed in two steps, first by creating a global duplication and dispatch schedule (or a "global schedule") and second, by creating a local duplication and dispatch schedule (also known as "local schedule.") To form a global schedule, it may be determined as to which access patterns are more or in other words "critical" than the others. If read access patterns are collectively called as "read group" and the write access patterns are called "write group", then it may be initially determined as to which group is "critical." Furthermore, as many initial duplicates as equal to the contexts in the critical group are formed. Furthermore, in one example, each context in the critical group is assigned to a separate duplicate under the global schedule and the contexts in a non-critical group are assigned to all the duplicates under the local schedule. The assignments made under the global schedule may be referred to as "global assignments" and the assignments made under the local schedule may be referred to as "local assignments." It may be noted that a context in the critical group may be referred to as a "critical context" and a data portion of a critical context may be referred to as a "critical data portion." Similarly, a context in the non-critical group may be referred to as a "non-critical context" and a data portion of a non-critical context may be referred to as a "non-critical data portion."

Figure 10A:
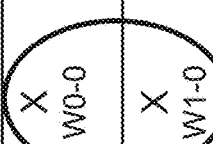
FIG. 10A illustrates an example of an initial memory access pattern assignment schedule, according to embodiments disclosed herein.

FIG. 10A illustrates an initial assignment table 930 of a global schedule. As can be seen the columns represent the duplicate IDs (dup0, dup1, dup2) and the rows represent the access patterns (W0, W1, R0, R1, and R2). In this example, there are three read contexts (R0, R1, R2) and two write contexts (W0 and W1), therefore, it can be determined that the read group is critical. Since the read group is critical, as a first step three duplicates may be formed and each read context is assigned to a new duplicate, i.e., R0 is assigned to dup0, R1 is assigned to dup1, and R2 is assigned to dup2 under the global schedule. Then as a second step, since the write group is non-critical, the write contexts W0 and W1 are assigned to all the duplicates dup0, dup1, and dup2 under the local schedule.

As can be seen from the oval shapes in FIG. 10A, the W0 and W1 overlap. As explained earlier, after being dispatched to duplicates, the write contexts W0 and W1 eventually get mapped to some physical address locations in the scratchpad memory 530 in the PMU as shown in FIG. 5. In one example, the SRAM 530 can have a single port and therefore, if both the contexts are assigned to the same duplicate, then one of those can get overwritten by the other while being mapped to their corresponding address locations via the single port of the SRAM 530. In other words, this may cause a conflict. To resolve this conflict, in one example, additional duplicates are created and some of the contexts can be moved to the additional duplicates such that no duplicate has more contexts of a particular type than ports of that type. In other words, no more read contexts than the number of read ports and no more write contexts than the number of write ports. In order to implement assignments without conflict as explained above, the initial assignment table 930 shown in FIG. 10A is modified in a few steps as follows: by creating additional columns for new duplicates, keeping some of the original assignments, moving the conflicting assignments to new columns, and extending some of the assignments to the new columns (as in keeping those in the original columns as well as new columns.)

In this example, either W0 or W1 need to be assigned to separate duplicates in such a way that those don't overlap since those are the same types of contexts. For this, the module 740 modifies the assignment schedule by adding more columns to the assignment table and then extending the W1 accesses to the additional columns. An example of this is shown in FIGS. 10B, 10C, and 10D.

Figures 10A, 10B:
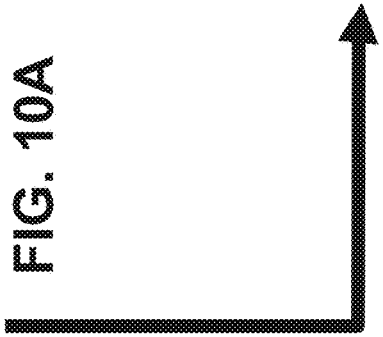
FIG. 10B illustrates an example of an intermediate memory access pattern assignment schedule, according to embodiments disclosed herein.

FIGS. 10B and 10C illustrate examples of intermediate memory access pattern assignment schedules, according to embodiments disclosed herein. FIG. 10D illustrates an example of a final (legal) memory access pattern assignment schedule, according to embodiments disclosed herein. The table 930 shown in FIG. 10A is modified to 10B, 10C, and 10D. In one example, the module 740 modifies the assignments in the table 930 by keeping some contexts (or one or more data portions of some contexts) in the same columns, while moving conflicting contexts (or one or more data portions of conflicting contexts) to new columns, and extending the contexts (or one or more data portions of conflicting contexts), from a different group to the new columns. In general, the assignment schedule modified the assignments in three steps as follows: first, it moves a context (or one or more its data portions) to a new duplicate if it violates its original assignment with a previous context, second, keeps the previous context in the same duplicate if it forced a move on a dispatch; and third, it extends any context that is of a different type to the new duplicate.

For example, initially, the table 930 in FIG. 10A includes three duplicates dup0, dup1, dup2 in three columns with overlapping W0 and W1 in all the columns. The table 930 then gets modified to table 940. In the table 940 an extra column for dup3 is added. Furthermore, in the table 940, W0 is retained (kept) in the same columns as 930 (dup0, dup1, dup2), whereas W1 is moved by one column to fall under dup1, dup2, and dup3; and R0 is extended to the new column dup3. The table 940 then gets modified to table 950. In the table 950 an extra column for dup4 is added. In the table 940, W1 is still in conflict with W0, so the table 940 is further modified to the table 950. As can be seen, in the table 950, a new column dup5 is added, W0 is retained (kept) in the same columns as in 930 and 940 (dup0, dup1, dup2), whereas W1 is once again moved by one column to fall under dup2, dup3, and dup4; and R1 is extended to the new column dup4. However, In the table 950, W1 is still in conflict with W0, so the table 950 is further modified to the table 960. As can be seen, in the table 960, a new column dup5 is added, W0 is retained (kept) in the same columns as in 930, 940, and 950 (dup0, dup1, dup2), whereas W1 is once again moved by one column to fall under dup3, dup4, and dup5; and R2 is extended to the new column dup4. However, In the table 960, W1 is not in conflict with W0 anymore, so the table 960 does not need to be modified any further. Therefore, the table 960 can be considered as a final schedule or a legal schedule. Once a legal schedule is established, duplicates can be created, and assignments can be dispatched to those as per the legal schedule. As those skilled in the art may appreciate, in the process of keeping, moving, and extending the term context encompasses the data portions in the context and the legal schedule may not include any conflicting data portions in a context, i.e., as explained previously the number of data portions of in any duplicate is less than or equal to the number of memory ports for the data portion type. Additionally, although in the example of FIG. 9, the initial and final schedules and keeping, moving, and extending in between those are performed using the "critical" and "non-critical" group analysis, in other examples there may not be any critical or non-critical group. The initial schedule can start with any group i.e., a group of readers or a group of writers.

Figures 11, 12:
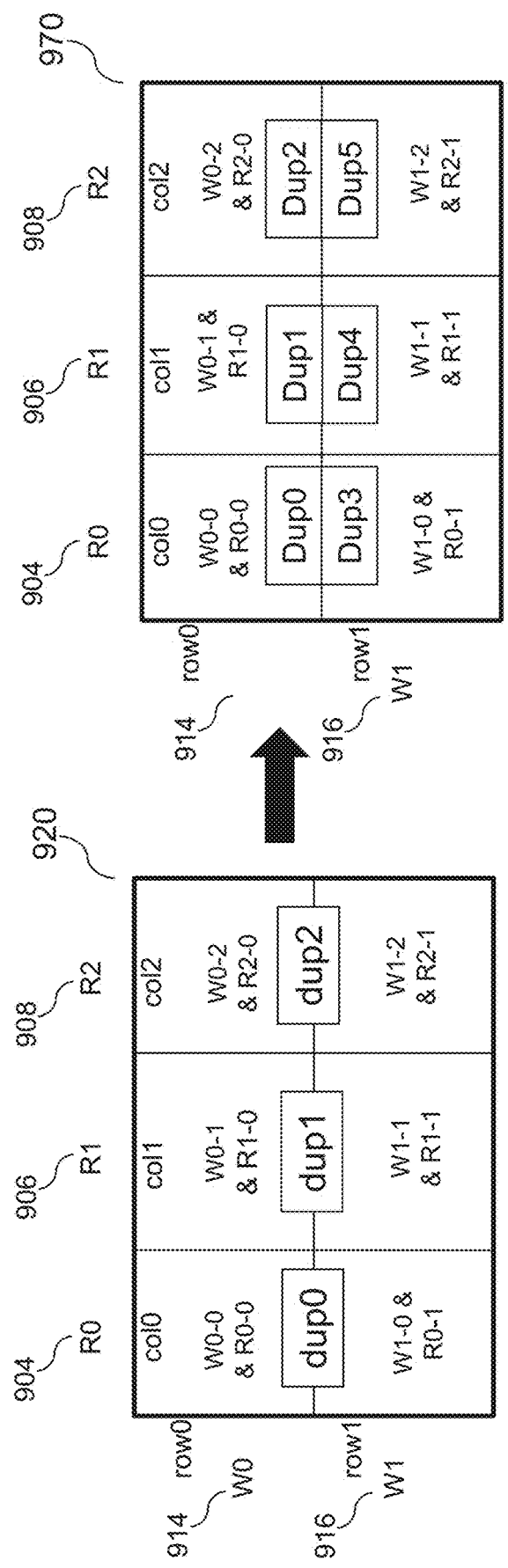
FIG. 11 shows a tensor representation of an initial schedule for both global assignments for the read group and the local assignments for the write group, according to embodiments disclosed herein.
FIG. 12 illustrates a tensor representation of the final (legal) schedule 970 as per the table 960 shown in FIG. 10D, according to embodiments disclosed herein.

FIG. 11 shows a tensor representation 920 of the initial context assignment table 930, also known as "initial schedule 930," for both global assignments for the read group and the local assignments for the write group. This is shown by the rectangles marked as "0," "1," and "2."

FIG. 12 illustrates a tensor representation of the final (legal) context assignment schedule (also known as "final schedule" or "legal schedule") 970 as per the table 960 shown in FIG. 10D. As can be understood, in the representation 970, various data portions of W0 and W1 are in dup0 and dup3 respectively, whereas R0 is in both dup0 and dup3. Similarly, the W0 and W1 are in dup0 and dup3 respectively, whereas R0 is in both dup0 and dup3. In other words, each of the contexts R0, R1, and R2 have their underlying data residing in two different duplicates. R0 has the top half of its data in Dup0 and the bottom half of its data in Dup3. In one example, Dup0 and Dup3 may send their data at different speeds. Therefore, a reorder buffer (ROB) as previously explained is used, which shuffles the data from both duplicates and puts it in the correct order before it is echoed to downstream PCUs.

In some examples, any or all of steps mentioned above can performed in any order until a legal schedule is generated from an initial schedule.

FIG. 13 illustrates the duplicates created including the assigned contexts and their corresponding data portions as per the legal schedule shown in FIG. 10D. Specifically, FIG. 13 includes dup0 1302, dup1 1304, dup2 1306, dup3 1308, dup4 13101, and dup5 1312. Initially the entire access pattern may be dispatched to the duplicates. For example, initially, dup0 1302 includes R0 (both data portions) and W0 (all three data portions), dup1 1304 includes R1 (both data portions) and W0 (all three data portions), and dup0 1306 includes R2 (both data portions) and W0 (all three data portions). Similarly, initially dup3 1308 includes R0 (both data portions) and W1 (all three data portions), dup4 1310 includes R1 (both data portions) and W1 (all three data portions), and dup5 1312 includes R2 (both data portions) and W1 (all three data portions). As can be understood from the table 960, the intersected blocks or overlapping blocks (shown as shaded portions) in each duplicate should be further mapped to the physical memory (PMUs) and therefore the other area in each duplicate needs to be trimmed. In one example, the tensor trimming analysis module 750 is configured to trim the unused portions of the duplicates. For example, in dup0 1302 all blocks except (row0 981, col0) may be trimmed, in dup1 1304 all blocks except (row0 981, col1 973) may be trimmed, in dup2 1306 all blocks except (row0 981, col2) may be trimmed, in dup3 1308 all blocks except (row1 983, col0 971) may be trimmed, in dup4 1310 all blocks except (row1 983, col1 973) may be trimmed, and in dup0 1302, all blocks except (row0 981, col0 971) may be trimmed.

Although not explicitly shown here, after the trimming a dataframe analysis can be performed, which also requires taking intersections of the assigned read and write contexts. In this example, the dataframe in each duplicate happens to cover the whole assigned read data portion and the whole assigned write data portion. For example, in dup0 1302, the intersection includes the whole portion of R0-0 and the whole portion of W0-0, since these data portions completely overlap. As will be shown with regard to FIG. 14, in other examples, the assigned read and write data portions in a duplicate may not completely overlap. In such cases and as a general rule, a dataframe in any duplicate is identified as an intersection of the assigned read and write portions to that duplicate as per the legal schedule. More specifically, the scratchpad trimming and dataframe analyses collectively or independently can include retaining assigned contexts (and their data portions) in each duplicate, removing or ignoring inconsequential contexts from each duplicate, identifying dataframes in duplicates, determining one or more of dataframe bounds, dataframe ranges, or groups of duplicates; determining duplicate-level unions of readers and writes, determining intersections of common readers and writers belonging to one or more group in duplicates, determining group-level unions of readers and writers, and implementing expand-until-contiguity-and-completeness-is-satisfied algorithm.

After the scratchpad trimming and dataframe analysis is complete as mentioned above, the resultant data from each duplicate may be sent to the PMUs. In this example, only one data portion shown in the shaded block of any reader or writer is saved in a duplicate. As such the data in any reader is associated with two duplicates. For example, for the reader R0, R0-0 is associated with dup0 1302, and R0-1 is associated with dup3 1308; for the reader R1, R1-0 is associated with dup1 1304, and R1-1 is associated with dup4 1310; and for the reader R2, R2-0 is associated with dup2 130, and R0-1 is associated with dup3 1312. Therefore, when a full reader made up of two data portions, for example R0 (which included R0-0 and R0-1,) is dispatched to the PMUs, the two data portions come from two different duplicates, and the order in which those data portions arrive in the PMUs may not be known beforehand by the compiler. Therefore, a reorder buffer (ROB) as shown in physical bank view 822 of FIG. 8A may be used to put the data portions in the correct order.

In one example, ROB may not be needed for write data operations, because all write packets for a given write context are sent to all duplicates that have a copy of that context. As explained earlier, each data portion in each context may be further broken into packets. In one example, the algorithm may implement a sender block (not shown) which is configured to send the packets included in any write data portion to the PMUs in the proper ordering. Therefore, each copy of the context in each duplicate knows which packets it should ignore and which ones it should consume; i.e., each copy of the write context steps through the same space, but the predication is set up by the compiler so that only one accepts any given packet). In one example, the ROB is used on the read contexts to guarantee the correct ordering for whichever PMU received the output of its tbuffer.

FIG. 13A illustrates an example flow diagram 1350 of a method for a compiler to perform the tensor duplication and analysis as described with regard to FIGS. 9 to 13.

In one example, at 1352, the method 1350 receives a tensor from a high-level application such as TensorFlow or PyTorch. For example, as shown in FIG. 1B, the users' high-level interface (Samba Flow SDK 10) can receive a PyTorch or TensorFlow. The method 1350 then proceeds to 1354.

At 1354, the method 1350 determines a total number of memory access patterns and their types (readers/writers). For example, as shown in FIG. 9, in the tensor 902, it is initially determined that there are three readers (R0, R1, R2) and two writers (W0 and W1). The method 1350 then proceeds to 1356.

At 1356, the method 1350 determines a critical group of access patterns (with higher number of contexts) and a non-critical group of access patterns (with lower number of contexts). For example, in FIG. 9, it can be determined that since the three read contexts R0, R1, R2 are higher in number than the two write contexts W0, and W1, the read contexts (R0, R1, R2) form a critical group and the write contexts W0, W1 form a non-critical group. The method 1350 then proceeds to 1358.

At 1358, the method 1350 creates an initial schedule with n number of duplicates equal to the number of access patterns in the critical group. For example, FIG. 10A shows an initial schedule with three duplicates since the number of access patterns in the critical group (R0, R1, R2) is three. The method 1350 then proceeds to 1360.

At 1360, the method 1350 assigns critical contexts (or one or more of their data portions) to the n duplicates. For example, as shown in FIG. 10A, in the table 930, the read contexts R0, R1, and R2 (or one or more of their data portions) are assigned to dup0, dup1, and dup2 respectively. The method 1350 then proceeds to 1362.

At 1362, the method 1350 assigns the data portions from the 1st non-critical context to the n duplicates. For example, as shown in FIG. 10A, in the table 930, the data portions (W0-0, W0-1, and W0-2) of the 1st non-critical context W0 are assigned to dup0, dup1, and dup2 respectively. The method 1350 then proceeds to 1364.

At 1364, the method 1350 assigns the data portions from the 2nd non-critical context to the n duplicates. For example, as shown in FIG. 10A, in the table 930, the data portions (W1-0, W1-1, and W1-2) from the 2nd non-critical context are assigned to dup0, dup1, and dup2 respectively. The method 1350 then proceeds to 1366.

At 1366, the method 1350 creates a final assignment schedule by: a) retaining the data portions from the $1^{st}$ non-critical context in the n duplicates, b) assigning x number non-critical data portions from the $2^{nd}$ non-critical context which are colliding with the $1^{st}$ set to x additional duplicates, c) extending critical contexts to the x duplicates. For example, as shown in FIGS. 10B, 10C, and 10D in the table 930, a 1st set of non-critical data portions (write data portions W0-0, W0-1, and W0-2) is retained in dup0, dup1, and dup2 respectively. Since the $2^{nd}$ set of non-critical data portions (W1-0, W1-1, and W1-2) are colliding with the $1^{st}$ set, three more duplicates dup3, dup4, and dup5 are created. Furthermore, the three data portions (W1-0, W1-1, W1-2) from the $2^{nd}$ non-critical set are moved to the three new duplicates dup3, dup4, and dup5 respectively. Furthermore, the critical contexts (R0, R1, and R2) and their corresponding data portions are extended to the additional duplicates dup3, dup4, and dup5. The method 1350 then proceeds to 1368.

At 1368, the method 1350 can the steps from 1358 to 1364 until a final schedule without any collision between contexts of the same type is formed. The method 1350 then proceeds to 1370.

At 1370, the method 1350 can dispatch all the assignments as per the final schedule to the duplicates including the n and x duplicates. For example, the assignments as per the final schedule shown in FIG. 10A, are dispatched to the duplicates as shown in FIG. 12. A tensor view of the initial and final assignments can also be seen in FIG. 11 and FIG. 12 respectively. The method 1350 then proceeds to 1372.

At 1372, the method 1350 can trim all the duplicates to remove unwanted portions. For example, as shown in FIG. 13, the shaded portions in the duplicates dup0 1302, dup1 1304, dup2 1306, dup3 1308, dup4 1310, and dup5 1312 are retained and the non-shaded portions are trimmed or removed. The method 1350 then proceeds to 1374.

At 1374, can provide the data from the trimmed duplicates to the one or more PMUs. For example, the data from the contexts in the trimmed duplicates (shaded portions in dup0 1302, dup1 1304, dup2 1306, dup3 1308, dup4 1310, and dup5 1312 shown in FIG. 13) is provided to one or more PMUs as shown in FIG. 8A. The method 1350 can then go back to the beginning of 1352 to receive another tensor.

Figure 14:
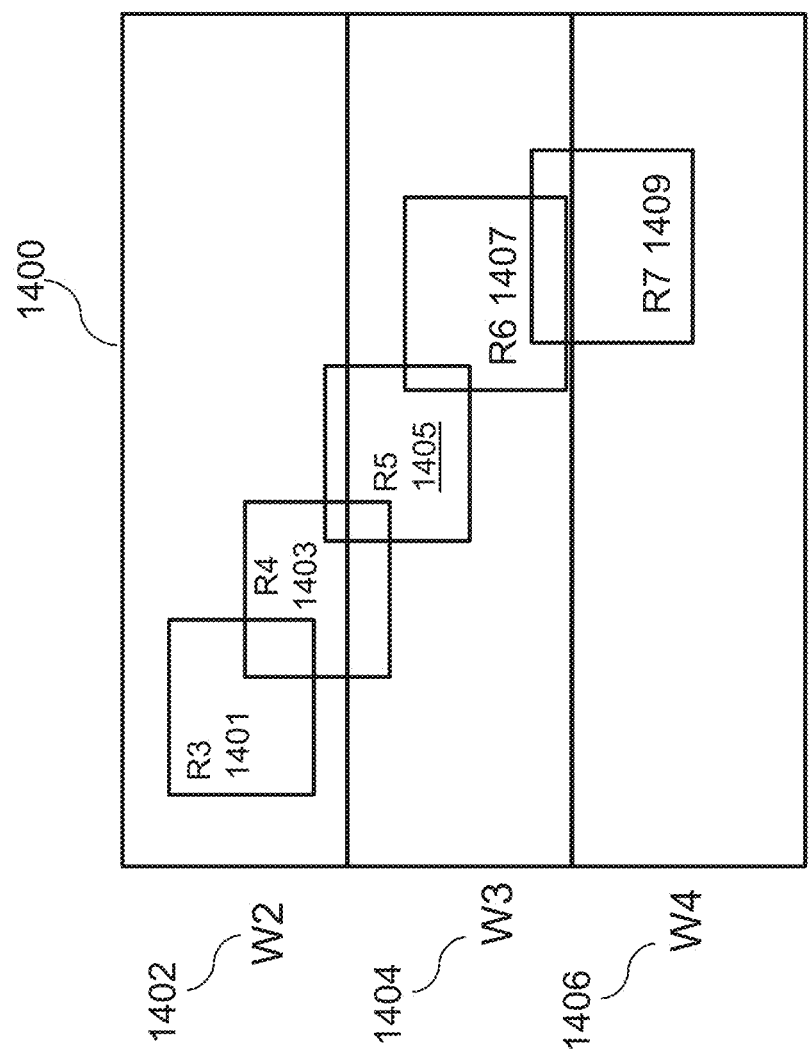
FIG. 14 illustrates an example of a tensor including multiple overlapping readers and writers, according to embodiments disclosed herein.

FIG. 14 illustrates an example of a tensor 1400 including multiple overlapping readers and writers. The tensor 1400 is an example of a 2-d tensor with a write parallelization of three, meaning the user may write to three places in the memory at a time.

The tensor 1400 includes three writers W2 1402, W3 1404, and W4 1406; and five readers R3 1401, R4 1403, R5 1405, R6 1407, and 1409. As can be seen the W2 writes to the top portion of the tensor, the W3 writes to the middle portion of the tensor and the W4 writes to the bottom portion of the tensor. One difference b between the tensor of FIG. 9 and FIG. 14 is that in the tensor 1400, the readers are partially overlapping with each other. In order to bank the tensor 1400, as explained with regard to the tensor 902, the module 722 can perform a memory access pattern analysis, create assignment schedules, and create duplicates accordingly.

The tensor 1400 is an example of a 2-d tensor with two read ports and, meaning the user may read to two places in the memory at a time. The tensor also has a write parallelization of three, meaning the user can write to three places in the memory at a time. In other words, the physical scratchpad resource on-chip (the scratchpad memory 530 shown in FIG. 5) has two data streams coming out of it, and each one is allowed to read anywhere in the scratchpad, which is equivalent to having two contexts attached to it. In the example shown in FIG. 9, there were three reads (R0, R1, R2) and a single-ported memory, so each read was assigned to its own dispatch. In this example, there are five read contexts (R3 1401, R4 1403, R5 1405, R6 1407, and R7 1409) and in one example, those are allowed to double-up on the duplicates. This means that as will be shown in FIGS. 15A and 15B, R3 1401 and R4 1403 can be both assigned to the same duplicate dup6, R5 and R6 to the same duplicate dup10, and R7 to duplicate dup11. As such, in general the number of read ports indicates how many the algorithm can tolerate before moving any contexts to other duplicates.

Figures 15A, 15B:
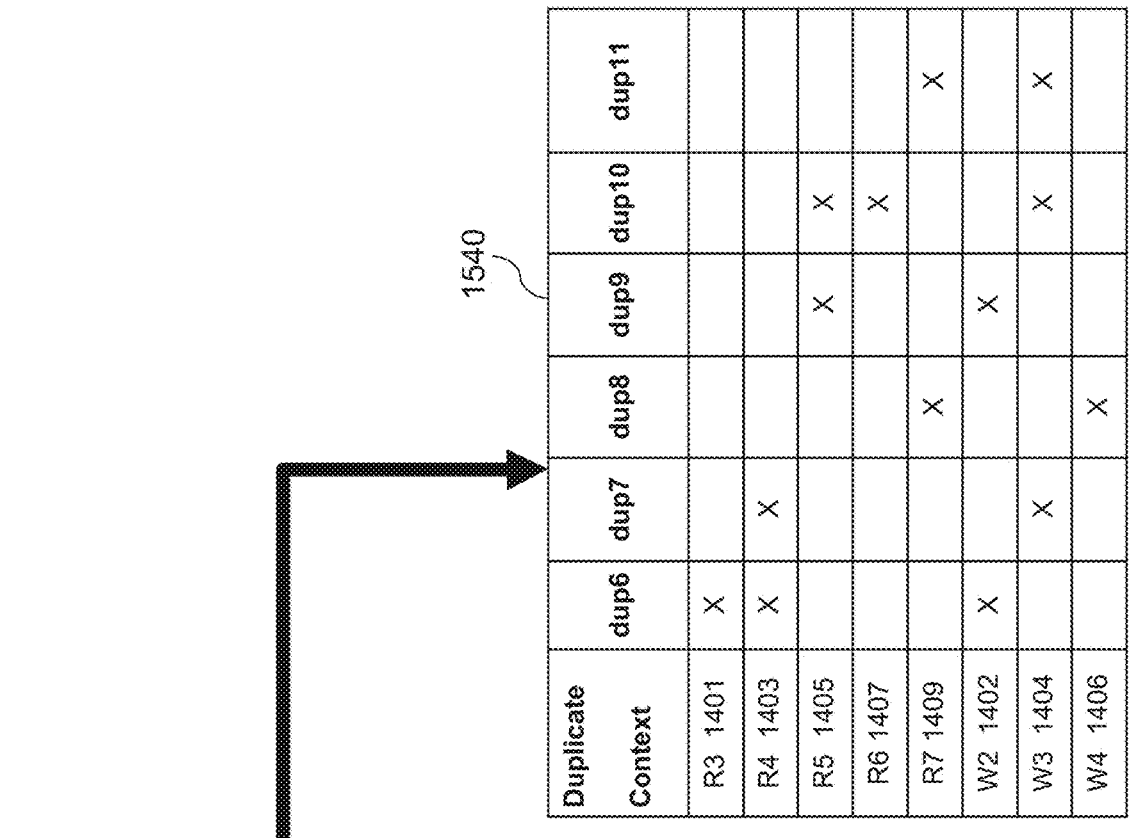
FIG. 15A illustrates an example of an initial schedule in a tabular form, according to embodiments disclosed herein.
FIG. 15B illustrates a final schedule in a tabular form for duplication and assignments for a tensor with multiple overlapping readers and writers, according to embodiments disclosed herein.

FIG. 15A illustrates an example of an initial schedule in the table 1520 and FIG. 15B illustrates a final schedule in a table 1540 for duplication and assignments for the tensor 1400. In order to modify the table 1520 to 1540, an algorithm can implement steps similar to those shown in FIGS.

10A, 10B, 10C, and 10D such as "keep a first context", "move a conflicting context", and "extend a context of a different type."

Figure 16:
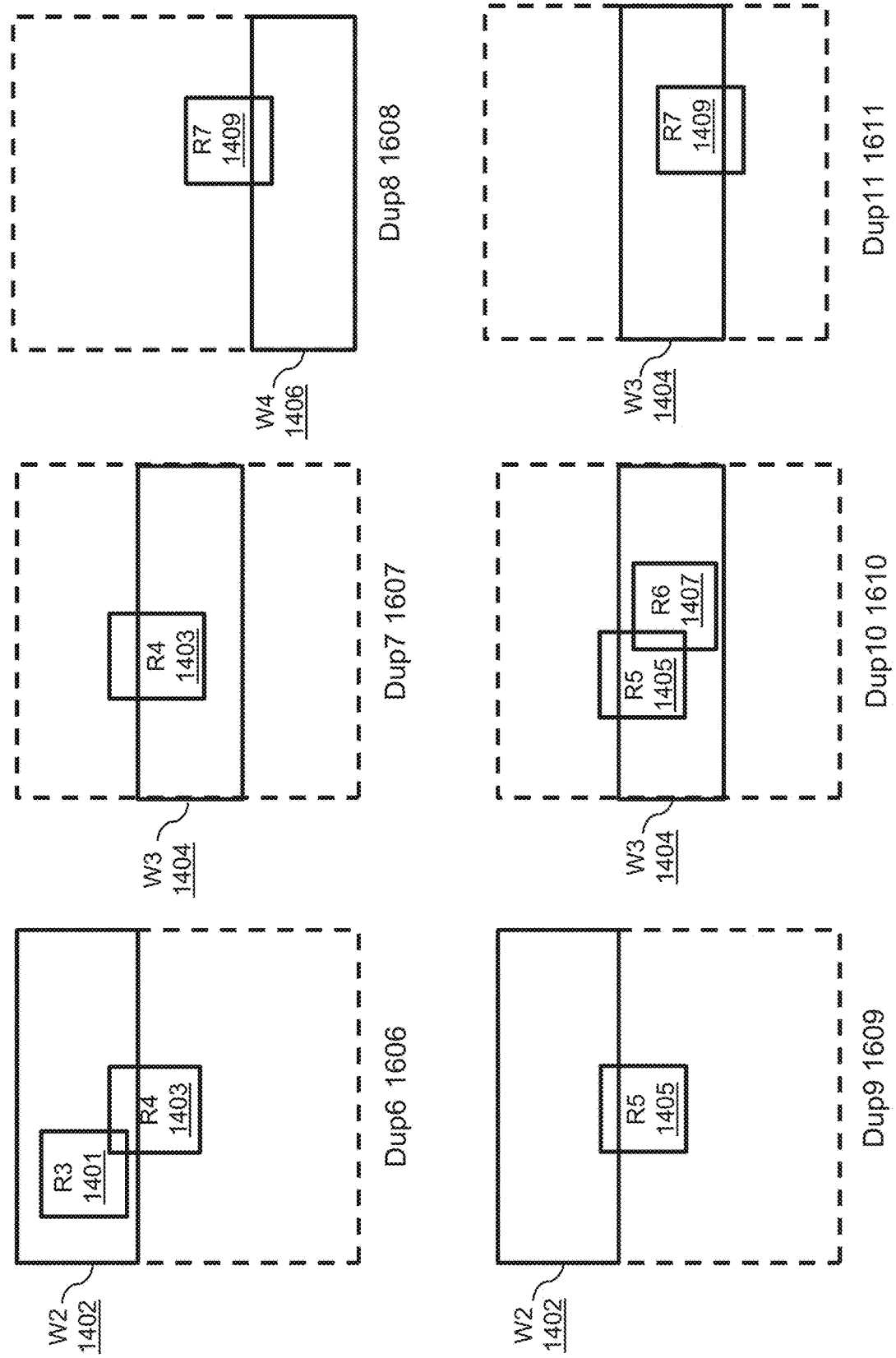
FIG. 16 illustrates the duplicates and the assignments for a tensor based on the final schedule shown in FIG. 15B, according to embodiments disclosed herein.

FIG. 16 illustrates the duplicates and the assignments for the tensor 1400 based on the final schedule 1540. FIG. 16 includes six duplicates dup6 1606, dup7 1607, dup8 1608, dup9 1609, dup10 1610, dup11 1611. The duplicate dup6 1606 includes the readers R3, R4 and the writer W2. The duplicate dup7 1607 includes the reader R4 and the writer W3. The duplicate dup8 1608 includes the reader R7 and the writer W4. The duplicate dup9 1609 includes the readers R5 and the writer W2. The duplicate dup10 1610 includes the readers R5, R6 and the writer W3. The duplicate dup11 1611 includes the readers R7 and the writer W3. As explained earlier with regard to FIG. 13, from each duplicate the intersected portions of the readers and writers need be extracted to be further dispatched to the physical PMUs. However, in this example, in some duplicates the readers and writers are partially overlapping. For example, R4 is partially overlapping with both W2 (dup6) and W3 (dup7), R7 is partially overlapping with both W4 (dup8) and W3 (dup11), R5 is partially overlapping with both W2 (dup9) and W3 (dup10). Therefore, in order to properly extract the data in the most optimized manner from such duplicates (duplicates with partial overlapping,) additional analyses need to be performed. In one example, the additional trimming analyses can include one or more of checking the write bounds, checking the read bounds, and grouping some duplicates implemented via an algorithm.

Such an algorithm may be referred to as a "trimming algorithm duplicates with partially overlapping contexts." In order to implement such an algorithm, the following things may be initially determined: dataframe range, response frame range, and duplicate gang. In one example, a dataframe range can mean a hypercube within the tensor where a duplicate must keep data, a response range can mean a hypercube within a tensor where a specific duplicate must respond (i.e., either send data, zero-predicate packet, or const-predicate packet.) In one example, a dataframe is a subset that is equal to or smaller than the response range. Furthermore, a duplicate gang can mean a group of duplicates that are chained together by duplicate-merging ROBs i.e., grouping those duplicates together which have the same contexts.

Figure 17:
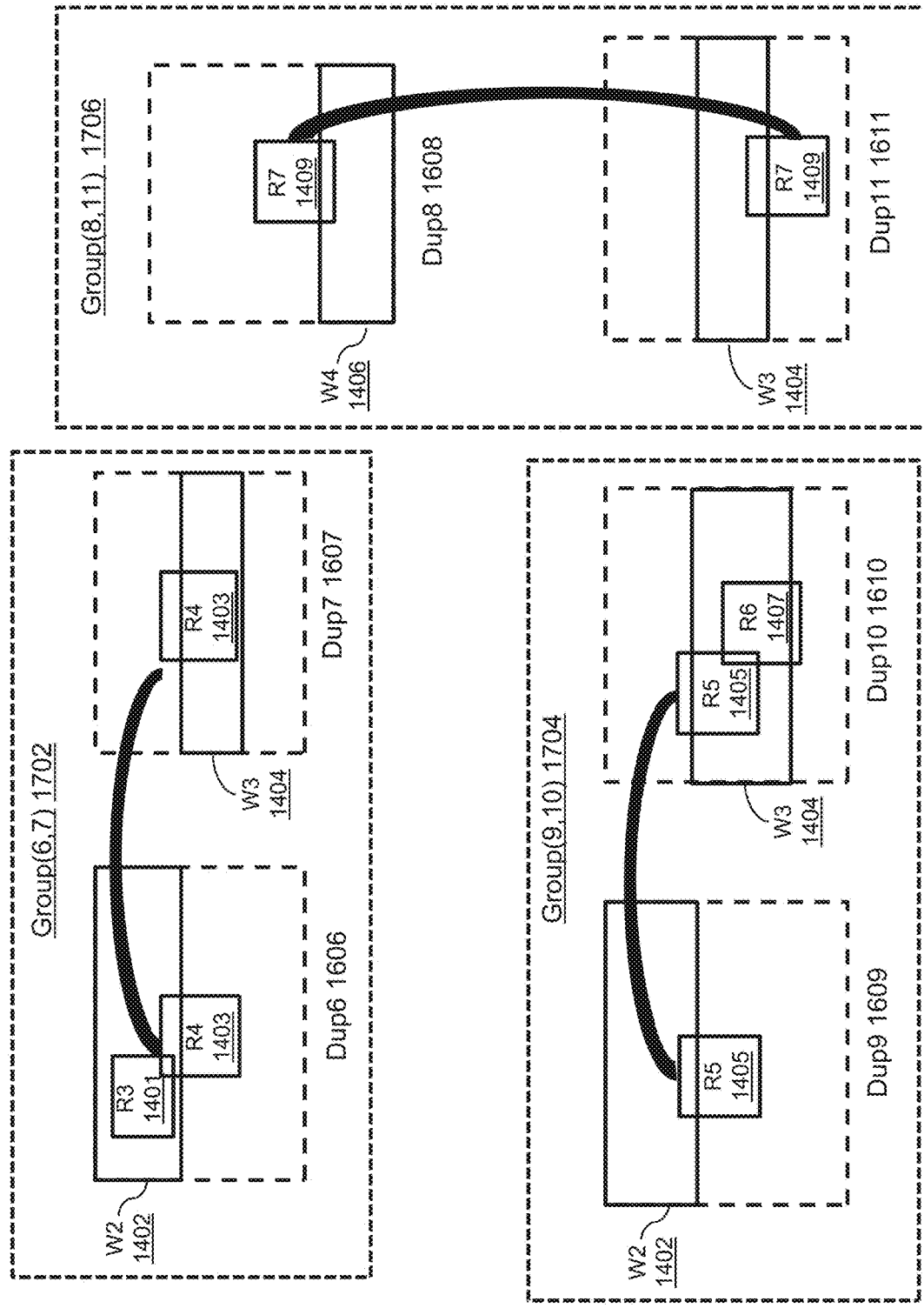
FIG. 17 illustrates an example of forming duplicate gangs, according to embodiments disclosed herein.

FIG. 17 illustrates an example of forming duplicate gangs. Dup6 and dup7 can form a group1 1702 since R4 is common to both. Dup9 and dup10 can form a group2 1704 since R5 is common to both. Dup8 and dup11 can form a group3 1706 since R4 is common to both.

In one example, a duplicate gang is formed in such a way that the union of the dataframe/response bounds of all duplicates satisfies the following two conditions:
1. Completeness: Completely cover the dataframe/response bounds of its duplicate-spanning reads.
2. Disjointedness: No two duplicates from the same gang can claim the same address in their dataframe/response bounds. This guarantees that exactly one duplicate in a gang will be responsible for a request to any particular address. More specifically, the reason for this is that any read context should ideally receive data from exactly one duplicate for any address in its space. For example, in FIG. 17 for R4, any address above the W2-W3 boundary should come from dup6, and below the boundary should come from dup7. Two duplicates that are not part of the same gang can cover any address spaces that they want, even if they overlap.

After the groups are formed, the following four main steps may be performed:
4) In a first main step, dataframe bounds for both reads and writes exclusive to each duplicate are determined; in other words, a duplicate-level union of reads and a duplicate-level union of writes for each duplicate are determined. In one example, this step further includes the following sub-steps:
   a. Take the union of reads that are exclusively dispatched to this duplicate.
   b. Take the union of writes that are exclusively dispatched to this duplicate, relative to the gang a. (i.e., if W is dispatched to duplicates 0 and 1 and the gangs are {0,2}, {1,3}, then W is considered exclusive to 0 and 1).
   c. If (a) and/or (b) are empty, then ignore the "exclusively dispatched" rule and try again.
   d. Take the intersection of (a) and (b).
2) In a second main step, the write bounds that are EXCLUSIVE to a duplicate are determined. In one example, this is performed by taking the union of writes that are exclusively dispatched to this duplicate, relative to the gang a. (i.e., if W is dispatched to {0,1} and the gangs are {0,2}, {1,3}, then W is considered exclusive to 0 and 1).
3) In a third main step, dataframe bounds of each gang are determined. In other words, a group-level union of reads may be determined. In one example, this is performed by taking the union of reads that span multiple duplicates of the gang.
4) In a fourth main and final step, dataframe bounds in each duplicate may be extended until contiguity and completeness conditions are satisfied. In one example, this is performed by starting with the dataframe bounds and extending those one-by-one one until it bumps into either i) some other duplicate's exclusive write bounds or ii) the edge of the gang bounds, whichever comes first. In other examples, unions of reads and writes may be determined for some of duplicates in some of the groups. All of the above steps can be performed in any order as decided by the compiler. The following paragraphs provide some examples of the four mail steps mentioned above for scratchpad trimming.

FIGS. 18A, 18B, and 18C collectively illustrate an example of the first step mentioned above (including the sub-steps a, b, d, in which a duplicate-level union of reads are determined for each duplicate. The sub-step c is not shown as it is an iteration performed by the algorithm.) More particularly, FIG. 18A illustrates the sub-step (a) of the main first step; FIG. 18B illustrates the sub-step (b) of the main first step; FIG. 18C illustrates the sub-step (d) of the main first step.

FIG. 18A illustrates the sub-step (a), i.e., taking the union of reads that are exclusively dispatched to a duplicate. More specifically, the lined portions in each duplicate show the reads that exclusively belong to the particular duplicate. For example, in dup6 1606, R3 1401 belongs exclusively to dup6. In the case of dup7 1607, no reader exclusively belongs to it, so a portion shown as a line-filled rectangle 1811 of R4 1403 can be considered exclusive to it. In the case of dup8 1608 no reader exclusively belongs to it, so a portion shown as a line-filled rectangle 1821 of R7 1409 can be considered exclusive to it. In the case of dup9 1609 no reader exclusively belongs to it, so a portion shown as a line-filled rectangle 1831 of R5 1405 can be considered exclusive to it. In the case of dup10 1610 the reader R6 1407 exclusively belongs to it. In the case of dup11 1611 no reader exclusively belongs to it, so a portion shown as a line-filled rectangle 1851 of R7 1409 can be considered exclusive to it.

FIG. 18B illustrates an example of the sub-step (b) of the main first step mentioned earlier, in which a duplicate-level union of writes are determined for each duplicate. In this step, a union of writes exclusive to a duplicate which is relative to the group may be taken. For example, it may be assumed that a write union for dup6 1606 needs to be determined. The write in dup6 is W2. W2 falls in the dup6 and dup9, however dup6 belongs to the group(6,7) 1702. Therefore, a relative duplicate for W2 in this case is dup6 and W2 may be considered exclusively assigned to dup6. Similarly, for all duplicates, the dataframe bounds for write may be determined. By this determination, the dot-filled rectangles in the duplicates show the writes that exclusively belong to a particular duplicate. As such, in dup6 1606, W2 1402 (also shown as dot-filled rectangle 1805) belongs exclusively to dup6 1606. In the case of dup7 1607, W3 (shown as dot-filled rectangle 1815) belongs exclusively to dup7 1606. In the case of dup8 1608, W4 (shown as dot-filled rectangle 1815) belongs exclusively to dup8 1608. In the case of dup9 1609, W2 1402 (also shown as dot-filled rectangle 1805) belongs exclusively to dup9 1609. In the case of dup10 1610, W3 1404 (also shown as dot-filled rectangle 1815) belongs exclusively to dup10 1610. In the case of dup10 1610, W3 1404 (shown as dot-filled rectangle 1815) belongs exclusively to dup10 1610. In the case of dup11 1611, W3 1404 (also shown as dot-filled rectangle 1815) belongs exclusively to dup11 1611.

FIG. 18C illustrates an example of the sub-step (c) of the main first step mentioned above, in which a duplicate-level intersection of (a) and (b) are shown. As such, FIG. 18C shows for each duplicate the lined portions (union of reads exclusive to that duplicate) and the dot-filled rectangles (union of writes exclusive to that duplicate relative to the gang.) As such, in FIG. 18C, dup6 1606 shows the intersection 1803 (shown as a grid) of R3 1401 and the portion 1805 of W2 1402 exclusive to dup6 1606; dup7 1607 shows the intersection 1813 (shown as a grid) of R4 1403 and the portion 1815 of W3 1404 exclusive to dup7 1607; dup9 1609 shows the intersection 1823 (shown as a grid) of 1831 (the portion of R5 1405 considered exclusive to dup9 1609) and the portion 1805 of W2 1402 exclusive to dup9; dup10 1610 shows the intersection 1833 (shown as a grid) of R6 1407 and the portion 1815 of W3 1404 exclusive to dup10; dup8 1608 shows the intersection 1843 (shown as a grid) and 1821 (the portion of R7 1409 considered exclusive to dup8) and the portion 1825 of W4 1406 exclusive to dup8 1608; and dup11 shows the intersection 1853 (shown as a grid) of 1851 (the portion of R7 1409 considered exclusive to dup11) and the portion 1815 of W3 1404 exclusive to dup11.

FIG. 18D illustrates an example of the second main step mentioned earlier, in which write bounds that are exclusive to each duplicate are determined. This is also known as duplicate-level union of writes and is determined by taking the union of writes that are exclusively dispatched to this duplicate, relative to the gang. For example, dup6 1606 shows the portion 1805 of W2 1402 which is exclusive to dup6 1606; dup7 1607 shows the portion 1815 of W3 1404 which is exclusive to dup7 1607; dup9 1609 shows the portion 1805 of W2 1402 which is exclusive to dup9 1609; dup10 1610 shows the portion 1815 of W3 1404, which is exclusive to dup10 1610; dup8 1608 shows the portion 1825 of W4 1406 which is exclusive to dup8 1608; and dup11 1611 shows the portion 1815 of W3 1404 which is exclusive to dup11 1611. FIG. 18D is similar to FIG. 18B as both the figures show duplicate-level union of writes. One difference between the two figures is that FIG. 18B shows both reads and writes, whereas FIG. 18D shows only the writes.

FIG. 18E illustrates an example of the third main step mentioned above, in which a group-level union of reads is determined. As shown, 1802 is a union of dup6 1606 and dup7 1606 in the group(6,7) 1702, with both readers R3, R4 and both writers W2, W3. 1804 is a union of dup9 1609 and dup10 1610 in the group(9,10) 1704, with both readers R5, R6 and both writers W2, W3. 1806 is a union of dup8 1608 and dup11 1611 in the group(8,11) 1706, with readers R7, R6 and both writers W3, W4.

FIG. 18F illustrates a first example of the fourth step mentioned above for dup6 1606 and dup7 1607, in which dataframe bounds in a duplicate are extended until contiguity and completeness conditions are satisfied. As explained earlier, in this step while extending the dataframes of a duplicate, initially a starting bound for each dataframe can be chosen, may be then extended if any of the following conditions is satisfied: 1) the starting bound joins another duplicate's exclusive write bound, 2) an edge of a duplicate gang, whichever comes first.

Specifically, shown is an initial view 1880 in which dup6 1606 shows the reader R3 in its original form; 1890 shows a modified view of the dup6. In one example, the bounds of the reader R3 are extended to join with a bound of the R4 to convert that to 1860. More specifically, the dataframe bounds for the reads that span multiple duplicates are taken. In one example, the algorithm can start from the edge of a first read and blow it up until it hits the edge of a second read or the edge of the other duplicate's intersection space (whichever happens first). For example, in FIG. 18E, for the group(6,7) 1702, a dataframe can be marked from the edge0 1855 of R3 1401 and is blown up until it hits the edge1 1865 of R4 1403 or the dup7 1607's intersection space i.e., edge2 1875. In this case, the edge1 1865 comes before the edge2 1875, therefore, the resultant dataframe bound for dup6 1606 is shown as the gray region 1860. Similarly, in case of dup7 1607, the dataframe can start at the edge3 1885 and be blown up until it hits the edge4 1895 and edge2 1875, since after that it will cross the intersection space of the dup6. As such, the resultant dataframe bounds for duplicate dup7 1607 can be seen as the gray region 1870, which in this case is the same as 1811. In other examples, there can be other ways to extend the dataframe bound for each duplicate gang. Such a read dataframe bound for a group is also known as group-level read union.

FIG. 18G illustrates a second example of the fourth main step mentioned above for duplicates dup9 1609 and dup10 1610, in which their dataframe bounds are extended until contiguity and completeness conditions are satisfied. Specifically, shown is an initial view 1884 in which dup10 1610 shows the reader R6 in its original form and 1894 shows a modified view of the dup10 1610. In one example, the bounds of the reader R6 are extended to join with a bound of the R5 to convert that to 1874. More specifically, the dataframe bounds for the reads that span multiple duplicates are taken. In one example, the algorithm can start from the edge of a first read and blow it up until it hits the edge of a second read or the edge of the other duplicate's intersection space (whichever happens first). For example, in FIG. 18F, for the dup10 1610, a dataframe bound can start from the edge8 1887 of R6 and is blown up until it hits the edge9 1897 of R5 or the dup9 1609's intersection space i.e., edge7 1877. In this case, the edge9 1897 comes before the edge7 1877, therefore, the resultant dataframe bound for dup10 1610 is shown as the gray region 1874. Similarly, in case of dup9 1609, the dataframe can start at the edge5 1857 and be blown up until it hits the edge6 1867 and edge7 1877, since after that it will cross the intersection space of the dup10. As such, the resultant dataframe bounds for duplicate du9 1609 can be seen as the gray region 1864, which in this case the same as 1831. In other examples, there can be other ways to extend the dataframe bound for each duplicate gang. Such a read dataframe bound for a group is also known as group-level read union. For other duplicate dup8 1608 and dup11 1611, also the dataframe bounds may be extended as explained above.

FIG. 18H illustrates a third example of the fourth main step mentioned above for duplicates dup8 1608 and dup11 1611, in which their dataframe bounds are extended until contiguity and completeness conditions are satisfied. Specifically, shown is an initial view 1886 and a modified view 1896 for the group(8,11) 1706 including du8 1608 and dup11 1611. In the initial view 1886, the dup8 1608 and dup11 1611 show the reader R7 1409 in its original form. In the modified view 1896, the dup8 1608 and dup11 1611 show the reader R7 1409 in its modified form. Since in this case each duplicate has only the reader R7 1409, a dataframe bound can be extended from one edge to another edge in the same duplicate and further until a common edge between the two duplicates before it crosses into another duplicate's intersection space. For example, in dup8 1608, the dataframe bound can start at the edge edge10 1848 and be blown up until the edge edge11 1858 and further until the edge12 1868 since the edge12 1868 is common between the dup8 1608 and dup11 1611. Similarly, in dup11 1611, the dataframe bound can start at the edge edge13 1878 and be blown up until the edge edge14 1888 and further until the edge12 1868 since the edge12 1868 is common between the dup8 1608 and dup11 1611.

Similarly, in case of dup11 1611, the dataframe can start at the edge3 1885 and be blown up until it hits the edge4 1895 and edge12 1868, since after that it will cross the intersection space of the dup8. As such, the resultant dataframe bounds for duplicate dup8 1608 can be seen as the gray region 1866, which in this case is the same as 1821. The resultant dataframe bounds for duplicate dup11 1611 can be seen as the gray region 1876, which in this case is the same as 1851. As such, the resultant read dataframe bound for the group(8,11) 1706, also known as group-level read union is shown as the gray shaded regions 1866 and 1876.

FIG. 18I illustrates an example of all resultant duplicates dup6 1606 to dup 1611 after the dataframe bounds in those have been extended as per the above conditions shown as gray regions 1860 in dup6 1606, 1870 in dup7 1607, 1866 in dup8 1608, 1864 in dup9 1609, 1874 in dup10 1610, and 1876 in dup11 1611. In one example, the gray shaded regions are retained while the other portions are trimmed. Furthermore, the data from the trimmed duplicates is provided to one or more PMUs.

FIG. 19 illustrates an example flow diagram of a method 1900 for trimming a tensor duplicate with common contexts (in this case readers.) The method 1900 can be performed by the trimming and analysis module 750. As shown, at 1902 receive multiple duplicates of a tensor including overlapping access patterns. The multiple duplicates can be the result of a final assignment schedule shown in FIG. 15B.

At step 1904, the method can form a group of two or more duplicates which include a common access pattern. An example of this is shown in FIG. 17. As shown in FIG. 17, duplicates dup6 1606 and dup7 1607 are grouped together as the group(6,7) 1702; duplicates dup8 1608 and dup11 1611 are grouped together as group(8,11) 1706; and duplicates dup9 1609 and dup10 1610 are grouped together as group (9,10) 1704.) The method then proceeds to step 1906.

At step 1906, the method can determine dataframe bounds exclusive to each duplicate in the group. An example of this is shown in FIG. 18A and FIG. 18B. As explained earlier, FIG. 18A illustrates:
a) group(6,7) 1702 in which the shaded portion 1801 of R3 is exclusive to dup6 1606 and the shaded portion 1811 of R4 is exclusive to dup7 1607;
ii) group(9,10) 1704 in which the shaded portion 1831 of R5 is exclusive to dup9 1609 and the shaded portion 1841 of R6 is exclusive to dup10 1610); and
iii) and group(8,11) 1706 in which the shaded portion 1821 of R7 is exclusive to dup8 1608 and the shaded portion 1851 of R7 is exclusive to dup11 1611.

All of the shaded portions in FIG. 18A are read dataframe bounds that are exclusive to their corresponding duplicates in the corresponding groups.

Similarly, FIG. 18B illustrates:
i) group(6,7) 1702 in which the dot-filled portion 1805 of W2 is exclusive to dup6 1606 and the dot-filled portion 1815 of W3 is exclusive to dup7 1607;
ii) group(9,10) 1704 in which the dot-filled portion 1805 of W2 is exclusive to dup9 1609 and the dot-filled portion 1815 of W3 is exclusive to dup10 1610; and
iii) group(8,11) 1706 in which the dot-filled portion 1825 of W4 that is exclusive to dup8 1608; and the dot-filled portion 1815 of W3 that is exclusive to dup11 1611.

All of the dot-filled portions are write dataframe bounds that exclusive to their corresponding duplicates. The method then proceeds to step 1908.

At step 1908, the method can take a union of reads that are exclusively dispatched to a particular duplicate. Such a read union is also known as a duplicate-level read union. The duplicate-level read union can be zero or nonzero. For example, referring to FIG. 18A in group(6,7) 1702, for dup6 1606, the union reads is equal to R3 1801, but the union of reads for dup7 1607 is zero. For group(9,10) 1704 the union of reads for dup9 1609 is zero and for dup10 1610 the union of reads is equal to R6 1841. For group(8,11) 1706 the union of reads for dup8 1608 is zero and for dup11 1611 the union of reads is also zero.

At step 1910, the method can take a union of writes that are exclusively dispatched to a duplicate which is relative to the group. Such a write union is also known as a duplicate-level write union. The duplicate-level write union of writes can be zero or nonzero. For example, referring to FIG. 18B in group(6,7) 1702, for dup6 1606, the union writes is equal to W2 1805 and the union of writes for dup7 1607 is W3 1815. For group(9,10) 1704 the union of writes for dup9 1609 is W2 1805 and for dup10 1610 the union of writes is equal to W3 1815. For group(8,11) 1706 the union of writes for dup8 1608 is W4 1825 and for dup11 1611 the union of writes is W3 1815.

At step 1912, the method can check if the union of reads or writes is equal to zero, if so then the method can go back to the beginning of 1906. If not, meaning that a union of reads or union of writes is nonzero, then the method can proceed to 1914. For example, as explained with regards to step 1908, in the case when union of reads is zero i.e., for dup7 1607, dup8 1608, and dup11 1611, the method can iterate through the steps 1906 to 1912 until non-zero union is found. In one example, the method can quit the iteration and move to the step 1914.

At step 1914, an intersection of the union of reads and writes for each duplicate may be taken. For example, in FIG. 18A, for dup6 1606, an intersection of union of reads R3

1801 and union of writes W2 1805 is taken. Specifically, for dup7 1607 an intersection of union of reads (zero) and union writes (W3 1815) is taken. For dup9 1609, an intersection of the union of reads (zero) and the union writes (W2 1805) is taken. For dup10 1610, an intersection of the union of reads (R6 1841) and the union writes (W3 1815) is taken. For dup8 1608, an intersection of the union of reads (zero) and union writes (W4 1825) is taken. For dup11 1611, an intersection of the union of reads (zero) and the union writes (W3 1815) is taken. The method then proceeds to step 1916.

At step 1916, the method may determine the read dataframe bounds for each gang. And further proceed to step 1918. More specifically, the dataframe bounds for the reads that span multiple duplicates are taken. In one example, the method can logically start marking a dataframe from the edge of a first read and blow it up until it hits the edge of a second read or the edge of the other duplicate's intersection space (whichever happens first). For example, referring to FIG. 18E, for the group(6,7) 1702, a dataframe can be marked from the edge0 1855 of R3 1801 and is blown up until it hits the edge1 1865 of R4 or the dup7 1607's intersection space i.e., edge2 1875. In this case, the edge1 1865 comes before the edge2 1875, therefore, the resultant dataframe bound for dup6 1606 is shown as the gray region 1860. Similarly, in case of dup7 1607, the dataframe can start at the edge3 1885 and be blown up until it hits the edge4 1895 and edge2 1875, since after that it will cross the intersection space of the dup6. As such, the resultant dataframes bound for duplicate 7 can be seen as the gray region 1870, which is the same as 1811. In other examples, there can be other ways to extend the dataframe bound for each duplicate gang. Such a read dataframe bound for a group is also known as group-level read union. The method can then proceed to step 1918.

At step 1918, the results of the step 1914 (taking intersection of group-level union of reads for each gang) and results of the step 1916 (determining the read dataframe bounds for each gang) may be combined and an expand-until-contiguity-and-completeness-is-satisfied algorithm may be performed on the combined results. on those results. In other words, the method may start with the result of the intersection of the union of reads and writes for each duplicate and blow that up until the result entirely eclipses the dataframe bound for each gang. This may be repeated for each gang.

Referring briefly to FIG. 13, all of the above steps illustrated in FIG. 19 are equivalent to the step 1372, i.e., "trim all the duplicates to retain portions including their corresponding assigned contexts and remove portions that are inconsequential to the assigned contexts." As can be understood, after the step 1918, the gray shaded regions are retained while the other portions are trimmed. Furthermore, the data from the trimmed duplicates is provided to one or more PMUs.

FIG. 20 illustrates an example of a 1-d tensor 2002 including multiple memory access patterns including three writers W5 2005, W6 2006, W7 2007, readers in a first group A, A_R8 2008, A_R9 2009, and readers in a second group B, B_R10 2010, B_R11 2011, B_R12 2012, B_R13 2013, and B_R14 2014. As can be seen the readers in group A overlap with readers in group B. The tensor 2002 shows a parallelization of three as there are three writers, meaning that the user can write to three places in the logical memory in parallel. Similar to the tensors 902 and 1402, the tensor 2002 can also be banked by performing the various steps including memory access pattern analysis, creating initial and final assignment schedules, the details of which are shown in FIGS. 21A and 21B.

FIG. 21A illustrates an example of an initial assignment schedule 2100 for the tensor 2002. As can be seen, the initial assignment schedule 2100 includes five duplicates (dup12 to dup16). By keeping, moving, and extending some of the contexts in the initial assignment schedule 2100, a final (legal) assignment schedule 2150 is created as shown in FIG. 21B.

FIG. 21B illustrates an example of a final (legal) assignment schedule 2150 for the tensor 2002. As can be seen, the final (legal) assignment schedule 2150 includes eight duplicates (dup12 to dup19) without any conflicting assignments.

In the process of assignments and duplication mentioned above from a final schedule to duplicates, the user can choose to either manually assign a context to a duplicate (recommended to speed up compilation) or let the compiler determine which context gets dispatched to which duplicate during a portion of the algorithm called as "prebanking." The prebanking algorithm may be suitable in case of rolled, parallelized contexts or if the user does know how to assign the duplicates. More details about rolled and parallelized contexts are described in a related, U.S. Nonprovisional patent application Ser. No. 17/878,504, filed Aug. 1, 2022, entitled "DETERMINING AND USING MEMORY UNIT PARTITIONING SOLUTIONS FOR RECONFIGURABLE DATAFLOW COMPUTING SYSTEMS," (which is incorporated herein in its entirety. Both methods can provide the same attributes in the MAC/AIR (algebraic graph compiler) 20/25 layer as shown in FIG. 1B.

In the above examples, when a context is dispatched to a specific duplicate (either manually or via the compiler), it is a relative duplicate, relative to the other contexts in its partition group. In other words, when a context is dispatched to a duplicate, its original address space/location is retained. For example, referring to FIG. 9, the tensor 902 shows the original address space of all readers and writers. W1-0 is in the address space 903, so when that is dispatched to dup3 1308 shown in FIG. 13, it is located in the same address space (location) as that in the tensor 902.

FIG. 22 illustrates an example pseudocode 2200 corresponding to portions of the method 1350 shown in FIG. 13A, according to embodiments disclosed herein. More specifically, the pseudocode 2200, which includes example statements 2202 and 2204, can be used for implementing the steps 1360 to 1368 (assigning critical contexts to the n duplicates, assigning 1st and 2nd sets of non-critical contexts to the n duplicates, and creating a final assignment schedule such that no duplicate tensor has more contexts of a particular type than ports of that type.) The statement 2202 includes a nested for loop which can implement moving and keeping of contexts as depicted in FIGS. 10A to 10D. The statement 2204 includes a conditional statement for extending contexts as depicted in FIGS. 10A to 10D.

Examples of various embodiments are described in the following paragraphs:

Example 1: A method for a data processing system comprising: an array of reconfigurable units including a plurality of pattern compute units (PCUs) and a plurality of pattern memory units (PMUs), each of the plurality of the PMUs further comprising a memory having one or more first type of (read) I/O ports and one or more second type of (write) I/O ports, the method comprising: receiving by a compiler, a tensor including 'n' read memory access patterns or 'm' write memory access patterns located in a logical memory of the compiler, a read memory access pattern (read context)

including a read memory access (read data region) and a write memory access pattern (write context) including a write memory access (write data region), creating by the compiler, a plurality of copies of the tensor to create a plurality of duplicate tensors, assigning by the compiler, up to 'n' read contexts or up to 'm' write contexts to one or more duplicate tensors, such that no duplicate tensor has more contexts of a particular type than ports of that type, trimming by the compiler, a duplicate tensor to retain portions including its corresponding assigned contexts and remove portions that are inconsequential to the assigned contexts, and dispatching by the compiler the assigned contexts in the duplicate tensor to one or more of the plurality of the PMUs.

Example 2: The method of example 1, wherein the first type of context is a read context including read data corresponding to a read operation to be performed in a physical memory location in the array of reconfigurable units.

Example 3: The method of example 1, wherein the second type of context is a write context including write data corresponding to a write operation to be performed in a physical memory location in the array of reconfigurable units.

Example 4: The system of example 2, wherein the read data includes a first read data portion and a second read data portion and the write data includes a first write data portion and a second write data portion.

Example 5: The method of example 4, further comprising: assigning the first read data portion to a first PMU and the second read data portion to a second PMU.

Example 6: The method of example 5, further comprising: assigning the first read data portion from the first PMU and the second read data portion from the second PMU to a reorder buffer in any order and placing by the reorder buffer, the first read data portion and the second read data portion in a correct order to generate an ordered read data.

Example 7: The method of example 6, further comprising: to reading from a physical memory location in the array of reconfigurable units, corresponding to the ordered read data.

Example 8: The method of example 2, further comprising writing to a physical memory location in the array of reconfigurable units, corresponding to the write data.

Example 9: The method of example 2, wherein the two or more read contexts or are overlapping.

Example 10: The method example 2, wherein the two or more write contexts are overlapping.

Example 11: A method of translating logical memory access patterns, each including one or more memory accesses (contexts,) in a tensor onto an array of reconfigurable units including a plurality of pattern compute units (PCUs) and a plurality of pattern memory units (PMUs), the method comprising: receiving a tensor by a compiler, determining a total number of memory access patterns in the tensor, determining a type of each memory access pattern, determining a critical group of memory access patterns including critical contexts, determining one or more non-critical groups of access patterns including non-critical contexts, creating n copies of the tensor to create n duplicate tensors wherein n is equal to the number of access patterns in the critical group, creating an initial assignment schedule with the n duplicate tensors by: assigning the critical contexts to the n duplicate tensors, assigning a $1^{st}$ set of non-critical contexts to the n duplicate tensors, assigning a $2^{nd}$ set of non-critical contexts to the n duplicate tensors, creating a final assignment schedule by: retaining the $1^{st}$ set of non-critical contexts in the n duplicate tensors, assigning to x additional duplicate tensors, x contexts from the $2^{nd}$ set of non-critical contexts which are colliding with the 1st set, and extending the critical contexts to the x additional duplicate tensors; dispatching all the contexts as per the final assignment schedule to the n and the x duplicate tensors such that no duplicate tensor has more contexts of a particular type than ports of that type; trimming each duplicate tensor to retain portions including its corresponding assigned contexts and remove portions that are inconsequential to the assigned contexts; and providing the assigned contexts from the trimmed duplicate tensors to a set of PMUs.

Example 12: A data processing system comprising: an array of reconfigurable units including a plurality of pattern compute units (PCUs) and a plurality of pattern memory units (PMUs), each of the plurality of the PMUs further comprising a memory having one or more read I/O ports and one or more write I/O ports, a compiler configured to receive a tensor including 'n' (one or more) memory access patterns of a first type (read) and 'm' (one or more) memory access patterns of a second type (write) located in a logical memory of the compiler, each memory access pattern of the first type (read) including a first type (read) of memory access (read context) and each memory access pattern of the second type (write) including a second type (write) of memory access (write context), wherein the compiler is further configured to create a plurality of copies of the tensor to create a plurality of duplicate tensors, assign, up to 'n' (one or more) first type of contexts and up to 'm' (one or more) of the second type of contexts to one or more duplicate tensors, such that such that no duplicate of the tensor has more contexts of a particular type than ports of that type, trim a duplicate tensor to retain portions including its corresponding assigned contexts and remove portions that are inconsequential to the assigned contexts, and dispatch the assigned contexts in the duplicate tensor to one or more of the plurality of the PMUs.

Example 13: The system of example 12, wherein the first type of context is a read context including read data corresponding to a read operation to be performed in a physical memory location in the array of reconfigurable units.

Example 14: The system of example 12, wherein the second type of context is a write context including write data corresponding to a write operation to be performed in a physical memory location in the array of reconfigurable units.

Example 15: The system of example 13, wherein the read data includes a first read data portion and a second read data portion and the write data includes a first write data portion and a second write data portion.

Example 16: The system of example 15, wherein the first read data portion is assigned to a first PMU and the second read data portion is assigned to a second PMU.

Example 17: The system of example 16, wherein the first read data portion from the first PMU and the second read data portion from the second PMU are further assigned to a reorder buffer in any order and wherein the reorder buffer is configured to place the first read portion and the second read portion in a correct order to generate an ordered read data.

Example 18: The system of example 17, wherein the compiler is further configured to read from a physical memory location in the array of reconfigurable units, corresponding to the ordered read data.

Example 19: The system of example 14, wherein the compiler is further configured to write to the physical memory location in the array of reconfigurable units, corresponding to the write data.

Example 20: The system of example 13, wherein the two or more read contexts are overlapping.

Example 21: The system of example 14, wherein the two or more write contexts are overlapping.

Example 22: A system comprising: an array of reconfigurable units including a plurality of pattern compute units (PCUs) and a plurality of pattern memory units (PMUs), each of the plurality of the PMUs further comprising a memory having one or more first type of (read) I/O ports and one or more second type of (write) I/O ports, a compiler configured to receive a tensor including a plurality of memory access patterns (contexts,) each memory access pattern further including one or more memory accesses (data regions), wherein the compiler is further configured to determine a total number of memory access patterns in the tensor, determine a type of each memory access pattern, determine a critical group of memory access patterns with a higher number of contexts, determine a non-critical group of memory access patterns with a lower number of contexts, create an initial assignment schedule with n number of duplicates equal to the number of access by: assigning the critical contexts to the n duplicates, assigning a 1st set of non-critical contexts to the n duplicates, assigning a $2^{nd}$ set of non-critical contexts to the n duplicates, creating a final assignment schedule by: retaining the $1^{st}$ set of non-critical contexts in the n duplicates, assigning the x contexts from the $2^{nd}$ set of non-critical contexts which are colliding with the 1st set to x additional duplicates, extending critical contexts to the x duplicates, dispatching all the assignments as per the final schedule to the n and the x duplicates such that such that no duplicate tensor has more contexts of a particular type than ports of that type, trimming each duplicate to retain portions including its corresponding assigned contexts and remove portions that are inconsequential to the assigned contexts, and providing the contexts from the trimmed duplicates to a set of PMUs.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator.

An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, which may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

In one embodiment, each of the AGCUs may be allocated a specific bandwidth to access TLN. This is similar to VAGs participating and winning arbitration to get access to the TLN. For example, the CGR processor 110 may include one or more AGCU arbiters to arbitrate among the AGCUs 202 to 232 to gain access to the TLN agents 244 to 266. The arbiter may be implemented in hardware or software or both.

In one example, a software implemented arbiter may keep a table of AGCUs and their need to access the external memory devices or host. Those AGCUs which have a higher bandwidth demand to access the external memory devices or host, may be assigned a higher priority than those which have a lower need. The higher priority AGCUs may be selected to access TLN. In other words, the higher priority AGCUs may get more bandwidth on the TLN than the lower priority ones.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations in the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a CGRA system, a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. Implementations may be as a single chip, or as a multi-chip module (MCM) packaging multiple semiconductor dies in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more RDUs to execute a high-level program. Furthermore, one or more implementations of the technology or elements thereof can be implemented in the form of an apparatus including a memory and at least one processor that is coupled to the memory and operative to perform exemplary method steps, and/or an RDU that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit of the technology disclosed.

We claim as follows:

1. A method for a data processing system comprising: an array of reconfigurable units including a plurality of pattern compute units (PCUs) and a plurality of pattern memory units (PMUs), each of the plurality of the PMUs further comprising a memory having one or more first type of (read) I/O ports and one or more second type of (write) I/O ports, the method comprising:

receiving by a compiler, a tensor including 'n' read memory access patterns or 'm' write memory access patterns located in a logical memory of the compiler, a read memory access pattern (read context) including a read memory access (read data region) and a write memory access pattern (write context) including a write memory access (write data region), creating by the compiler, a plurality of copies of the tensor to create a plurality of duplicate tensors, assigning by the compiler, up to 'n' read contexts or up to 'm' write contexts to one or more duplicate tensors, such that no duplicate tensor has more contexts of a particular type than ports of that type, trimming by the compiler, a duplicate tensor to retain portions including its corresponding assigned contexts and remove portions that are inconsequential to the assigned contexts, and dispatching by the compiler the assigned contexts in the duplicate tensor to one or more of the plurality of the PMUs.

2. The method of claim 1, wherein the first type of context is a read context including read data corresponding to a read operation to be performed in a physical memory location in the array of reconfigurable units.

3. The method of claim 1, wherein the second type of context is a write context including write data corresponding to a write operation to be performed in a physical memory location in the array of reconfigurable units.

4. The method of claim 2, wherein the read data includes a first read data portion and a second read data portion and the write data includes a first write data portion and a second write data portion.

5. The method of claim 4, further comprising: assigning the first read data portion to a first PMU and the second read data portion to a second PMU.

6. The method of claim 5, further comprising: assigning the first read data portion from the first PMU and the second read data portion from the second PMU to a reorder buffer in any order and placing by the reorder buffer, the first read data portion and the second read data portion in a correct order to generate an ordered read data.

7. The method of claim 6, further comprising: to reading from a physical memory location in the array of reconfigurable units, corresponding to the ordered read data.

8. The method of claim 2, further comprising writing to a physical memory location in the array of reconfigurable units, corresponding to the write data.

9. The method of claim 2, wherein the two or more read contexts are overlapping.

10. The method of claim 2, wherein the two or more write contexts are overlapping.

11. A data processing system comprising:

an array of reconfigurable units including a plurality of pattern compute units (PCUs) and a plurality of pattern memory units (PMUs), each of the plurality of the PMUs further comprising a memory having one or more read I/O ports and one or more write I/O ports, a compiler configured to receive a tensor including 'n' (one or more) memory access patterns of a first type (read) and 'm' (one or more) memory access patterns of a second type (write) located in a logical memory of the compiler, each memory access pattern of the first type (read) including a first type (read) of memory access (read context) and each memory access pattern of the second type (write) including a second type (write) of memory access (write context), wherein the compiler is further configured to create a plurality of copies of the tensor to create a plurality of duplicate tensors, assign, up to 'n' (one or more) first type of contexts and up to 'm' (one or more) of the second type of contexts to one or more duplicate tensors, such that such that no duplicate of the tensor has more contexts of a particular type than ports of that type, trim a duplicate tensor to retain portions including its corresponding assigned contexts and remove portions that are inconsequential to the assigned contexts, and dispatch the assigned contexts in the duplicate tensor to one or more of the plurality of the PMUs.

12. The system of claim 11, wherein the first type of context is a read context including read data corresponding to a read operation to be performed in a physical memory location in the array of reconfigurable units.

13. The system of claim 11, wherein the second type of context is a write context including write data corresponding to a write operation to be performed in a physical memory location in the array of reconfigurable units.

14. The system of claim 12, wherein the read data includes a first read data portion and a second read data portion and the write data includes a first write data portion and a second write data portion.

15. The system of claim 14, wherein the first read data portion is assigned to a first PMU and the second read data portion is assigned to a second PMU.

16. The system of claim 15, wherein the first read data portion from the first PMU and the second read data portion from the second PMU are further assigned to a reorder buffer in any order and wherein the reorder buffer is configured to place the first read portion and the second read portion in a correct order to generate an ordered read data.

17. The system of claim 16, wherein the compiler is further configured to read from a physical memory location in the array of reconfigurable units, corresponding to the ordered read data.

18. The system of claim 13, wherein the compiler is further configured to write to the physical memory location in the array of reconfigurable units, corresponding to the write data.

19. The system of claim 12, wherein the two or more read contexts are overlapping or wherein the two or more write contexts are overlapping.

20. A system comprising:

an array of reconfigurable units including a plurality of pattern compute units (PCUs) and a plurality of pattern memory units (PMUs), each of the plurality of the PMUs further comprising a memory having one or more first type of (read) I/O ports and one or more second type of (write) I/O ports, a compiler configured to receive a tensor including a plurality of memory access patterns (contexts,) each memory access pattern further including one or more memory accesses (data regions), wherein the compiler is further configured to:

determine a total number of memory access patterns in the tensor, determine a type of each memory access pattern, determine a critical group of memory access patterns including critical contexts, determine one or more non-critical groups of memory access patterns including non-critical contexts, create n copies of the tensor to create n duplicate tensors wherein n is equal to the number of access patterns in the critical group, create an initial assignment schedule with n duplicate tensors by:
  assigning the critical contexts to the n duplicate tensors,
  assigning a 1st set of non-critical contexts to the n duplicate tensors, and
  assigning a $2^{nd}$ set of non-critical contexts to the n duplicate tensors, create a final assignment schedule by:
  retaining the $1^{st}$ set of non-critical contexts in the n duplicate tensors,
  assigning to x additional duplicate tensors, x contexts from the $2^{nd}$ set of non-critical contexts which are colliding with the 1st set, and
  extending the critical contexts to the x additional duplicate tensors;

dispatch all the contexts as per the final assignment schedule to the n and the x duplicate tensors such that no duplicate tensor has more contexts of a particular type than ports of that type, trim each duplicate tensor to retain portions including its corresponding assigned contexts and remove portions that are inconsequential to the assigned contexts; and provide the assigned contexts from the trimmed duplicates to a set of PMUs.

* * * * *